US009640940B2

(12) United States Patent
Gu et al.

(10) Patent No.: US 9,640,940 B2
(45) Date of Patent: *May 2, 2017

(54) HIGH POWER SHORT PULSE FIBER LASER

(71) Applicant: IMRA America, Inc., Ann Arbor, MI (US)

(72) Inventors: Xinhua Gu, Danville, CA (US); Mark Bendett, Cherry Hill, NJ (US); Gyu Cheon Cho, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,320

(22) Filed: Apr. 13, 2015

(65) Prior Publication Data
US 2015/0325977 A1 Nov. 12, 2015

Related U.S. Application Data

(63) Continuation of application No. 14/012,508, filed on Aug. 28, 2013, now Pat. No. 9,071,037, which is a (Continued)

(51) Int. Cl.
*H01S 3/098* (2006.01)
*H01S 3/11* (2006.01)
(Continued)

(52) U.S. Cl.
CPC .......... *H01S 3/1115* (2013.01); *H01S 3/0057* (2013.01); *H01S 3/06741* (2013.01); (Continued)

(58) Field of Classification Search
CPC .............. H01S 3/094003; H01S 3/1061; H01S 3/1112; H01S 3/1115; H01S 3/1118
See application file for complete search history.

(56) References Cited

U.S. PATENT DOCUMENTS 3,409,843 A 11/1968 Bowness
3,500,234 A 3/1970 Goedertier
(Continued)

FOREIGN PATENT DOCUMENTS

DE 101 24 983 A1 3/2002
EP 0352974 A2 1/1990
(Continued)

OTHER PUBLICATIONS

Allard, et al., "Threshold Dose for Ion-Induced Intermixing in InGaAs/GaAs Quantum Wells", (1994) Applied Physics Letters 64, pp. 2412-2414.
(Continued)

*Primary Examiner* — Tod T Van Roy
(74) *Attorney, Agent, or Firm* — Knobbe, Martens, Olson & Bear, LLP

(57) ABSTRACT

A pulsed laser comprises an oscillator and amplifier. An attenuator and/or pre-compressor may be disposed between the oscillator and amplifier to improve performance and possibly the quality of pulses output from the laser. Such pre-compression may be implemented with spectral filters and/or dispersive elements between the oscillator and amplifier. The pulsed laser may have a modular design comprising modular devices that may have Telcordia-graded quality and reliability. Fiber pigtails extending from the device modules can be spliced together to form laser system. In one embodiment, a laser system operating at approximately 1050 nm comprises an oscillator having a spectral bandwidth of approximately 19 nm. This oscillator signal can be manipulated to generate a pulse having a width below approximately 90 fs. A modelocked linear fiber laser cavity with enhanced pulse-width control includes concatenated sections of both polarization-maintaining and non-polarization-maintaining fibers. Apodized fiber Bragg gratings and inte-
(Continued)

grated fiber polarizers are included in the cavity to assist in linearly polarizing the output of the cavity. Very short pulses with a large optical bandwidth are obtained by matching the dispersion value of the fiber Bragg grating to the inverse of the dispersion of the intra-cavity fiber.

23 Claims, 30 Drawing Sheets

Related U.S. Application Data continuation of application No. 12/814,628, filed on Jun. 14, 2010, now Pat. No. 8,537,864, which is a continuation of application No. 10/814,319, filed on Mar. 31, 2004, now Pat. No. 7,804,864.

(51) Int. Cl.
| | | |
|---|---|---|
| H01S 3/094 | (2006.01) | |
| H01S 3/16 | (2006.01) | |
| H01S 3/00 | (2006.01) | |
| H01S 3/0941 | (2006.01) | |
| H01S 3/102 | (2006.01) | |
| H01S 3/067 | (2006.01) | |
| H01S 3/13 | (2006.01) | |

(52) U.S. Cl.
CPC ........ *H01S 3/06754* (2013.01); *H01S 3/0941* (2013.01); *H01S 3/094003* (2013.01); *H01S 3/094042* (2013.01); *H01S 3/1028* (2013.01); *H01S 3/1618* (2013.01); *H01S 3/1698* (2013.01); *H01S 3/0064* (2013.01); *H01S 3/0078* (2013.01); *H01S 3/06712* (2013.01); *H01S 3/1305* (2013.01)

(56) References Cited

U.S. PATENT DOCUMENTS

| | | |
|---|---|---|
| 3,584,312 A | 6/1971 | Statz |
| 3,729,690 A | 4/1973 | Snitzer |
| 3,801,931 A | 4/1974 | Heflinger et al. |
| 3,928,818 A | 12/1975 | White |
| 3,973,828 A | 8/1976 | Onoda et al. |
| 3,978,429 A | 8/1976 | Ippen et al. |
| 4,723,248 A | 2/1988 | Harter et al. |
| 4,787,927 A | 11/1988 | Mears et al. |
| 4,860,296 A | 8/1989 | Chemia et al. |
| 4,864,577 A | 9/1989 | Aoshima et al. |
| 4,902,897 A | 2/1990 | Iwamatsu |
| 4,991,923 A | 2/1991 | Kino et al. |
| 5,005,175 A | 4/1991 | Desurvire et al. |
| 5,008,887 A | 4/1991 | Kafka et al. |
| 5,050,183 A | 9/1991 | Duling, III |
| 5,067,134 A | 11/1991 | Oomen |
| 5,136,598 A | 8/1992 | Weller et al. |
| 5,163,059 A | 11/1992 | Negus et al. |
| 5,189,676 A | 2/1993 | Wysocki et al. |
| 5,192,709 A | 3/1993 | Petroff |
| 5,222,089 A | 6/1993 | Huber |
| 5,226,049 A | 7/1993 | Grubb |
| 5,238,868 A | 8/1993 | Elman et al. |
| 5,272,560 A | 12/1993 | Baney et al. |
| 5,303,314 A | 4/1994 | Duling, III et al. |
| 5,311,603 A | 5/1994 | Fidric |
| 5,361,161 A | 11/1994 | Baney et al. |
| 5,363,386 A | 11/1994 | Smith |
| 5,395,793 A | 3/1995 | Charbonneau et al. |
| 5,400,350 A | 3/1995 | Galvanauskas |
| 5,414,725 A | 5/1995 | Fermann et al. |
| 5,422,897 A | 6/1995 | Wyatt et al. |
| 5,436,925 A | 7/1995 | Lin et al. |
| 5,440,573 A | 8/1995 | Fermann |
| 5,448,579 A | 9/1995 | Chang et al. |
| 5,450,427 A | 9/1995 | Fermann |
| 5,479,422 A | 12/1995 | Fermann et al. |
| 5,499,134 A | 3/1996 | Galvanauskas et al. |
| 5,513,194 A | 4/1996 | Tamura et al. |
| 5,574,738 A | 11/1996 | Morgan |
| 5,585,913 A | 12/1996 | Hariharan et al. |
| 5,617,434 A | 4/1997 | Tamura et al. |
| 5,627,848 A | 5/1997 | Fermann et al. |
| 5,633,885 A | 5/1997 | Galvanauskas et al. |
| 5,659,558 A | 8/1997 | Tohmon et al. |
| 5,663,731 A | 9/1997 | Theodoras et al. |
| 5,666,373 A | 9/1997 | Sharp et al. |
| 5,677,769 A | 10/1997 | Bendett |
| 5,689,519 A | 11/1997 | Fermann et al. |
| 5,696,782 A | 12/1997 | Harter et al. |
| 5,701,319 A | 12/1997 | Fermann |
| 5,818,630 A | 10/1998 | Fermann et al. |
| 5,844,927 A | 12/1998 | Kringlebotn |
| 5,847,863 A | 12/1998 | Galvanauskas et al. |
| 5,861,970 A | 1/1999 | Tatham et al. |
| 5,862,287 A | 1/1999 | Stock et al. |
| 5,867,304 A | 2/1999 | Galvanauskas et al. |
| 5,880,877 A | 3/1999 | Fermann et al. |
| 5,920,668 A | 7/1999 | Uehara et al. |
| 5,923,686 A | 7/1999 | Fermann et al. |
| 5,959,735 A | 9/1999 | Maris et al. |
| 5,995,175 A | 11/1999 | Kim et al. |
| 6,014,249 A | 1/2000 | Fermann et al. |
| 6,020,591 A | 2/2000 | Harter et al. |
| 6,034,975 A | 3/2000 | Harter et al. |
| 6,072,811 A | 6/2000 | Fermann et al. |
| 6,097,741 A | 8/2000 | Lin et al. |
| 6,104,526 A | 8/2000 | Kakui |
| 6,151,338 A | 11/2000 | Grubb et al. |
| 6,154,310 A | 11/2000 | Galvanauskas et al. |
| 6,181,463 B1 | 1/2001 | Galvanauskas et al. |
| 6,188,705 B1 | 2/2001 | Krainak et al. |
| 6,198,568 B1 | 3/2001 | Galvanauskas et al. |
| 6,208,458 B1 | 3/2001 | Galvanauskas et al. |
| 6,249,630 B1 | 6/2001 | Stock et al. |
| 6,252,892 B1 | 6/2001 | Jiang et al. |
| 6,275,512 B1 | 8/2001 | Fermann |
| 6,320,885 B1 | 11/2001 | Kawai et al. |
| 6,334,011 B1 | 12/2001 | Galvanauskas et al. |
| 6,339,602 B1 | 1/2002 | Goto et al. |
| 6,373,867 B1 | 4/2002 | Lin et al. |
| 6,393,035 B1 | 5/2002 | Weingarten et al. |
| 6,411,430 B1 | 6/2002 | Ogino et al. |
| 6,420,728 B1 | 7/2002 | Razeghi |
| 6,540,953 B1 | 4/2003 | Lee et al. |
| 6,546,169 B1 | 4/2003 | Lin et al. |
| 6,549,547 B2 | 4/2003 | Galvanauskas et al. |
| 6,560,268 B1 | 5/2003 | Deichsel et al. |
| 6,567,438 B2 | 5/2003 | Lin |
| 6,570,892 B1 | 5/2003 | Lin et al. |
| 6,590,910 B2 | 7/2003 | Lin |
| 6,643,299 B1 | 11/2003 | Lin |
| 6,693,927 B1 | 2/2004 | Horvath et al. |
| 6,813,429 B2 | 11/2004 | Price et al. |
| 6,816,652 B1 | 11/2004 | Lin et al. |
| 6,839,363 B2 | 1/2005 | Lin et al. |
| 6,845,108 B1 | 1/2005 | Lin et al. |
| 6,885,683 B1 | 4/2005 | Fermann |
| 6,901,085 B2 | 5/2005 | Hu et al. |
| 6,936,526 B2 | 8/2005 | Fu et al. |
| 6,954,575 B2 | 10/2005 | Fermann et al. |
| 7,088,756 B2 | 8/2006 | Fermann |
| 7,414,780 B2 | 8/2008 | Fermann |
| 7,573,918 B1 | 8/2009 | Soh et al. |
| 7,580,432 B2 | 8/2009 | Sucha et al. |
| 7,602,825 B1 | 10/2009 | Lin et al. |
| 7,668,213 B2 | 2/2010 | Hoffman et al. |
| 7,711,013 B2 | 5/2010 | Liu et al. |
| 7,804,864 B2 | 9/2010 | Gu et al. |
| 7,813,387 B2 * | 10/2010 | Pedersen ............... H01S 3/1115 372/10 |
| 7,991,022 B1 | 8/2011 | Soh et al. |
| 8,537,864 B2 | 9/2013 | Gu et al. |

(56) References Cited

U.S. PATENT DOCUMENTS

| | | | |
|---|---|---|---|
| 9,071,037 B2 | 6/2015 | Gu et al. | |
| 2001/0034089 A1 | 10/2001 | Yamazaki et al. | |
| 2002/0071454 A1 | 6/2002 | Lin | |
| 2002/0072142 A1 | 6/2002 | Ooi et al. | |
| 2002/0105711 A1 | 8/2002 | Kaneko | |
| 2002/0146047 A1 | 10/2002 | Bendett et al. | |
| 2002/0168161 A1 | 11/2002 | Price et al. | |
| 2002/0172486 A1 | 11/2002 | Fermann | |
| 2003/0118060 A1* | 6/2003 | Spuehler | H01S 3/1118 372/18 |
| 2003/0123132 A1 | 7/2003 | Hu et al. | |
| 2003/0147434 A1 | 8/2003 | Hong et al. | |
| 2003/0156605 A1 | 8/2003 | Richardson et al. | |
| 2003/0169797 A1 | 9/2003 | Aldaz et al. | |
| 2004/0213302 A1 | 10/2004 | Fermann et al. | |
| 2005/0018714 A1 | 1/2005 | Fermann et al. | |
| 2005/0146779 A1 | 7/2005 | Okhotnikov et al. | |
| 2005/0226286 A1 | 10/2005 | Liu | |
| 2005/0238070 A1 | 10/2005 | Imeshev et al. | |
| 2010/0188736 A1 | 7/2010 | Liu et al. | |
| 2012/0008649 A1 | 1/2012 | Gu et al. | |

FOREIGN PATENT DOCUMENTS

| | | |
|---|---|---|
| EP | 0564098 B1 | 5/1996 |
| JP | 56-165385 | 12/1991 |
| JP | 2002-118315 | 4/2002 |
| JP | 2004-527001 | 9/2004 |
| JP | 2007-535141 | 11/2007 |
| WO | WO 2005/017955 | 2/2005 |
| WO | WO 2005/101593 | 10/2005 |

OTHER PUBLICATIONS

Barnett, et al., "High-power erbium-doped fiber laser mode locked by a semiconductor saturable absorber," Optics Letters, vol. 20, No. 5, Mar. 1995, pp. 471-473.

Brunner, et al., "Sub-40-fs pulses with 18-W average power from a passively mode-locked thin disk Yb:YAG laser with nonlinear fiber compression," Advanced Solid-State Photonics, vol. 83 of Trends in Optics and Photonics, Opt. Soc. America, Feb. 2003, pp. 149-151.

Brunner, et al., "Sub-50-fs pulses with 24-W average power from a passively mode-locked thin disk Yb:YAG laser with nonlinear fiber compression," Conf. on Advanced Solid-State Photonics, Feb. 2003, paper No. TuA1, in 3 pages.

Charbonneau, et al., "Quantum-Well Intermixing for Optoelectronic Integration Using High Energy Ion Implantation", (1995) Journal of Applied Physics 78, pp. 3697-3705.

Charbonneau, et al., "Band-Gap Tuning of InGaAs/InGaAsP/InP Laser Using High Energy Ion Implantation", (1995) Applied Physics Letters 67, pp. 2954-2956.

Charbonneau, et al., "Bandgap tuning of semiconductor Quantum Well laser structures using high energy ion implantation", (1995) Nuclear Instruments and Methods in Physics Research B, pp. 457-460.

Charbonneau, et al., "Photonic Integrated Circuits Fabricated Using Ion Implantation", (1998) IEEE Journal of Selected Topics in Quantum Electronics 4, pp. 772-793.

Desouza, E. A., et al, "Saturable Absorber Modelocked Polarisation Maintaining Erbium-Doped Fibre Laser", Electronics Letters, vol. 29, No. 5, pp. 447-449, Mar. 4, 1993.

Desurvire, et al., "High-gain erbium-doped traveling-wave fiber amplifier," Optics Letters, vol. 12, No. 11, Nov. 1987, pp. 888-890.

Duling, III, "All-fiber ring soliton laser mode locked with a non-linear mirror," Optics Letters, vol. 16, No. 8, Apr. 15, 1991, pp. 539-541.

Duling, III et al., "A Single-Polarization Er-Doped Fiber Amplifier," believed to have been presented at a conference on Lasers and Electro-Optics, vol. 12 of 992 OSA Tech. Digest Series, paper CPDP 28, 1992, pp. 694-695.

Duling, III, et al., "Single-Polarisation Fibre Amplifier," Electronics Letters, vol. 28, No. 12, Jun. 4, 1992, pp. 1126-1128.

Fermann, et al., "Additive-pulse-compression mode locking of a neodymium fiber laser," Optical Letters, vol. 16, No. 4, Feb. 15, 1991, pp. 244-246.

Fermann, et al., "Environmentally stable Kerr-type mode-locked erbium fiber laser producing 360-fs pulses," *Optics Letters*, vol. 19, No. 1, Jan. 1, 1994, pp. 43-45.

Fermann, M.E., "Nonlinear polarization evolution in passively modelocked fiber lasers," in Compact Sources of Ultrashort Pulses, ed. I. N. Duling, III, Cambridge University Press, 1995, pp. 179-207.

Fermann, et al., "Passive mode locking by using nonlinear polarization evolution in a polarization-maintaining erbium-doped fiber," Optics Letters, vol. 18, No. 11, Jun. 1, 1993, pp. 894-896.

Fermann, et al., "Passive mode locking in erbium fiber lasers with negative group delay," Appl. Phys. Letter, vol. 62, Mar. 1, 1993, pp. 910-912.

Fermann, "Ultrashort-Pulse Sources Based on Single-Mode Rare-Earth-Doped Fibers," Applied Physics B, vol. 58, 1994, pp. 197-209.

Fu, et al., "Proton Irradiation-Induced Intermixing in GaAs/(Al)GaAs Quantum Wells and Quantum-Well Lasers", (1999) Journal of Applied Physics 85, pp. 6786-6789.

Fu, et al., "Postgrowth Wavelength Tuning of Optoelectronic Devices by Ion Implantation Induced Quantum Well Intermixing", (2000) Proceedings of Conf. on Optoelectronic and Microelectronic Materials and Devices, Melbourne, Australia, pp. 344-347.

Fu, et al., "Tuning of Detection Wavelength of Quantum-Well Infrared Photodetectors by Quantum Well Intermixing", (2001) Infrared Physics and Technology, 42/3-5, pp. 171-175.

Fu, et al., "Tuning the Detection Wavelength of Quantum-Well Infrared Photodetectors by Single High-Energy Implantation", (2001) Applied Physics Letters 78, pp. 10-12.

Goldberg, et al., "Ion Beam Intermixing of Semiconductor Heterostructures for Optoelectronic Applications", (1997), Nuclear Instruments & Methods in Physics Research Section B, 127, pp. 418-422.

R.D. Goldberg, et al., "Selective Intermixing of Ion Irradiated Semiconductor Heterostructures", (1999) Mat. Res. Soc. Sump. Proc. vol. 540, pp. 15-26.

Harter, et al., "Low-magnification unstable resonators used with ruby and alexandrite lasers," Optics Letters, vol. 11, No. 11, Nov. 1986, pp. 706-708.

Harter, et al., "Short pulse amplification in tunable solid state materials," SPIE, vol. 1229, 1990, pp. 19-28.

Haysom, et al., "Lateral Selectivity of Ion-Induced Quantum Well Intermixing", (1998), Journal of Vacuum Science and Technology A 16, pp. 817-820.

He, et al., "Bandgap Shifted InGaAsP/InP Quantum Well Waveguides Using Mev Ion Implantation", (1995), Electronic Letters 31, pp. 2094-2095.

Hofer, et al., "Characterization of Ultrashort Pulse Formation in Passively Mode-Locked Fiber Lasers," IEEE Journal of Quantum Electroics, vol. 28, No. 3, Mar. 1992, pp. 720-728.

Hofer, et al., "Mode locking with cross-phase and self-phase modulation," Optics Letters, vol. 16, No. 7, Apr. 1, 1991, pp. 502-504.

Hopfel, R. A., et al. , "Intraband inversion due to ultrashort carrier lifetimes in proton-bombarded InP" Phys. Rev. B., vol. 53, No. 19, pp. 12581-12584, May 15, 1996.

Ilday, et al., "Generation of 50-fs, 5nJ pulses at 1.03 μm from a wave-breaking-free fiber laser", 2003 Optical Society of America, Aug. 1, 2003, vol. 28, No. 15, Optics Letters, pp. 1365-1367.

Ippen, et al., "Additive pulse mode locking," Optical Society of America, vol. 6, No. 9, Sep. 1989, pp. 1736-1745.

Islam, M. N., et al., "Color Center Lasers Passively Mode Locked by Quantum Wells", IEEE J. Quantum Electron., vol. 25, No. 12, pp. 2454-2463, Dec. 1989.

Johnston, et al., "Interdiffused Quantum-Well Infrared Photodetectors for Color Sensitive Arrays", (1999) Applied Physics Letters 75, pp. 923-925.

(56) References Cited

OTHER PUBLICATIONS

Kelly, "Characteristic sideband instability of the periodically amplified average soliton," Electronic Letters, vol. 28, No. 8, Apr. 9, 1992, pp. 806-807.

Koester, et al., "Amplification in a Fiber Laser," Applied Optics, vol. 3, No. 10, Oct. 1964, pp. 1182-1186.

Krasinski, et al., "Multipass Amplifiers Using Optical Circulators," IEEE Journal of Quantum Electronics, vol. 26, No. 5, May 1990, pp. 950-958.

Krausz, et al., "Passive mode locking in standing-wave laser resonators," Optics Letters, vol. 18, No. 11, Jun. 1, 1993, pp. 888-890.

M.J. Lederer et al., "Diode-pumped Femtosecond Yb:YAl$_3$(BO$_3$)$_4$ Laser passively Mode-locked by an Ion-Implanted SESAM," CLEO 2002, CWA43, May 22, 2002, pp. 344-345.

Lefort, et al., "Practical low-noise stretched-pulse Yb$^3$+-doped fiber laser", 2002 Optical Society of America, Mar. 1, 2002, vol. 27, No. 5, Optics Letters, pp. 291-293.

Li, et al., "Multiple energy proton implantation induced quantum well intermixing in GaAs/AiGaAs quantum-well infrared photodetectors", (1999) CLEO/Pacific Rim '99, pp. 312-313.

Li, et al., "Proton Implantation and Rapid Thermal Annealing Effects on GaAs/AlGaAs Quantum Well Infrared Photodectors", (1999) Superlattices and Microstructures 26, pp. 317-324.

Lim, et al., "Generation of 2-nJ pulses from a femtosecond ytterbium fiber laser", 2003 Optical Society of America, Apr. 15, 2003, vol. 28, No. 8, Optics Letters, pp. 660-662.

Liu, et al., "Wavelength Tuning of GaAs/AlGaAs Quantum-Well Infrared Photo-Detectors by Proton Implantation Induced Intermixing", (2000) Japanese Journal of applied Physics 39, pp. 1687-1689.

Loh, et al., "All-solid-state subpicosecond passively mode locked erbium-doped fiber laser," *Applied Physics Letters*, vol. 63, No. 1, Jul. 5, 1993, pp. 4-6.

Loh, et al., "Diode-Pumped Selfstarting Passively Modelocked Neodymium-Doped Fibre Laser," *Electronics Letters*, vol. 29, No. 9, Apr. 29, 1993, pp. 808-810.

Manni, "Two-Photon Excitation Expands the Capabilities of Laser-Scanning Microscopy," Biophotonics International, Jan./Feb. 1996, pp. 44-48, 50 and 52.

Matsas, et al., "Self-Starting Passively Mode-Locked Fabry-Perot Fiber Soliton Laser Using Nonlinear Polarization Evolution," IEEE Photonics Technology Letters, vol. 5, No. 5, May 5, 1993, pp. 492-494.

Menyuk, "Stability of solitons in birefringent optical fibers. II. Arbitrary amplitudes," Optical Society of America, vol. 5, No. 2, Feb. 1988, pp. 392-402.

Morioka, et al., "Ultrafast Reflective Optical Kerr Demultiplexer Using Polarisation Rotation Mirror," *Electronics Letters*, vol. 28, No. 6, Mar. 12, 1992, pp. 521-522.

Ober, et al., "42-fs pulse generation from a mode-locked fiber laser started with a moving mirror," Optics Letters, vol. 18, No. 5, Mar. 1, 1993, pp. 367-369.

Ober, et al., "Self-starting diode-pumped femtosecond Nd fiber laser", Optics Letters, vol. 18, No. 18, Sep. 15, 1993, pp. 1532-1534.

Okhotnikov, et al., "980-nm Picosecond Fiber Laser", IEEE Photonics Technology Letters, vol. 15, No. 11, Nov. 2003, pp. 1519-1521.

Piva, et al., "Ion Implantation Enhanced Intermixing of Al-Free 980 nm Laser Structures", (1998) Applied Physics Letters 73, pp. 67-69.

Piva, et al., "Bandgap Tuning of Semiconductor Quantum Well Structures Using Ion Implantation", Superlattices & Microstructures, vol. 15, No. 4, Jun. 1994, Elsevier, pp. 385-389.

Poole, et al., "Defect Diffusion in Ion Implanted AlGaAs and InP—Consequences for Quantum Well Intermixing", (1995) Journal of Applied Physics 78, pp. 2367-2371.

Poole, et al., "Demonstration of an Ion-Implanted, Wavelength-shifted Quantum-Well Laser", (1996) IEEE Photonics Technology Letters 8, pp. 16-18.

Poole, et al, "Fabrication of Low-Loss Optical Fibres Containing Rare-Earth Ions," Electronics Letters, vol. 21, No. 17, Aug. 15, 1985, pp. 737-738.

Poole, et al., "The Enhancement of Quantum Well Intermixing Through Repeated Ion Implantation", (1994) Semiconductor Science & Technology 9, pp. 2134-2137.

Reddy, et al., "A Turnkey 1.5um Picosecond Er/Yb Fiber Laser," Conference on Optical Fiber Communication, Optical Fiber Communication Conference, Feb. 1993, paper PD17, 1993, pp. 71-74.

Snitzer, "Proposed Fiber Cavities for Optical Masers," Journal of Applied Physics, vol. 32, No. 1, Jan. 1961, pp. 36-39.

Steele, et al., "Postgrowth Tuning of Quantum-Well Infrared Detectors by Rapid Thermal Annealing", (1994) Journal of Applied Physics 75, pp. 8234-8236.

Tamura, et al., "77-fs pulse generation from a stretched-pulse mode-locked all fiber ring laser," Optics Letters, vol. 18, No. 13, Jul. 1, 1993, pp. 1080-1082.

Tamura, et al., "Unidirectional ring resonators for self-starting passively mode-locked lasers," Optics Letters, vol. 18, No. 3, Feb. 1, 1993, pp. 220-222.

Tan, et al., "Wavelength Shifting in GaAs Quantum Wells Lasers by Proton Irradiation", (1997) Applied Physics Letters 71, pp. 2680-2682.

Taverner, et al, "Polarisation Maintaining Figure-8 Laser," believed to have been presented at the Optical Society America Topical Meeting on Nonlinear Guided Wave Phenomena, Cambridge, England, Sep. 20-22, 1993, paper WC3, pp. 367-370 and pp. 1-4.

G.J. Valentine et al., "Femtosecond Yb: YCOB laser pumped by narrow-stripe laser diode and passively modelocked using ion implanted saturable-absorber mirror," Electronics Letters, Sep. 14, 2000, vol. 36, No. 19, pp. 1621-1623.

Walling, et al., "Tunable Alexandrite Lasers: Development and Performance," IEEE Journal of Quantum Electronics, vol. QE-21, No. 10, Oct. 1985, pp. 1568-1581.

PCT Search Report and Written Opinion of International Searching Authority for International Application No. PCT/US2004/017458, dated, Mar. 14, 2005, in 12 pages.

English translation of Notice of Reasons for Rejection issued by Japan Patent Office on May 12, 2011, for Japanese Pat. App. No. JP2007-506550, in 4 pages.

* cited by examiner

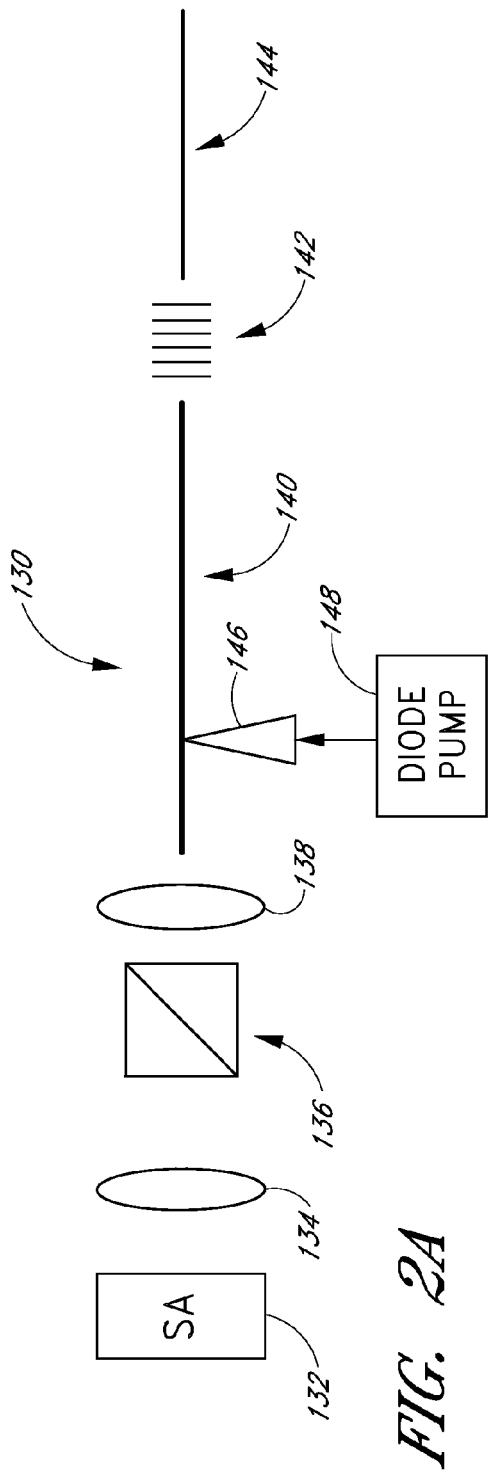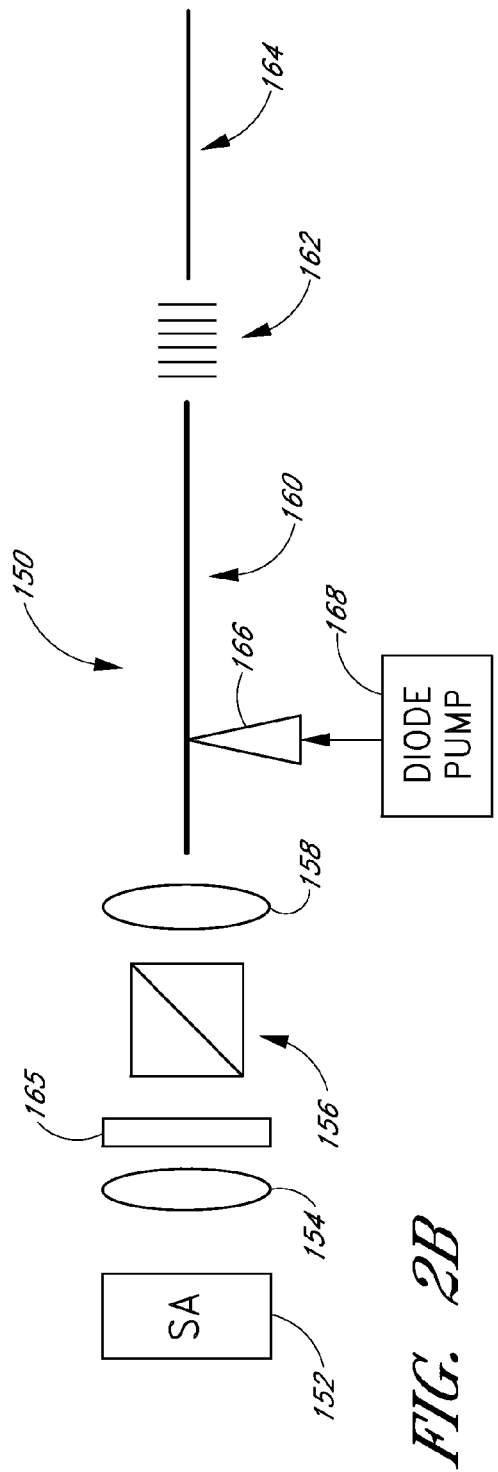

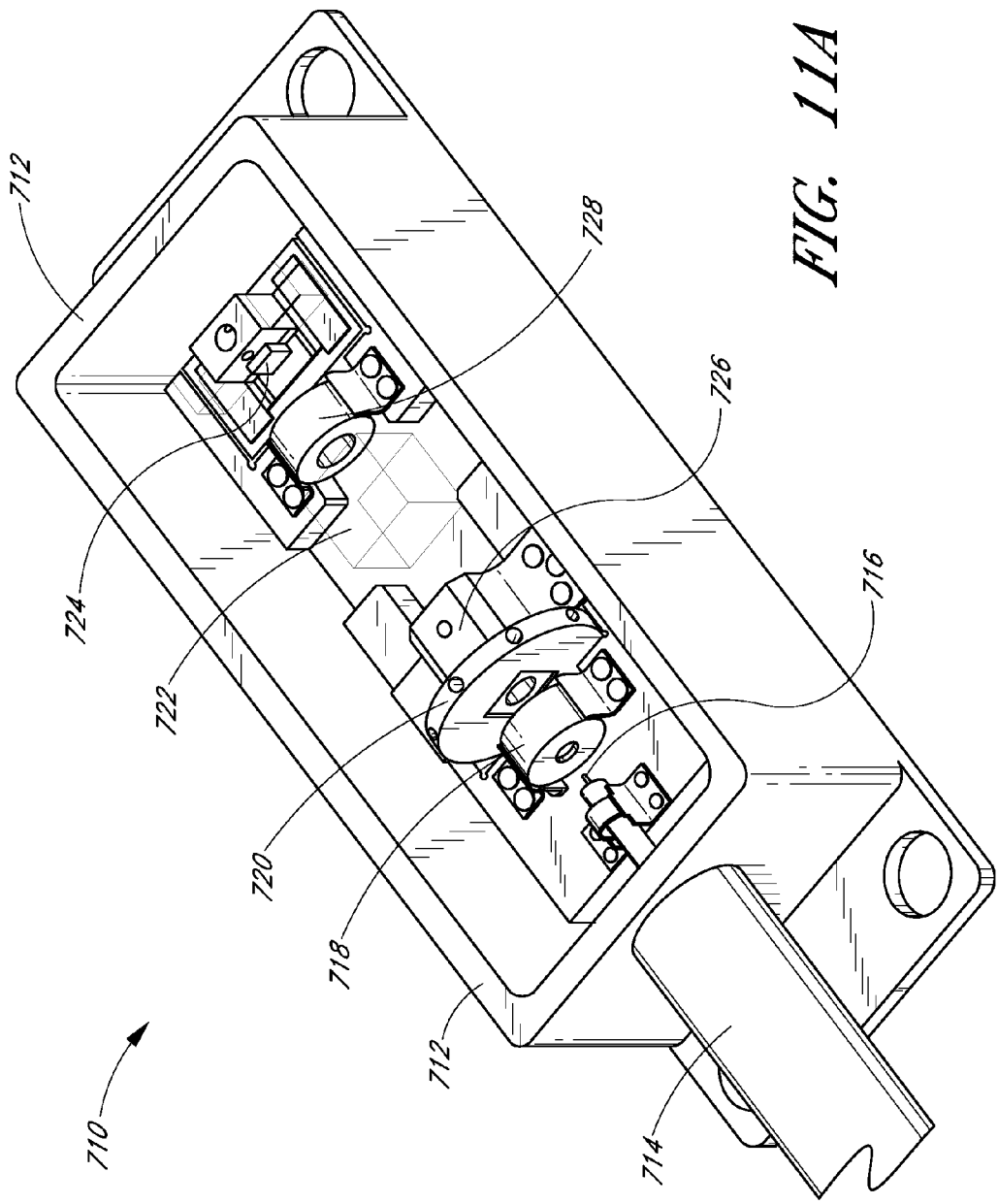

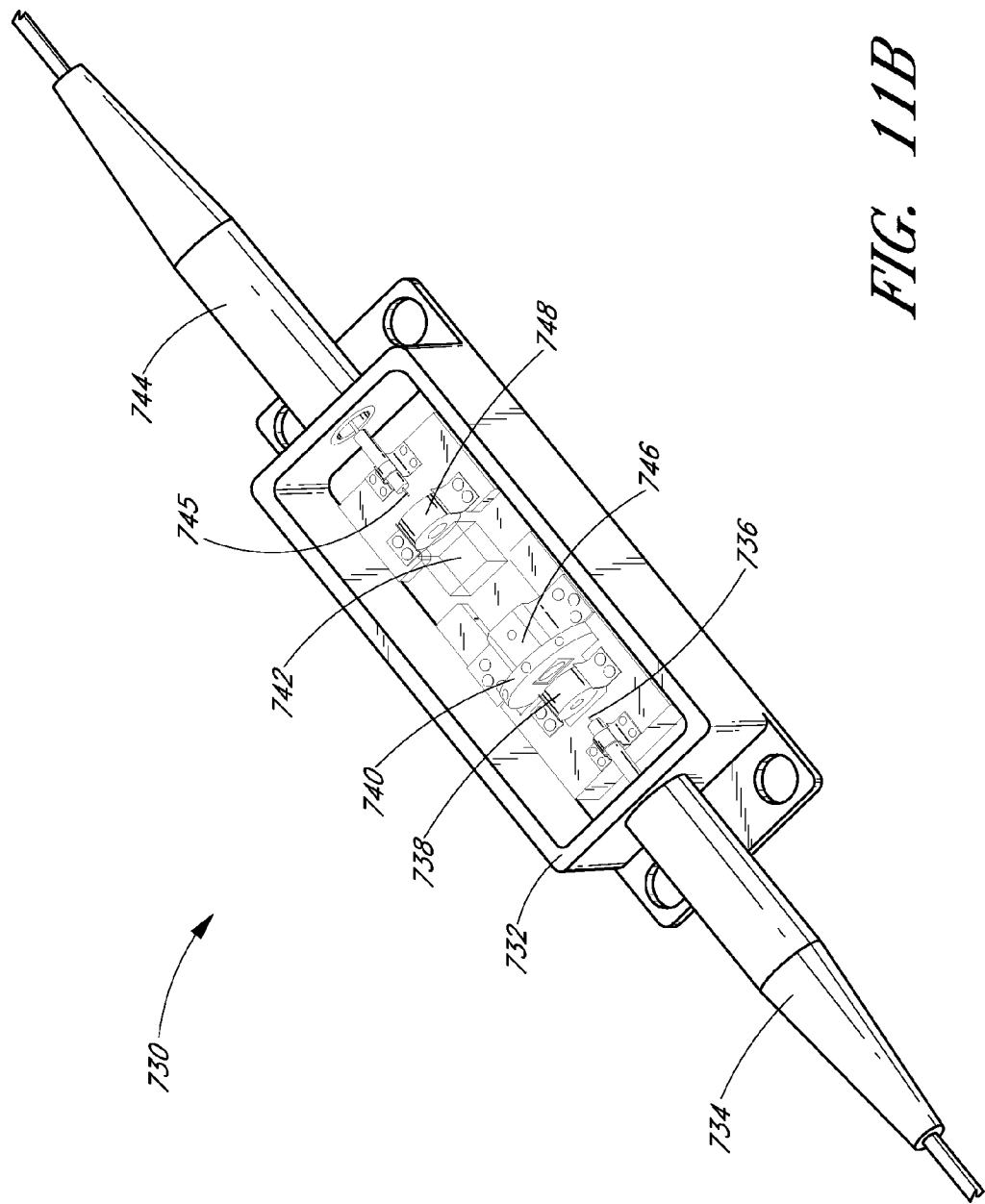

HIGH POWER SHORT PULSE FIBER LASER

CROSS-REFERENCE TO RELATED APPLICATIONS

This application is a continuation of U.S. patent application Ser. No. 14/012,508, filed Aug. 28, 2013, titled "HIGH POWER SHORT PULSE FIBER LASER," now U.S. Pat. No. 9,071,037, which is a continuation of U.S. patent application Ser. No. 12/814,628, filed Jun. 14, 2010, titled "HIGH POWER SHORT PULSE FIBER LASER," now U.S. Pat. No. 8,537,864, which is a continuation of U.S. patent application Ser. No. 10/814,319, filed Mar. 31, 2004, titled "HIGH POWER SHORT PULSE FIBER LASER," now U.S. Pat. No. 7,804,864; all of which are hereby incorporated by reference herein in their entireties.

BACKGROUND

Field

The present teachings relate to waveguide-based lasers, such as fiber lasers, that output high power short laser pulses. More particularly, the present teachings relate to pulsed lasers that provide improved performance such as reduced pulse width and that preferably include modular designs that are compact and rugged.

This invention relates to modelocked fiber lasers and more particularly an ultra-compact integrated fiber laser with pulse width control in conjunction with concatenated sections of polarization maintaining and non-polarization maintaining fiber sections.

Description of the Related Art

High power laser sources are of interest for practical applications in various fields. High peak power pulsed lasers are desirable, for instance, in medical and industrial applications, remote sensing applications, and in optical parametric oscillators. Some specific exemplary applications include use as pump sources for optical amplifiers and Raman lasers for use in medicine and spectroscopy. Rare-earth-doped double clad fiber lasers offer an excellent combination of high power and special beam quality that may be particularly useful.

Various of the following references discuss laser systems and are hereby incorporated herein by reference:

[1] U.S. patent application Ser. No. 09/576,772 filed on May 23, 2000 by M. E. Fermann, A. Galvanauskas, and D. Harter entitled "Modular, high energy, widely-tunable ultrafast fiber source";

[2] U.S. patent application Ser. No. 10/627,069 filed on Jul. 25, 2003 by M. E. Fermann, and G. C. Cho entitled "Polarization Maintaining Dispersion Controlled Fiber Laser Source Of Ultrashort Pulses";

[3] U.S. Pat. No. 6,151,338 issued to S. G. Grubb, D. F. Welch, and R. Zanoni in Nov. 21, 2000 entitled "High power laser optical amplifier system";

[4] O. G. Okhotnikov, L. A. Gomes, N. Xiang. T. Jouhti, A. K. Chin, R. Singh, and A. B. Grudinin, "980-nm picosecond fiber laser" IEEE Photonics Technology Letters, 15 (11), 1519-1521 (2003); and

[5] H. Lim, F. O. Ilday, and F. W. Wise, "Generation of 2-nJ pulses from a femtosecond ytterbium fiber laser" Optics Letters, 28 (8), 660-662 (2003).

Currently, conventional pulse lasers have practical limitations. For example, the optical components in conventional commercial short and ultra-short pulse lasers are normally mounted mechanically on a mounting plate such as a breadboard. Such mounting of components can result in a bulky packaging and can suffer from mechanical vibrations and environmental instabilities. Additionally, such mounting requires frequent alignment to achieve the optimum performance. Thus there is a need for improved lasers and laser systems.

Modelocked fiber lasers are increasingly displacing traditional solid-state lasers in ultrafast optic applications. Modelocked fiber lasers can be packaged in very small spaces and also exhibit superior mechanical and thermal stability. In particular, passively modelocked fiber lasers allow compact designs because of the absence of bulky optical modulators. Fiber laser systems are pumped using diode lasers with an emission wavelength shorter than the fiber laser emission wavelength. For upconversion-type fiber lasers, the pump wavelength can be longer than the emission wavelength. Generally, similar to the majority of all laser systems, the pump wavelength differs from the emission wavelength; a fact which is well known in the art.

Passively modelocked fiber lasers often comprise saturable absorbers to initiate and stabilize the pulse formation process. Examples of laser systems using saturable absorbers in this manner are described in U.S. Pat. No. 5,689,519 ('519) to Fermann et al., and U.S. Pat. No. 5,448,579 ('579) to Chang et al.

Semiconductor saturable absorbers have been implemented in modelocked lasers for a long time. Of particular interest are multiple-layer heterostructures as suggested in U.S. Pat. No. 4,860,296 ('296) to D. S. Chemla et al. However, these early saturable absorber designs were restricted in that they contained nonlinear layers with a spacing of exactly an integer multiple of a predetermined optical period. Moreover, the incorporation of multiple layer heterostructures as suggested by '296 relied on semiconductor layers with a thickness of less than 500 Å in order to exploit quantum-confinement effects. Such thin semiconductor layers generally restrict the bandwidth over which pulse shaping is possible with saturable absorbers.

A more workable saturable absorber solution was suggested in U.S. Pat. No. 6,252,892 ('892) to Jiang et al., where a resonant saturable absorber for passive modelocking of lasers was described. Moreover, '892 suggests distributed resonant saturable absorbers comprising layers of saturable absorber material separated by semiconductor layers not restricted to a thickness of less than 500 Å. Semiconductor layers with a thickness greater than 500 Å are indeed useful for maximizing the pulse shaping action of saturable absorbers.

As is well known in the art of passive modelocking of color center lasers (Islam et al., IEEE J. Quantum Electron. Vol. 25, pp. 4254 (1989)), the optically excited carriers in semiconductor saturable absorbers generally relax with different time constants. A first time constant of approximately 300 fs depends on the charge carrier density and excess energy of the hot photo-excited carriers due to intraband dynamics, e.g. thermalization and cooling of hot carriers to the band edge. A second longer time constant of 1 ps-30 ns is due to interband dynamics, e.g. the recombination of the carriers.

These different time constants can be easily realized if the hot charge carriers are excited well above (about an optical phonon energy above) the band edge. However, when the carriers are photo-excited at the band edge, the intraband contribution becomes weak due to the low carrier temperature. The excitation near-band edge is usually preferred in saturable absorber design because of the resulting resonant enhancement of the optical nonlinearity. In this case, the nonlinear optical response is governed by the interband dynamics including trap center assisted recombination and carrier relaxation with two different time constants cannot necessarily be observed and moreover, the ratio of carrier centers relaxing at the two different time constants cannot be controlled.

The interband dynamics are generally manipulated by introducing trap centers for photo-excited charge carriers either by arsenic anti-sites in GaAs-related material systems grown at low temperature or by implantation with ions. It has been readily reported (A. R. Hopfel, Ch. Teissl, and K. F. Lambrecht, Appl. Phys. Lett. 53, p. 12581 (1996)) that the trapping rate dominate the intraband dynamics in InP implanted with 200 keV protons ($H^+$) at a dose of $1 \times 10^{16}$ $cm^{-2}$, when excited with 1.7 eV photons. The carrier trap time can be sub 100 fs and the cw luminescence shows a non-Fermi distribution, indicating the hot carriers undergo a recombination process before they cool down to the band edge.

For ultrafast fiber lasers modelocked by saturable absorbers as described in U.S. Pat. No. 6,252,892 it was shown that cw modelocking is initiated by Q-switched mode-locking in the very early stages of pulse formation. Hence, Q-switch pulses in the cavity are used for the start of modelocking and the support of Q-switch pulses by a slow optical modulation process in the absorber is useful.

Hence, the first longer time constant can be used to initiate pulse formation, whereas the second shorter time constant can be used to stabilize the oscillation of short femtosecond pulses. However, to date no control of the ratio of carriers relaxing at these time constants was possible.

In fiber lasers, soliton shaping and or nonlinear polarization evolution can further be used to stabilize pulse formation as described in '519. However, to compete on an equal level with modelocked solid state lasers in ultrafast optics applications, modelocked fiber lasers should include the following: 1) the output polarization state should preferably be well defined, 2) the construction of the fiber laser should preferably be adaptable to mass production, 3) the required optical elements should preferably be as inexpensive as possible, and 4) the design concept should preferably comprise saturable absorbers with well controllable parameters. It is with respect to these four factors that current, conventional, modelocked fiber laser technology still needs improvement.

Early modelocked fiber laser designs, as exemplified in '519, relied on non-fiber components for stable operation. Although these early modelocked fiber lasers could further accommodate devices that enabled wavelength tuning, a fiber pig-tailed output signal with a well-defined polarization state was not easily attainable. Similarly, '579 also included bulk optical components.

Improvements in the basic design of modelocked fiber lasers were made possible by the use of fiber Bragg gratings to control the dispersion inside the cavity or as replacements for cavity-end mirrors in Fabry-Perot-type cavity designs (U.S. Pat. No. 5,450,427 ('427) to Fermann et al.). Moreover, the incorporation of polarization maintaining fiber was further suggested in '427 to limit the sensitivity of the cavity to mechanical perturbations of the fiber. These designs allowed compact wavelength-tunable set-ups as well as synchronization to external electronic clocks. Wavelength tunable passively modelocked fiber lasers were later also described in U.S. Pat. No. 6,097,741 ('741) and U.S. Pat. No. 6,373,867 ('867) to Lin et al.

Further improvements became possible by constructing cladding-pumped modelocked fiber lasers (U.S. Pat. No. 5,627,848 ('848) to Fermann et al.).

The need for bulk polarizers was eliminated by the implementation of all-fiber polarizers as disclosed in U.S. Pat. No. 6,072,811 ('811) to Fermann et al. Such integrated modelocked fiber lasers could also incorporate fiber Bragg gratings for output coupling. The use of fiber Bragg gratings and all-fiber polarizers in the absence of any non-fiber polarization manipulating elements constituted a great simplification compared to single-polarization fiber lasers as discussed by DeSouza et al. (Electron. Lett., vol. 19, p. 679, 1993).

Limitations in integrated cavity designs arose from the need for fiber Bragg gratings written in polarization maintaining fiber to produce a linear polarization state of the output pulses. A high degree of laser integration has also been accomplished in the subsequent '741 and '867 patents. These designs lack high polarization extinction, all-fiber elements for polarization selection, and they rely on several concatenated intra-cavity polarization-maintaining fiber elements of extended length, which can induce the generation of satellite pulses at the fiber output. Indeed, as described in U.S. patent application Ser. No. 09/809,248, in the presence of concatenated fiber sections, pulse stability requires the single-pass group delay between the polarization axes of each fiber section to be larger than the generated pulse width. This is required to prevent any coherent interaction of intra-cavity pulses propagating along the two polarization axes at any coupling point, e.g., fiber splices. Such coherent interactions can generally produce temperature and fiber stress dependent instabilities, which are preferably avoided. Similarly, no all-fiber elements for controlling the spot size on an intra-cavity saturable absorber were described in '741 and '867.

Another method for producing an integrated cavity was introduced by Sharp et al. (U.S. Pat. No. 5,666,373 ('373)) where the use of a saturable absorber as an output coupler is described. A limitation with such designs is the required precision-polishing and AR-coating at the back-end of the saturable absorber to avoid the formation of satellite pulses inside the cavity.

The construction of high-power modelocked fiber lasers, as enabled by the use of multi-mode fibers inside a fiber laser cavity, is taught in U.S. Pat. No. 6,275,512 ('512) to Fermann et al.

A passively modelocked fiber laser particularly suitable for producing pulses with a bandwidth approaching the bandwidth of the gain medium was suggested in U.S. Pat. No. 5,617,434 ('434) to Tamura et al. where fiber segments with opposing dispersion values were implemented. This design has limited functionality due to the presence of at least two long lengths of fiber with different dispersion coefficients for dispersion compensation, as well as the presence of non-polarization maintaining fiber, greatly complicating polarization control inside the cavity.

The design principles used in the patents mentioned above were reiterated in a series of recent patents and applications to Lin et al. (U.S. Pat. No. 6,097,741; U.S. Pat. No. 6,373,867, and Application No. US2002/0071454). The designs described in U.S. Pat. Nos. '741 and '867 lack appropriate all-fiber, high polarization extinction, polarizing elements that are generally required to minimize the formation of satellite pulses at the fiber output. Moreover, these patents do not describe all-fiber means to control the spot size on the intra-cavity saturable absorber; control of the spot size is required to optimize the life-time of the saturable absorber. Equally none of the prior art describes ion-implanted saturable absorber designs with controlled ion depth penetration.

SUMMARY

One embodiment of the invention comprises a pulsed fiber laser outputting pulses having a duration and corresponding pulse width. The pulsed laser comprises a modelocked fiber oscillator, an amplifier, a variable attenuator, and a compressor. The a modelocked fiber oscillator outputs optical pulses. The amplifier is optically connected to the modelocked fiber oscillator to receive the optical pulses. The amplifier comprises a gain medium that imparts gain to the optical pulse. The a variable attenuator is disposed between the modelocked fiber oscillator and the amplifier. The variable attenuator has an adjustable transmission such that the optical energy that is coupled from the mode-locked fiber oscillator to the amplifier can be reduced. The compressor compresses the pulse thereby reduces the width of the pulse. Preferably a minimum pulse width is obtained.

Another embodiment of the invention comprises a method of producing compressed high power short laser pulses having an optical power of at least about 200 mW and a pulse duration of about 200 femtoseconds or less. In this method, longitudinal modes of a laser cavity are substantially mode-locked to repetitively produce a laser pulse. The laser pulse is amplified. The laser pulse is also chirped thereby changing the optical frequency of the optical pulse over time. The laser pulse is also compressed by propagating different optical frequency components of the laser pulse differently to produce compressed laser pulses having a shortened temporal duration. In addition, the laser pulse is selectively attenuated prior to the amplifying of the laser pulse to further shorten the duration of the compressed laser pulses.

Another embodiment of the invention comprises a method of manufacturing a high power short pulse fiber laser. This method comprises mode-locking a fiber-based oscillator that outputs optical pulses. This method further comprises optically coupling an amplifier to the fiber-based oscillator through a variable attenuator so as to feed the optical pulses from the fiber-based oscillator through the variable attenuator and to the amplifier. The variable attenuator is adjusted based on a measurement of the optical pulses to reduce the intensity of the optical pulses delivered to the amplifier and to shorten the pulse.

Another embodiment of the invention comprises a pulsed fiber laser outputting pulses having a pulse width. The pulsed fiber laser comprises a modelocked fiber oscillator, an amplifier, and a spectral filter. The modelocked fiber oscillator produces an optical output comprising a plurality of optical pulses having a pulse width and a spectral power distribution having a bandwidth. The amplifier is optically connected to the modelocked fiber amplifier for amplifying the optical pulses. The spectral filter is disposed to receive the optical output of the modelocked fiber oscillator prior to reaching the amplifier. The spectral filter has a spectral transmission with a band edge that overlaps the spectral power distribution of the optical output of the modelocked fiber oscillator to attenuate a portion of the spectral power distribution and thereby reduce the spectral bandwidth. The pulse width of the optical pulses coupled from the mode lock fiber oscillator to the fiber amplifier is thereby reduced.

Another embodiment of the invention comprises a method of producing compressed optical pulses. In this method, longitudinal modes of a fiber resonant cavity are substantially mode-locked so as to produce a train of optical pulses having a corresponding spectral power distribution with a spectral bandwidth. The optical pulses are amplified and compressed to produce compressed optical pulses. The spectral bandwidth of the spectral power distribution is reduced such that the compressed optical pulses have a shorter duration.

Another embodiment of the invention comprises a pulsed fiber laser comprising a modelocked fiber oscillator, an amplifier, one or more optical pump sources, a pulse compressor, and a pre-compressor. The modelocked fiber oscillator comprises a gain fiber and a pair of reflective optical elements disposed with respect to the gain fiber to form a resonant cavity. The modelocked fiber oscillator produces a train of optical pulses having an average pulse width. The amplifier is optically connected to the modelocked fiber amplifier such that the optical pulses can propagate through the amplifier. The fiber amplifier amplifies the optical pulses. The one or more optical pump sources are optically connected to the modelocked fiber oscillator and the fiber amplifier to pump the fiber oscillator and fiber amplifier. The pulse compressor is optically coupled to receive the amplified optical pulses output from fiber amplifier. The pulse compressor shortens the pulse width of the optical pulses output by the fiber amplifier. The pre-compressor is disposed in an optical path between the modelocked fiber oscillator and the fiber amplifier. The pre-compressor shortens the duration of the optical pulses introduced into the fiber amplifier such that the pulse duration of the optical pulses output by the compressor can be further shortened.

Another embodiment of the invention comprises a method of generating short high power optical pulses. The method comprises substantially mode-locking optical modes of a laser cavity to produce an optical signal comprising a plurality of laser pulses having an average pulse width. The optical signal comprises a distribution of frequency components. The method further comprises compressing the optical pulses and amplifying the compressed optical pulses to produce amplified compressed optical pulses. The amplified compressed optical pulses are further compressed subsequent to the amplifying using a dispersive optical element to differentiate between spectral components and introducing different phase shifts to the different spectral components.

Another embodiment of the invention comprises a pulsed fiber laser comprising a modelocked fiber oscillator, a fiber amplifier, an optical pump source, and a pulse compressor. The modelocked fiber oscillator outputs optical pulses. The fiber amplifier is optically connected to the modelocked fiber oscillator and amplifies the optical pulses. The optical pump source is optically connected to the fiber amplifier. The pulse compressor is optically coupled to receive the amplified optical pulses output from fiber amplifier. The pulsed fiber laser further comprises at least one of (i) a first optical tap in the optical path between the modelocked fiber oscillator and the fiber amplifier and a first feedback loop from the first tap to control the modelocked fiber oscillator based on measurement of output from the first optical tap, and (ii) a second optical tap in the optical path between the fiber amplifier and the compressor and a second feedback loop from the second tap to control the fiber amplifier based on measurement of output from the second optical tap.

Another embodiment of the invention comprises a pulsed light source comprising a light source module, an isolator module, an amplifier module, and a compressor module. The light source module comprises an optical fiber and outputs optical pulses. The isolator module comprises an optical isolator in a housing having input and output fibers. The input fiber is optically coupled to the optical fiber of the light source module. The optical isolator is disposed in an optical path connecting the input and output fibers such that the optical pulses introduced into the input fiber are received by the isolator and permitted to continue along the optical path to the output coupler. The amplifier module comprises an amplifying medium and has an optical input optically connected to the output fiber of the isolator module to amplify the optical pulses. The compressor module is optically coupled to the amplifier module to compress the optical pulses.

The present invention is directed to a mass-producible passively modelocked fiber laser. By incorporating apodized fiber Bragg gratings, integrated fiber polarizers and concatenated sections of polarization-maintaining and non-polarization-maintaining fibers, a fiber pig-tailed, linearly polarized output can be readily obtained from the laser. By further matching the dispersion value of the fiber Bragg grating to the inverse, or negative, of the dispersion of the intra-cavity fiber, the generation of optimally short pulses with a large optical bandwidth can be induced. In this regard, either positive dispersion fiber in conjunction with negative dispersion fiber gratings or negative dispersion fiber in conjunction with positive dispersion fiber gratings can be implemented. Preferably, the dispersion characteristics of the fiber Bragg grating and the dispersion characteristics of the rest of the intra-cavity elements are matched to within a factor of three. Even more preferably, these characteristics are matched within a factor of two, or within a factor in the range of 1.0 to 2.0. Also preferably, the Bragg grating has a chirp rate greater than 80 nm/cm. More preferably, the Bragg grating has a chirp rate greater than 160 nm/cm. Most preferably, the Bragg grating has a chirp rater greater than 300 nm/cm. To maximize the output power and the pulse repetition rate, the use of wide-bandwidth fiber Bragg gratings with low absolute dispersion is preferable. These fiber Bragg gratings are also used as end-mirrors for the cavity and allow the transmission of pump light to the intra-cavity gain fiber. The fiber Bragg gratings are conveniently produced using phase masks.

Alternatively, fiber couplers can be used inside the fiber cavity. Generally, sections of polarization-maintaining and non-polarization-maintaining fiber can be concatenated inside the fiber cavity. The non-polarization-maintaining section should then be short enough so as not to excessively perturb the polarization state. Intra-cavity sections of non-polarization-maintaining fiber preferably comprise all-fiber polarizers to lead to preferential oscillation of one linear polarization state inside the cavity. Similarly, when directly concatenating polarization-maintaining fiber sections, the length of the individual section should be long enough to prevent coherent interactions of pulses propagating along the two polarization axes of the polarization-maintaining fibers, thereby ensuring a maximum in pulse stability.

Saturable absorber mirrors (SAMs) placed inside the cavity enable passive modelocking. The saturable absorbers (SA) can be made from multiple quantum wells (MQW) or bulk semiconductor films. These saturable absorbers have preferably a bi-temporal life-time with a slow component ($\gg$100 ps) and a fast component ($\ll$20 ps). The realization of the bi-temporal dynamics of the optical nonlinearity is achieved by tailoring the depth profile of the ion-implantation in combination with the implantation dose and energy. The result is that the carriers trap at distinctively different rates in different depth regions of the SAM.

Saturating semiconductor films can for example be grown from aluminum-containing material such as AlGaInAs, the exact composition can be selected depending on the sought band-gap (typically selected to be in the vicinity of the desired operating wavelength of the laser system) and it is also governed by the requirement of lattice-match between the saturating semiconductor film and an underlying Bragg mirror or any other adjacent semiconductor material. Compositional requirements enabling lattice match between semiconductors and/or a certain bandgap are well known in the state of the art and are not further explained here.

In aluminum containing semiconductors the surface area can induce a low optical damage threshold triggered by oxidization of the surface. In order to prevent optical damage of aluminum containing surface areas a passivation layer, e.g., InP, InGaAs or GaAs, is incorporated. SA degradation is further minimized by optimizing the optical beam diameter that impinges on the SAM. In one implementation the SAM and an intra-cavity fiber end can be either butt-coupled or brought into close contact to induce modelocking. Here, the incorporation of a precision AR-coating on the intra-cavity fiber end minimizes any bandwidth restrictions from etalon formation between the SAM and the fiber end. Etalons can also be minimized by appropriate wedging of the fiber ends. The beam diameter inside the SAM can be adjusted by implementing fiber ends with thermally expanded cores. Alternatively, focusing lenses can be directly fused to the fiber end. Moreover, graded-index lenses can be used for optimization of the focal size and working distance between the fiber tip and SA surface.

Wavelength tuning of the fiber lasers can be obtained by heating, compression or stretching of fiber Bragg gratings or by the incorporation of bulk optic tuning elements.

The use of bi- or multi-temporal saturable absorbers allows the design of dispersion compensated fiber laser operating in a single-polarization state, producing pulses at the bandwidth limit of the fiber gain medium. Additional spectral broadening can be obtained by launching these pulses into highly nonlinear fibers, allowing for the generation of broad-bandwidth pulses with bandwidths exceeding one octave for use in optical coherence tomography or in precision metrology.

BRIEF DESCRIPTION OF THE DRAWINGS

FIG. 2A schematically illustrates one embodiment of a fiber based oscillator;

FIG. 2B schematically illustrates one embodiment of a fiber based oscillator having a filter inside the cavity to remove dispersive wave side-peaks in a soliton oscillator;

DETAILED DESCRIPTION OF CERTAIN EMBODIMENTS

Figure 1:
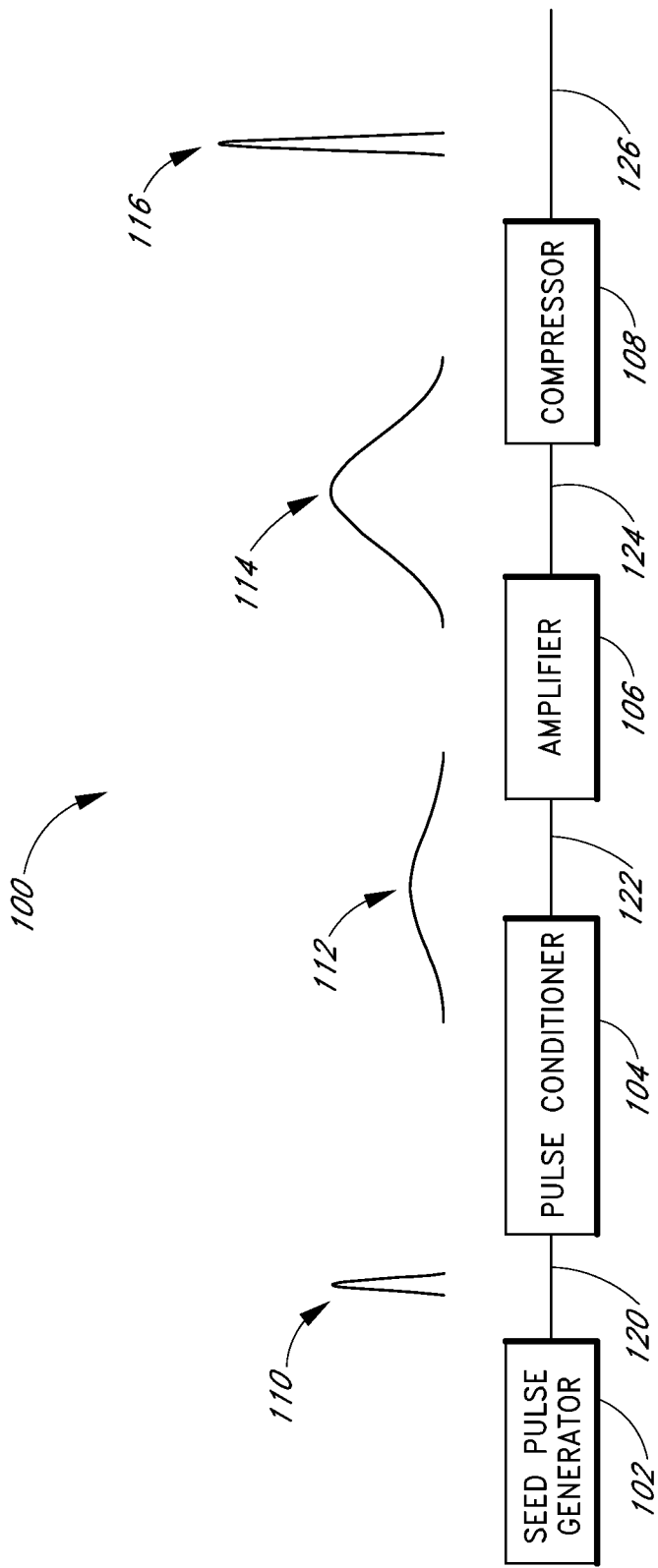
FIG. 1 illustrates a generalized modular approach to forming a high power laser pulse.

These and other aspects, advantages, and novel features of the present teachings will become apparent from the following detailed description and with reference to the accompanying drawings. In the drawings, similar elements have similar reference numerals.

FIG. 1 illustrates an overall concept of a pulse laser system 100 that outputs a high power short pulse 116. Preferably, the output pulse 116 has a temporal width that is less than approximately 200 femtoseconds (fs), and an average power that is greater than approximately 200 milliwatts (mW). It will be noted that these exemplary performance parameters are in no way intended to limit the scope of the present teachings.

To achieve a clean short pulse, several techniques can be included such as for example inclusion of attenuators, spectral filters, and compression elements as discussed more fully below. Use of one or more of such components can provide pulse widths of about 90 fs or less and average power of 200 mW or more.

Another aspect of the present teachings relates to a modular design approach where various components can be packaged as modules and the modular components can then be connected as needed. Some modules may comprise optical elements such as bulk optics or planar waveguides packaged in a housing that shields various optical elements from the operating environment. Fiber pigtails may extend from these housing, which may include thermal insulation and may be hermetically sealed. The fiber pigtails, potentially enable seamless connection to other modules via, e.g., optical fiber fusion splices. Packaging in such casing may be particularly advantageous for modules containing bulk or physical optics and opto-mechanical elements, in contrast to fiber elements, which may not require such encasement.

Such a system using fiber based components or packages having fiber inputs and outputs can benefit from the compact nature of the components, as well as effective and compact coupling afforded by splicing of the fibers. The optics within the modules preferably comprise micro-optics and fiber optics or other waveguide elements. Accordingly, the modules may be small and have reduced form factor. The modular approach may also simplify repair and alteration of laser systems as the modules can be readily substituted or replaced and re-spliced into place in the laser system.

As shown in FIG. 1, an exemplary laser system 100 comprises a seed pulse generator 102 optically coupled to a pulse conditioner 104 by a coupling 120. The seed pulse generator 102 provides a seed pulse 110 to the pulse conditioner 104. One way to amplify a short pulse in an amplifier is to broaden the pulse, lowering the amplitude of the pulse feed to the amplifier. Such an amplitude-lowered pulse can then be amplified to increase the amplitude, preferably within the linearity region of the amplifier. The amplified pulse having a broadened width can then be compressed to yield a relatively high amplitude and relatively short pulse output.

In FIG. 1, the pulse conditioner 104 is depicted as broadening its input seed pulse 110 to yield a broad and low amplitude pulse 112. The laser system 100 further comprises an amplifier 106 optically coupled to the conditioner 104 by a coupling 122. The amplifier 106 is depicted as amplifying the amplitude of the broadened pulse 112 to yield an amplified broad pulse 114. The amplified broad pulse 114 is depicted as being compressed by a compressor 108 (that is coupled to the amplifier 106 by a coupling 124) to yield an amplified short pulse output 116 as an output 126. This compressor 108 may be excluded in certain cases in embodiments described below.

It will be understood that this simplified description of pulse amplification is exemplary of a general process of amplifying a short pulse. It will also be understood, and as described below, that pulse conditioning can involve optical operations other than temporally stretching of the seed pulse. Other variations can be incorporated into the laser system to accommodate various design goals and operating conditions. Some of such design considerations are described below in greater detail. In some embodiments, for example, the pulse conditioner 104 and/or compressor 108 may be excluded. Other variations in the configuration and implementation of the laser system 100 are also possible.

In some embodiments, the seed pulse generator 102 comprises an oscillator having a rare earth doped fiber. Dopants may include, for example, Er, Yb, Nd or combinations thereof as well as other materials. The doped fiber can be single clad or double clad and may be polarization maintaining or non-polarization maintaining. Both active and passive modelocking techniques can be used to generate short and ultra-short pulses in the rare-earth doped fiber, with the passive one simpler and intrinsically more stable. Three common passive mode-locking techniques involve a saturable absorber being part of the cavity, nonlinear polarization evolution, or a combination thereof. In certain applications, passive modelocking techniques based on saturable absorbers are preferred and permit the construction of relatively simple and reliable cavities. Additional details regarding passive mode-locking techniques are disclosed in a copending U.S. patent application Ser. No. 10/627,069 filed on Jul. 25, 2003, by M. E. Fermann, and G. C. Cho entitled "Polarization Maintaining Dispersion Controlled Fiber Laser Source Of Ultrashort Pulses", which is hereby incorporated herein by reference in its entirety.

The amplifier may comprise a fiber amplifier having a gain fiber such as a doped fiber. The amplifier, however, should not be limited to fiber amplifiers. Similarly, the amplifier may comprise a parabolic pulse amplifier as described in copending U.S. patent application Ser. No. 09/576,772 filed May 23, 2000, by M. E. Fermann, A. Galvanauskas, and D. Harter entitled "Modular, high energy, widely-tunable ultrafast fiber source", which is hereby incorporated herein by reference in its entirety. Other types of amplifiers, however, may be employed as well.

FIG. 2A illustrates one embodiment of a fiber-based oscillator 130 that can provide a passive modelocked seed pulse. The exemplary oscillator 130 comprises a saturable absorber 132 and a Yb-doped gain fiber 140 that is pumped by a pump diode 148 via a pump coupler 146. (Yb-doped fiber is a good candidate, for example, in the spectral range from 1.0 μm to 1.1 μm because Yb ions present a large absorption cross section near 980 nm which allows to be pumped with low-cost commercially available laser diodes. In addition, the large fluorescence spectral range of this fiber enables the short pulse generation.) The pump diode 148 shown in FIG. 2A may be a part of the integrated oscillator module, or may be a separate module that provides an input to the oscillator module. The oscillator 130 further comprises an output fiber 144 coupled from the gain fiber 140 via a fiber grating 142. The fiber grating 142 can function as a dispersion controlling element and at the same time serve as an output coupler.

In one embodiment, the oscillator cavity fiber comprises a section of Yb-doped polarization maintaining gain fiber. The oscillator cavity fiber can further comprise an undoped polarization maintaining fiber section for controlling the total intracavity dispersion. In some embodiments, the length of this undoped portion is selected such that the undoped portion of fiber together in combination with doped fiber and the chirped fiber Bragg grating (one embodiment of the fiber grating 142) provides a zero or negative total dispersion in the cavity.

In one embodiment, the cavity fiber is relatively shorter. The use of a shorter gain fiber 140 is typically associated with a high pumping rate, thus driving the gain dynamics closer to a saturation level than that associated with a longer fiber. In addition, the population variation in the ground state of Yb dopants becomes less susceptible to the environmental temperature variation. These effects enhance the operational stability of the oscillator 130 that is exposed to variation of environmental temperature. In one embodiment, oscillator output stability is demonstrated by a dependency of output on environmental fiber temperature that is less than approximately 0.5%/C, presuming that other modules are kept at a substantially constant temperature.

As shown in FIG. 2A, the exemplary oscillator 130 further comprises an assembly of optical elements that optically couples the saturable absorber 132 to the gain fiber 140. In one embodiment, the assembly of optical elements comprises lenses 134 and 138 that collimate and focus the light between the fiber 140 and the saturable absorber 132. The assembly can further comprise a polarizer 136. These components can be include in a housing with a fiber pigtail as discussed more fully in connection with FIG. 11A.

One embodiment of the exemplary fiber oscillator in FIG. 2A can generate pulses with a spectral bandwidth in the range of approximately 1 to 30 nm, depending on the dispersion parameter of the fiber Bragg grating 142 used. With a high negative dispersion fiber Bragg grating 142, a narrow bandwidth pulse can be generated. Side peaks can also be generated due dispersive wave shedding by the soliton in the oscillator. Such side peaks can be substantially removed by including a bandpass filter.

FIG. 2B illustrates one embodiment of an oscillator 150 that includes a bandpass filter 165 inside the cavity. Such a filter can remove the side peaks associated with the high negative dispersion fiber Bragg grating described above in reference to FIG. 2A, while maintaining a substantially similar spectral bandwidth.

In one embodiment, the bandwidth of the filter 165 can be predetermined within approximately 1-2 nanometer accuracy by analytical or experimental analysis of the system. Another method is to use a rotatable dielectric bandpass filter and rotate the filter to a different incidence angle and utilize the associated etalon effect to provide a variation of the spectral position and width. Yet another method is to modify the spectral shape of the transmission, for example using v- or u-type coating used in the dielectric coating industry. Such a filter can substantially eliminate side lobes in the spectrum, which may originate from nonlinear phase distortion at excessive gain or from high-order soliton formation.

As shown in FIG. 2B, the exemplary oscillator 150 having the bandpass filter 165 is depicted as being generally similar in design to the exemplary oscillator 130 of FIG. 2A. Saturable absorber 152, lenses 154, 158, polarizer 156, gain fiber 160, fiber grating 162, output fiber 164, pump coupler 166, and pump diode 168 can correspond to the saturable absorber 132, lenses 134, 138, polarizer 136, gain fiber 140, fiber grating 142, output fiber 144, pump coupler 146, and pump diode 148 of the oscillator 130. The oscillator 150 is illustrated for the purpose of describing the possible use of the bandpass filter 165. Thus, it will be understood that such a similarity in two exemplary embodiments of the oscillators should in no way be construed to limit the design of the oscillator to such a configuration.

As described above in reference to FIG. 2B, the high negative dispersion fiber grating and the associated side lobe effect can be mitigated by the use of the bandwidth filter. When a low negative dispersion grating is used, the oscillator (e.g., 130 in FIG. 2A) can generate large bandwidth spectrum, and substantially no side peak is observed.

Figure 2C:
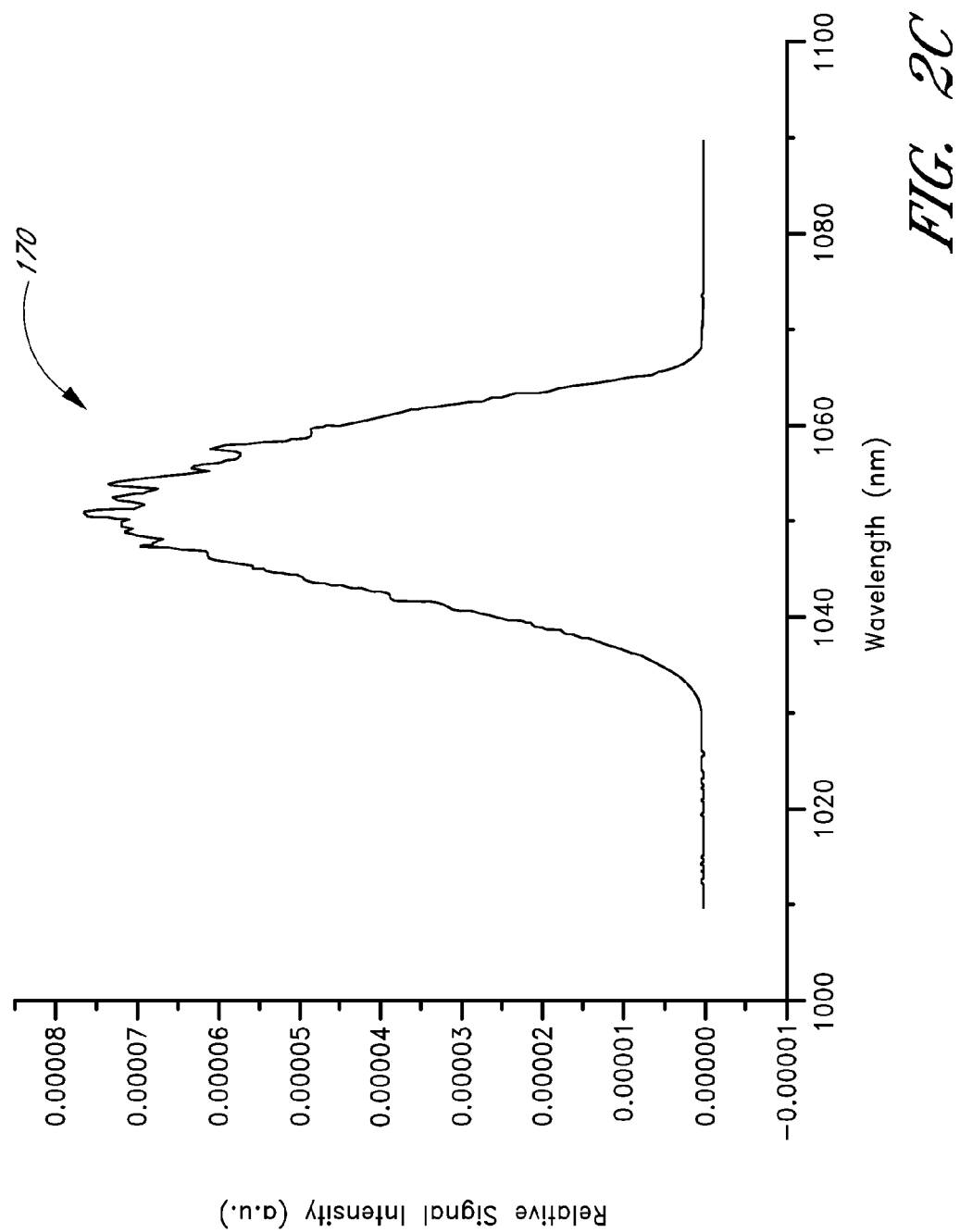
FIG. 2C illustrates an exemplary optical spectrum output by the oscillator.

FIG. 2C illustrates an exemplary spectrum 170 generated by the oscillator described above in reference to FIG. 2A, where the fiber Bragg grating has a dispersion of approximately $-0.11$ ps$^2$. The spectral bandwidth of this oscillator output is around 19 nm.

It will be appreciated that although the oscillator (130 and 150 in FIGS. 2A and B) is described as a fiber oscillator, the concepts of the present teachings are not limited to such oscillators. The modular oscillator can be any type of a pulsed laser preferably that outputs pulses with a temporal width preferably less than approximately 500 ps. The spectral bandwidth of the seed output from the oscillator is preferably greater than or equal to about 8 to 10 nm, although the bandwidth may be outside this range. As described herein, however, the fiber-based laser is preferred for compact packaging reasons. Other waveguide-based lasers are also possible and may yield compact designs as well.

As described more fully below, the oscillator 130, 150 or portions thereof may be packaged in a housing that provides a substantially stable support for optical elements. Such a housing preferably offers protection from the environment and improves performance stability of the optical devices. The packages may include fiber pigtail inputs and/or fiber pigtail outputs, which may be connected to other components. These pigtails may comprise single mode polarization maintaining fiber although other types of pigtail fibers may be employed. Some of the components in the laser system may also comprise optical fiber or fiber components that are not enclosed in a housing but that are spliced to the fiber pigtails.

FIGS. 3-9 now illustrate block diagrams of various possible ways of conditioning the seed pulse generated by the oscillator module. FIGS. 3A-C illustrate three exemplary embodiments of a basic modular design for producing high power and short pulses. As shown in FIG. 3A, one embodiment of a laser system 180 comprises an oscillator 182 coupled to an amplifier 186 via an isolator 184. The isolator 184 between the oscillator 182 and the amplifier 186 may comprise an independent modular component, or may include the fiber Bragg grating described above in reference to FIGS. 2A and B. In the latter case, at least a portion of the functional blocks of oscillator 182 and the isolator 184 may be physically packaged in a same module. The inclusion of the isolator is to provide a barrier to block any back reflection from the downstream back to the upstream such as oscillator or amplifier so as to maintain a stable operation, see FIG. 11C for detail. The output of the amplifier 186 is also coupled to a compressor module 190 via an isolator 188.

Figure 3A:
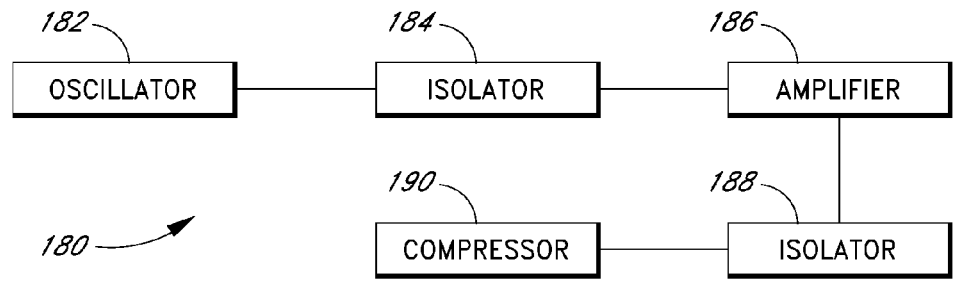
FIGS. 3A-C illustrate various exemplary combinations and arrangements of modular components of a laser for generating a high power short pulse output.
Figure 3B:
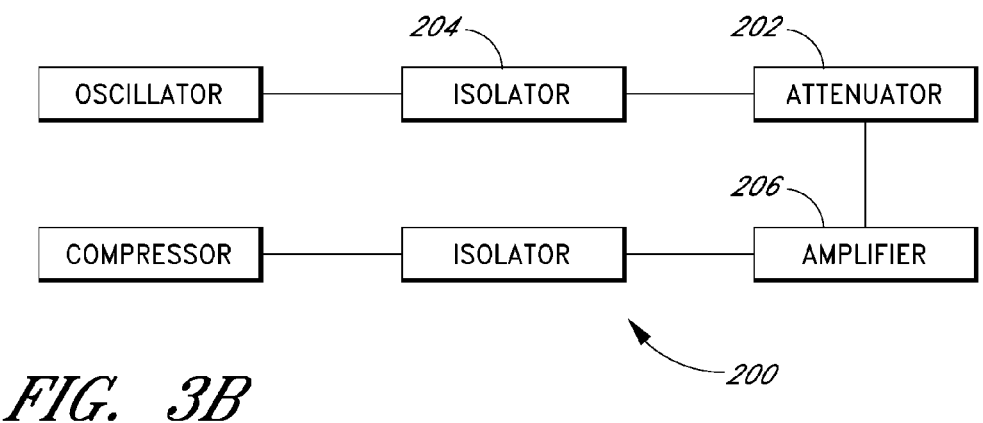

FIG. 3B illustrates another embodiment of a basic design of a laser system 200 comprising an oscillator 182 and an amplifier 206 with an attenuator 202 therebetween. This laser system 200 further comprises an isolator 204 between the oscillator and the amplifier. The attenuator 202 is disposed after the isolator 204 and before of the amplifier 206.

Figure 3C:
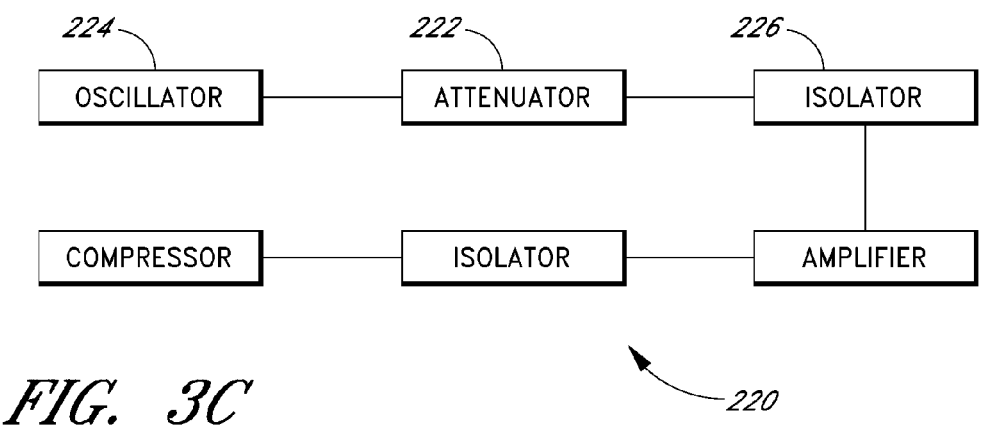

FIG. 3C illustrates another embodiment of a basic design of a laser system 220 also comprising an oscillator and an amplifier with an attenuator 222 therebetween. The attenuator 222 is disposed after the oscillator 224 and before the isolator 226.

Preferably the attenuator is a variable attenuator and has a variable transmission that can be controlled in the range of about 1~20 dB. Such variable attenuation can be advantageously employed in the manufacture and tuning of the laser systems.

Fiber amplifiers exhibit a variation in performance from to unit to unit. As a result, different amplifiers that are incorporated into the lasers during manufacturing may require different amplitude input pulses to provide similarly operating lasers. To accommodate such variation in amplifier performance, an adjustable attenuator such as shown in FIGS. 3B-3C may be included in the laser system. During fabrication of the laser, the components may be tested and the attenuator adjusted to provide a suitable amplitude for the optical pulse to the amplifier. In such a manner, substantially standardized laser performance can be achieved for a particular product.

Different measurements and analysis of these measurements may be employed to determine the suitable adjustment to the variable attenuator. For example, pulse power and/or pulse width may be measured or spectral measurements may be employed. Measurements may be obtained before or after the attenuator or at the output of the amplifier or the laser, or elsewhere. Other measurements may be used as well and likewise the measuring and evaluation techniques should not be limited to those recited herein. The attenuator, however, can be adjusted in response to such measurements This variable attenuator may comprise a rotatable waveplate and a polarization beamsplitter such as a MacNeille polarizer. The waveplate can be rotated to vary the distribution of light into orthogonal polarizations. The polarization beamsplitter can be used to direct a portion of the light out of the laser, depending on the state of the waveplate. Accordingly, a user, by rotating the waveplate and altering the polarization of light can control the amount of light reaching the amplifier and thereby adjust the system. Preferably, the waveplate and the MacNeille polarizer comprise micro-optics or are sufficiently small to provide for a compact laser system. These optical elements are also preferably packaged in a housing that may include fiber pigtail connections as shown in FIG. 11B. Lenses, mirrors, or other coupling elements may be employed to couple light from and to the pigtail inputs and outputs. The optics, e.g., waveplate, MacNeille polarizer, coupling lens, mirrors, etc., may be mounted to the housing to provide alignment and support. The housing may also provide protection from the environment and may be thermally insulating and possibly hermetically sealed. Preferably, however, the module formed by the optics and the housing are compact and rugged.

Other types of attenuator modules may alternately be employed. Variable attenuation need not be provided by a waveplate and a polarization selective optical element. Fiber or waveguide elements may be used as well. Such variable attenuation may be controlled manually or automatically. Various other designs are possible.

The system configuration may be varied as well. Pulse stretching need not always be incorporated in the laser system. For example, in a fiber amplifier system with sub-microjoule pulse energy, a few picosecond of seed pulse can be sufficiently long to reduce the nonlinear phase modulation in the amplifier fiber significantly. Thus, employment of a pulse stretcher in form of a long length of fiber or chirped fiber Bragg grating in generally may not necessarily be required in such a case.

In general, the preconditioning of the seed pulse property in the time-domain alone, e.g., stretching pulse width, is not always a suitable method for generating high quality amplified pulses. In a variety of cases, manipulation of the seed pulse by the seed pulse generator may readily provide sufficient degree of freedom for pulse recompression The outcome may not necessarily be the most preferred, however, depending on the target property of the recompressed pulses, such an approach significantly simplifies the technical complexity of the pulse controlling method.

Figure 4A:
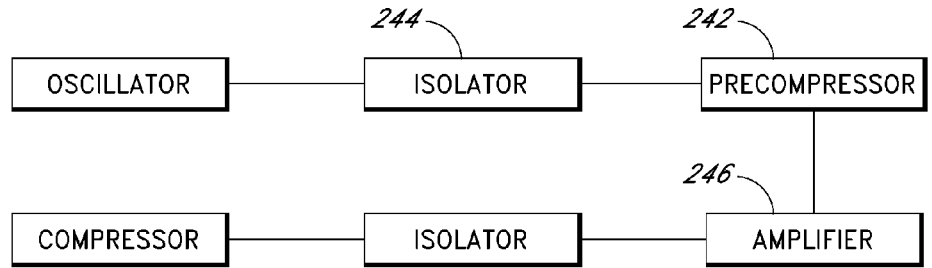
FIGS. 4A-C illustrate the use of a pre-compressor to shorten the seed pulse width prior to amplification in the exemplary modular lasers.
Figure 4B:
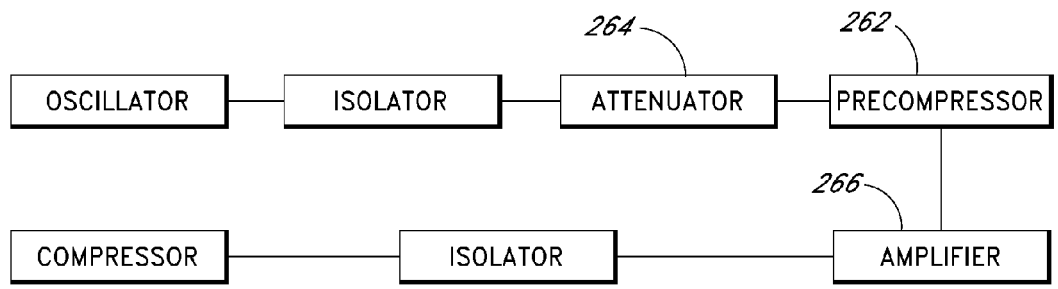
Figure 4C:
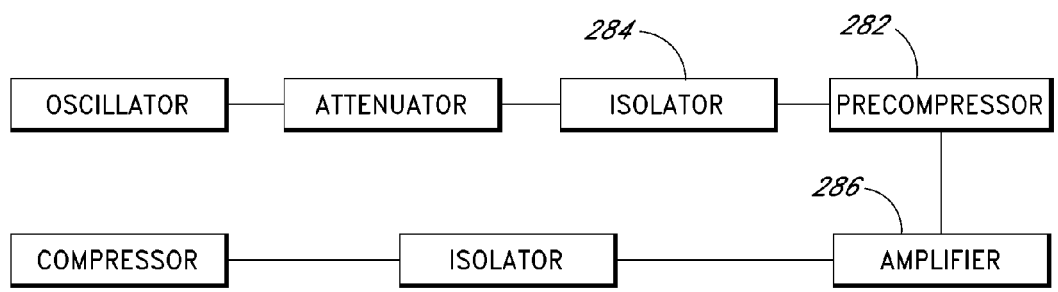

FIGS. 4A-C illustrate how an input seed to an amplifier can be further conditioned to improve the manner in which the laser system operates. For the purpose of description, the exemplary designs shown in FIGS. 4A-C build on the exemplary basic designs described above in reference to FIGS. 3A-C.

In general, the output pulse from an oscillator is delivered to an amplifier for higher power. As a result of the delivery fiber(s) between the oscillator and the amplifier, the pulse width may be stretched. For example, approximately 2 meters of delivery fiber may correspond to approximately 1 ps pulse width increase. A preferred seed pulse width, however, can be characterized as being less than approximately 1 ps.

To obtain a clean and shorter pulse after a compressor, several techniques can be used to preferably make the seed pulse width shorter prior to reaching the amplifier. One method is to pre-compress the seed pulse before injecting it into the amplifier. In one embodiment, use of a pre-compressing component can yield a pre-compressed seed pulse having a pulse width less than about 1 ps and preferably as low as approximately 150 fs. Such a pre-compressed seed pulse fed into the amplifier can yield an amplifier output having a spectral bandwidth that is greater than approximately 30 nm due to nonlinear effect. Such an amplifier output can be compressed by a compressor to yield a final pulse having a width of approximately 100 fs.

As shown in FIG. 4A, one embodiment of an exemplary laser system 240 is similar to the exemplary basic design of FIG. 3A. A modular pre-compressor component 242 is disposed in an optical path between an isolator 244 and an amplifier 246. The pre-compressor 242 pre-compresses pulses being output by the isolator 244 prior to being injected into the amplifier 246.

FIG. 4B illustrates one embodiment of an exemplary laser system 260 that is similar to the exemplary basic system of FIG. 3B and that includes an attenuator 264. A modular pre-compressor component 262 is disposed in an optical path between the attenuator 264 and an amplifier 266. The pre-compressor 262 pre-compresses pulses being output by the attenuator 264 prior to being injected into the amplifier 266.

FIG. 4C illustrates one embodiment of an exemplary laser system 280 that is similar to the exemplary basic system of FIG. 3C. A modular pre-compressor component 282 is disposed in an optical path between an isolator 284 and an amplifier 286. The pre-compressor 282 pre-compresses pulses being output by the isolator 284 prior to being injected into the amplifier 286.

The pre-compressor may comprise bulk, fiber, or other waveguide optics. Examples of components that may comprise the pre-compressor module include a bulk grating pair, a single grating (e.g., bulk or waveguide), a prism pair, etc. Fiber components such as chirped fiber Bragg gratings may also be employed. Other fiber and non-fiber components may be employed as well. In some embodiments, the components are encapsulated in a housing that provides for substantially stable mounting therein, as well as protection from the environment. The housing may further comprises a fiber pigtail input and/or a fiber pigtail output. Such pigtail fibers can be spliced in a manner described above.

Figure 5A:
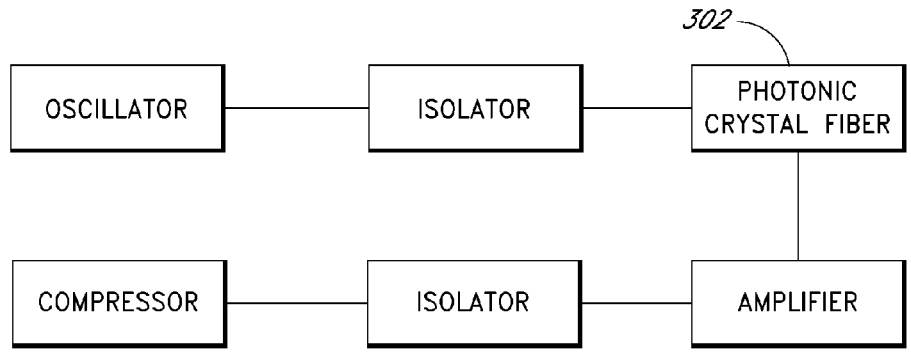
FIGS. 5A-C illustrate the use of a photonic crystal fiber as a pre-compressor.
Figure 5B:
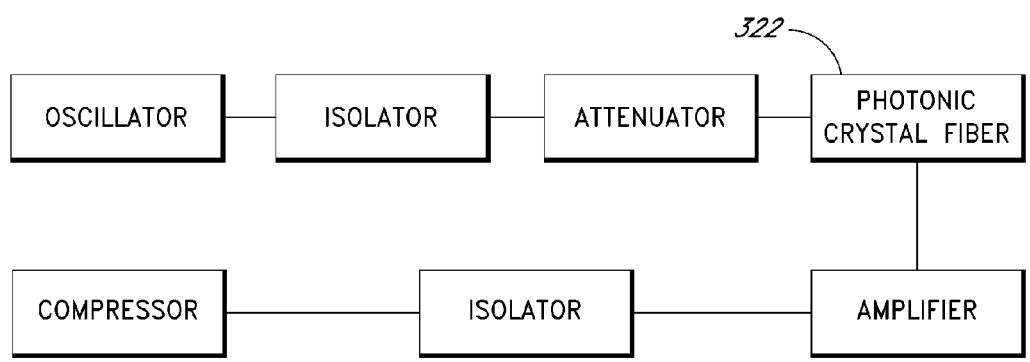
Figure 5C:
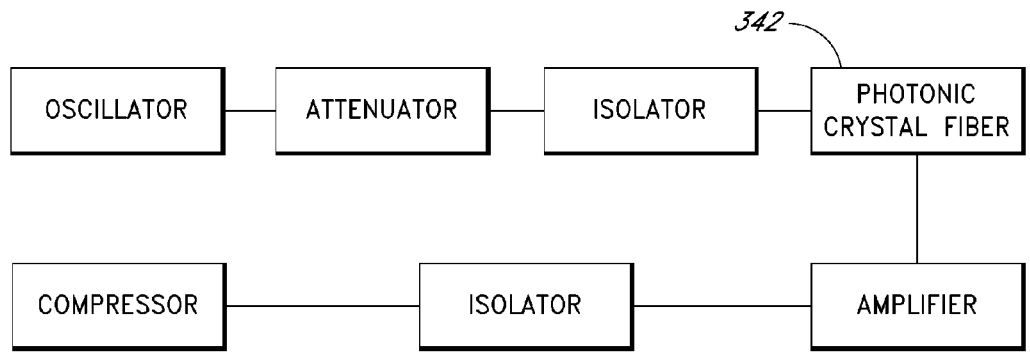

FIGS. 5A-C now illustrate the use of a photonic crystal fiber as a pre-compressor. Photonic crystal fibers may be tailored to control their dispersion and to provide negative dispersion at the operating wavelength. In one embodiment, a short piece of a photonic crystal can result in the injection seed pulse (into the amplifier) being compressed to a femtosecond regime. Advantageously, the photonic crystal fiber, due to its fiber nature, can be incorporated conveniently into a laser system having other fiber based components such as by splicing, providing a seamless connection in a compact and rugged configuration.

FIG. 5A illustrates one embodiment of an exemplary laser system 300 that is similar to the exemplary laser system of FIG. 4A. The pre-compressor comprises a photonic crystal fiber 302 that is disposed in an optical path between the isolator and the amplifier.

FIG. 5B illustrates one embodiment of an exemplary laser system 320 that is similar to the exemplary laser system of FIG. 4B and includes an attenuator. The pre-compressor comprises a photonic crystal fiber 322 that is disposed in an optical path between the attenuator and the amplifier.

FIG. 5C illustrates one embodiment of an exemplary laser system 340 that is similar to the exemplary laser system of FIG. 4C and also includes an attenuator. The pre-compressor, however, comprises a photonic crystal fiber 342 that is disposed in an optical path between the isolator and the amplifier.

Figure 6A:
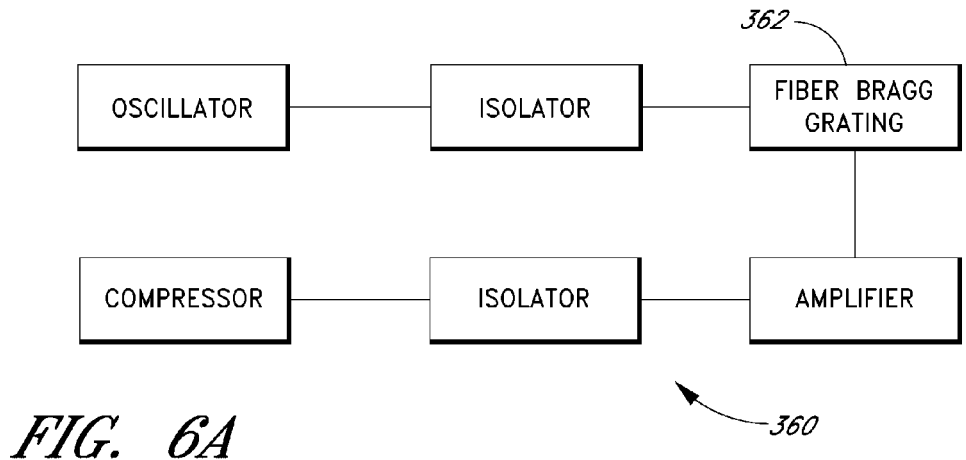
FIGS. 6A-C illustrate the use of a fiber Bragg grating as a pre-compressor.
Figure 6B:
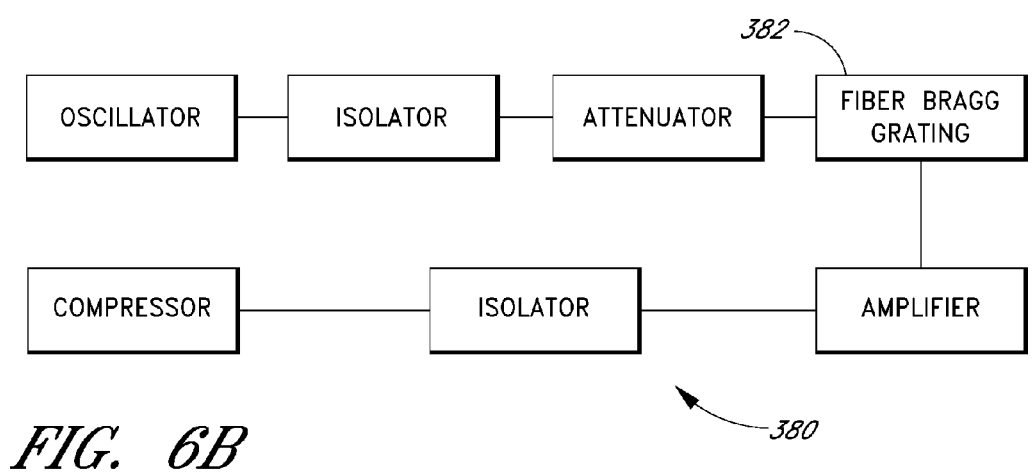
Figure 6C:
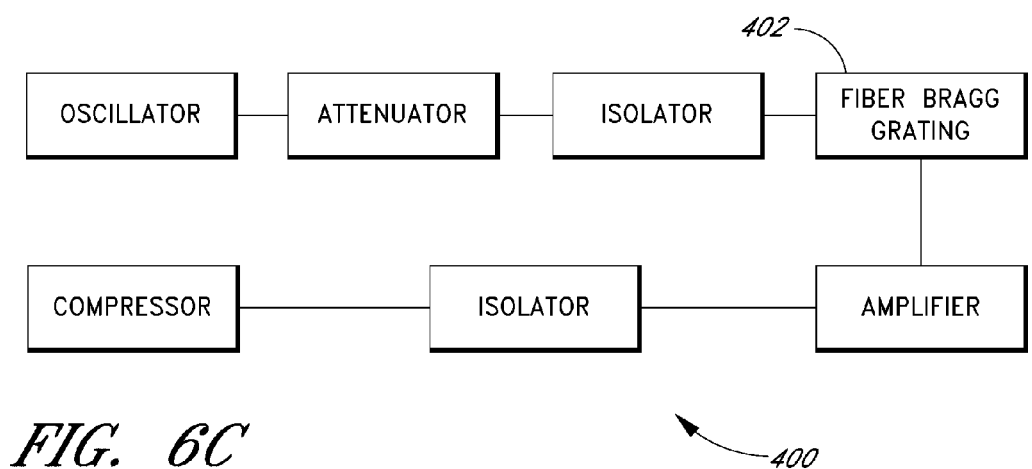

FIGS. 6A-C illustrate the use of a fiber Bragg grating as a pre-compressor. Advantageously, the fiber Bragg grating, due to its fiber nature, can be incorporated conveniently into a laser system having other fiber based components.

FIG. 6A illustrates one embodiment of an exemplary laser system 360 that is similar to the exemplary laser system of FIG. 4A. The pre-compressor comprises a fiber Bragg grating 362 that is disposed in an optical path between the isolator and the amplifier.

FIG. 6B illustrates one embodiment of an exemplary laser system 380 that is similar to the exemplary laser system of FIG. 4B and comprises an attenuator. The pre-compressor comprises a fiber Bragg grating 382 that is disposed in an optical path between the attenuator and the amplifier.

FIG. 6C illustrates one embodiment of an exemplary laser system 400 that is similar to the exemplary laser system of FIG. 4C and also comprises an attenuator. The pre-compressor comprises a fiber Bragg grating 402 that is disposed in an optical path between the isolator and the amplifier.

The nonlinearity in the amplifier can be a result of an interplay of different factors, such as gain shaping, inhomogeneous self-phase modulation, and higher order dispersion. Such factors can be highly sensitive to the spectral position within the whole pulse spectrum. One way to control these factors and thereby control the nonlinearity in the amplifier is to manipulate the spectrum being output from the oscillator. In one embodiment, a bandpass filter is used to select a portion of the oscillator spectrum to be amplified. At the same time, the filter can shorten the pulse width of the seed.

In various embodiments, bandpass, highpass, or lowpass filters may be employed to spectrally narrow and control a spectral power distribution of an optical output from the oscillator. Preferably, the filter has spectral transmission with a band edge that overlaps the spectral power distribution of the output pulses from the oscillator. The bandpass filter thereby attenuates a portion of the spectral power distribution and reduces the spectral bandwidth. The pulse width of the optical pulses coupled from the oscillator to the fiber amplifier are thereby reduced. Preferably, the resultant spectral bandwidth is between about 5 and 12 nm and preferably less than about 10 nm but may be outside this range.

The spectral filter may comprise, for example, a fiber or other waveguide devices such as a planar waveguide element or may comprise bulk optics. Examples of spectral filters include gratings, etalons, thin film coatings, etc. Preferably, the filter comprises micro-optics. In various preferred embodiments, the filter comprises a fiber elements such as a fiber Bragg grating that can be readily physically connected to a fiber based system in a compact robust manner. Other types of filters and configurations for providing spectral filtering may also be employed.

Figure 7A:
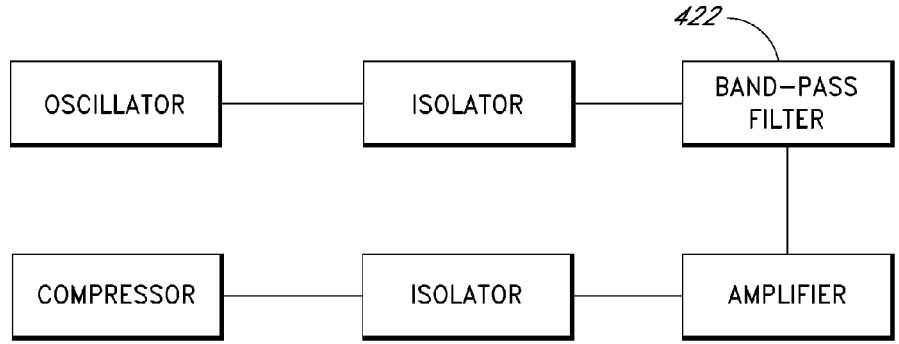
FIGS. 7A-C illustrate the use of a band-pass filter to select a part of the oscillator output spectrum and shorten the seed pulse prior to amplification.
Figure 7B:
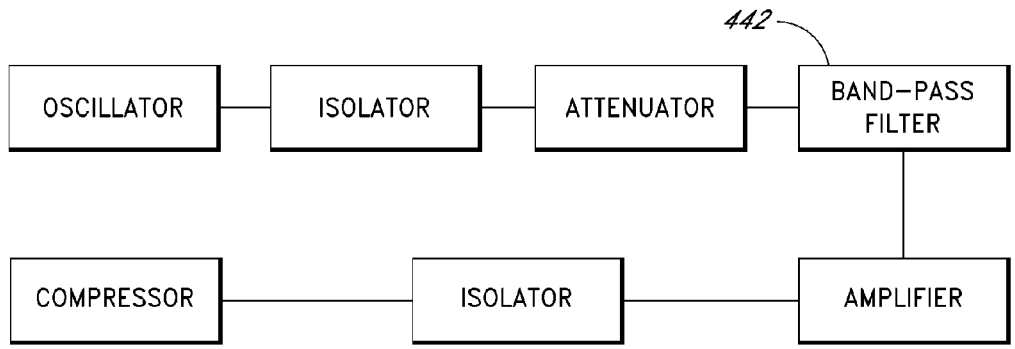
Figure 7C:
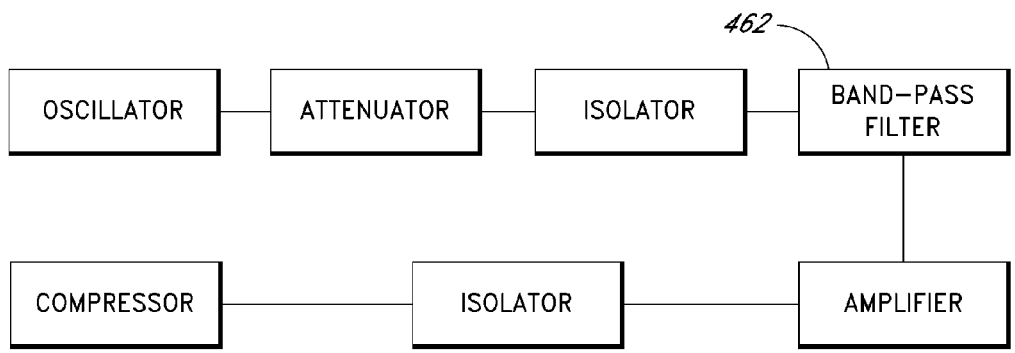

FIGS. 7A-C illustrate the use of a bandpass filter as a spectrum selector/pre-compressor for the exemplary designs similar to that of FIGS. 4A-C.

FIG. 7A illustrates one embodiment of an exemplary laser system 420 that is similar to the exemplary laser system of FIG. 4A. The spectrum selector/pre-compressor comprises a bandpass filter 422 that is disposed in an optical path between the isolator and the amplifier.

FIG. 7B illustrates one embodiment of an exemplary laser system 440 that is similar to the exemplary laser system of FIG. 4B and that includes an attenuator. The spectrum selector/pre-compressor comprises a bandpass filter 442 that is disposed in an optical path between the attenuator and the amplifier.

FIG. 7C illustrates one embodiment of an exemplary laser system 460 that is similar to the exemplary laser system of FIG. 4C and also includes an attenuator. The spectrum selector/pre-compressor comprises a bandpass filter 462 that is disposed in an optical path between the isolator and the amplifier.

The position of the spectral filter is not limited to the locations shown herein. Preferably, however, the spectral filter is disposed in an optical path between the oscillator and the amplifier.

Figure 8:
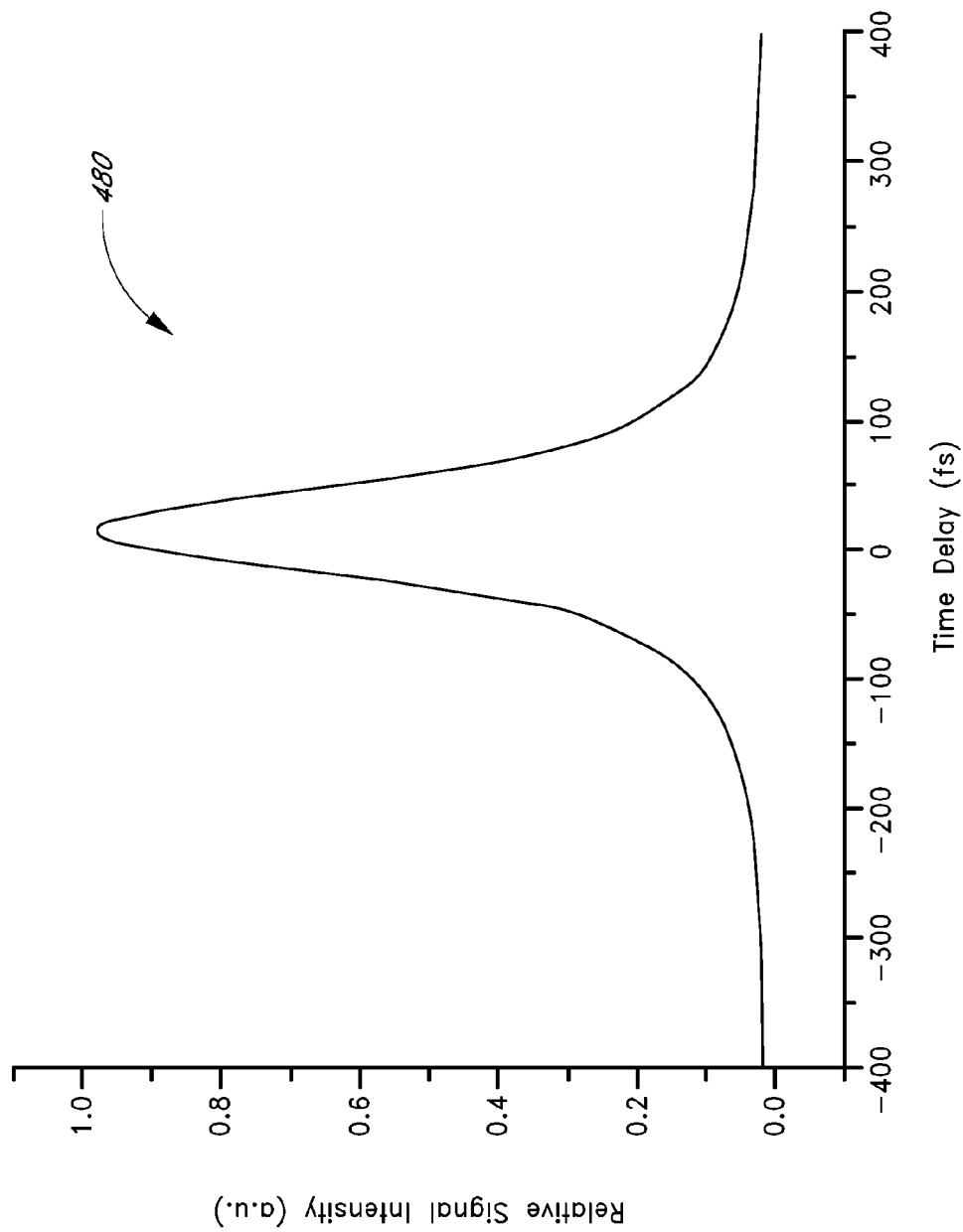
FIG. 8 illustrates an exemplary sub-100 femtosecond (fs) pulse generated with use of the band-pass filter upstream of the amplifier.

FIG. 8 illustrates an exemplary pulse 480 generated by a laser system using the bandpass filter described above in reference to FIGS. 7A-C. In one embodiment, the oscillator output has a bandwidth of approximately 12 nm. Halving the seed spectral bandwidth from approximately 12 nm to approximately 6 nm with a bandpass filter can result in the selected pulse width also being halved from approximately 1.3 ps to approximately 700 fs. By using a bandpass filter with a narrow bandwidth or a tilt filter, even shorter pulses can be achieved without compressor elements. The exemplary pulse 480 output from the compressor, has a width of approximately 88 fs.

As an alternative to a free space bandpass filter, a fiber band pass filter such as a long-period fiber grating can be used to select a part of the oscillator output signal in both wavelength domain and time domain. A long-period fiber grating (LPG) couples the light from a fundamental guided mode to forward-propagating cladding modes. A pair of matched LPGs can be used. One LPG couples light from the fundamental mode to the cladding mode and one LPG couples light back from the cladding mode to the fundamental mode. The cladding can thereby be used as a bypass for the resonant light while the non-resonant light propagating in the core is substantially blocked. Alternatively, by introducing a π-phase shift in the approximate middle of a LPG during its fabrication, a bandpass filter can be made using only one LPG. The π-phase shift in the LPG reverses the coupling direction such that light coupled into the cladding mode can return into the fundamental mode. One advantage of using an LPG as a bandpass filter is that the transmission spectrum can be conveniently designed so as to be suitable for a given amplifier operation.

Figure 9A:
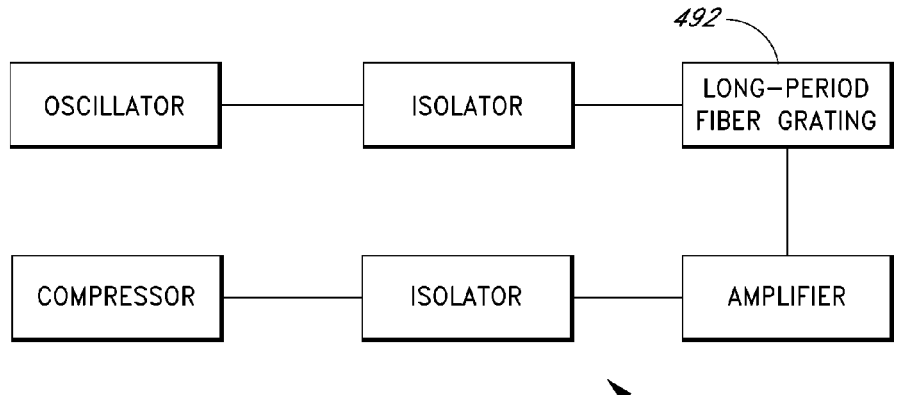
FIGS. 9A-C illustrate the use of a long period fiber grating to select a part of the oscillator output spectrum and shorten the seed pulse prior to amplification.
Figure 9B:
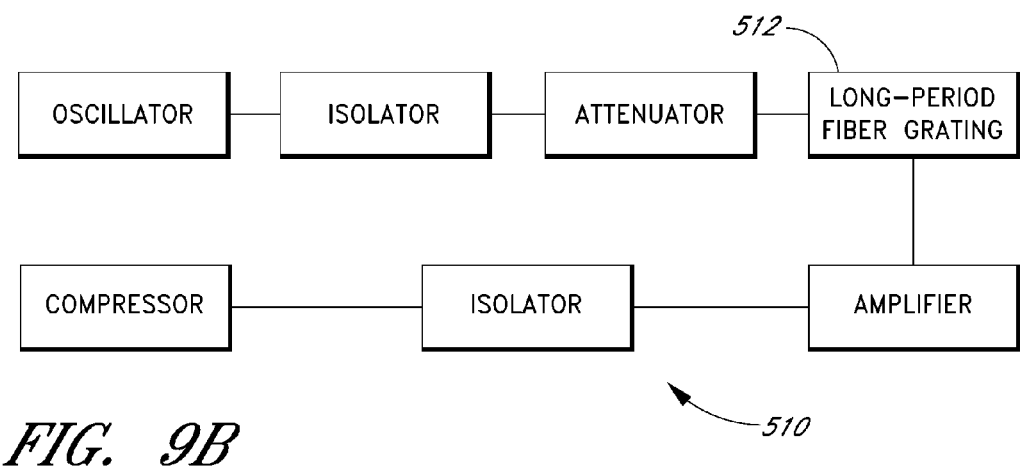
Figure 9C:
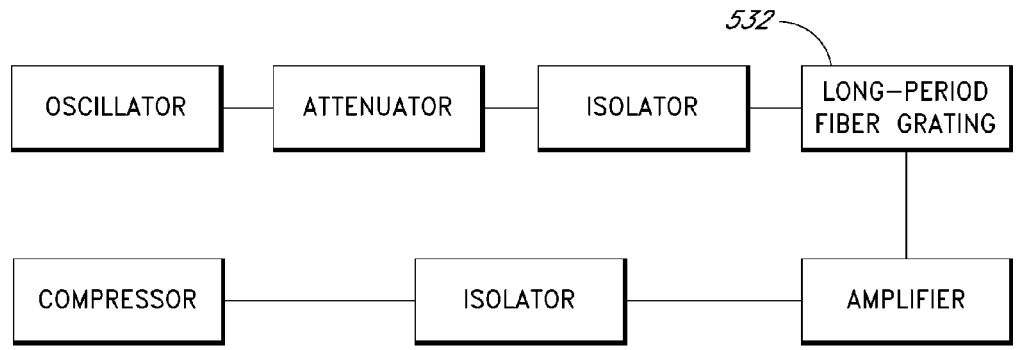

FIGS. 9A-C illustrate the use of a long-period fiber grating (LPG) as a spectrum selector/pre-compressor for the exemplary designs similar to that of FIGS. 4A-C.

FIG. 9A illustrates one embodiment of an exemplary laser system 490 that is similar to the exemplary laser system of FIG. 4A. The spectrum selector/pre-compressor comprises an LPG 492 that is disposed in an optical path between the isolator and the amplifier.

FIG. 9B illustrates one embodiment of an exemplary laser system 510 that is similar to the exemplary laser system of FIG. 4B and that comprises an attenuator. The spectrum selector/pre-compressor comprises an LPG 512 that is disposed in an optical path between the attenuator and the amplifier.

FIG. 9C illustrates one embodiment of an exemplary laser system 530 that is similar to the exemplary laser system of FIG. 4C and that also comprises an attenuator. The spectrum selector/pre-compressor, however, comprises an LPG 532 that is disposed in an optical path between the isolator and the amplifier.

The spectral manipulation can be achieved with a spectral filter that provides a band selectivity and/or a spectral shape modification. The band selectivity can provide a proper selection of the seed spectrum (e.g. position and bandwidth). The position may range from about 1045 to 1055 nm and the bandwidth may range from about 5 to 12 nm in certain embodiments although these ranges should not be construed as limiting as other embodiments are possible. The selected band may be matched with the gain shaping and nonlinear phase distortion in the amplifier for an improved pulse compressibility. The proper spectral shape, such as Gaussian or flat-top or other profile, can also be tailored with a spectral shaping filter. This concept can be further extended to an actively or passively controlled "pedestal flattening filter".

Figure 10:
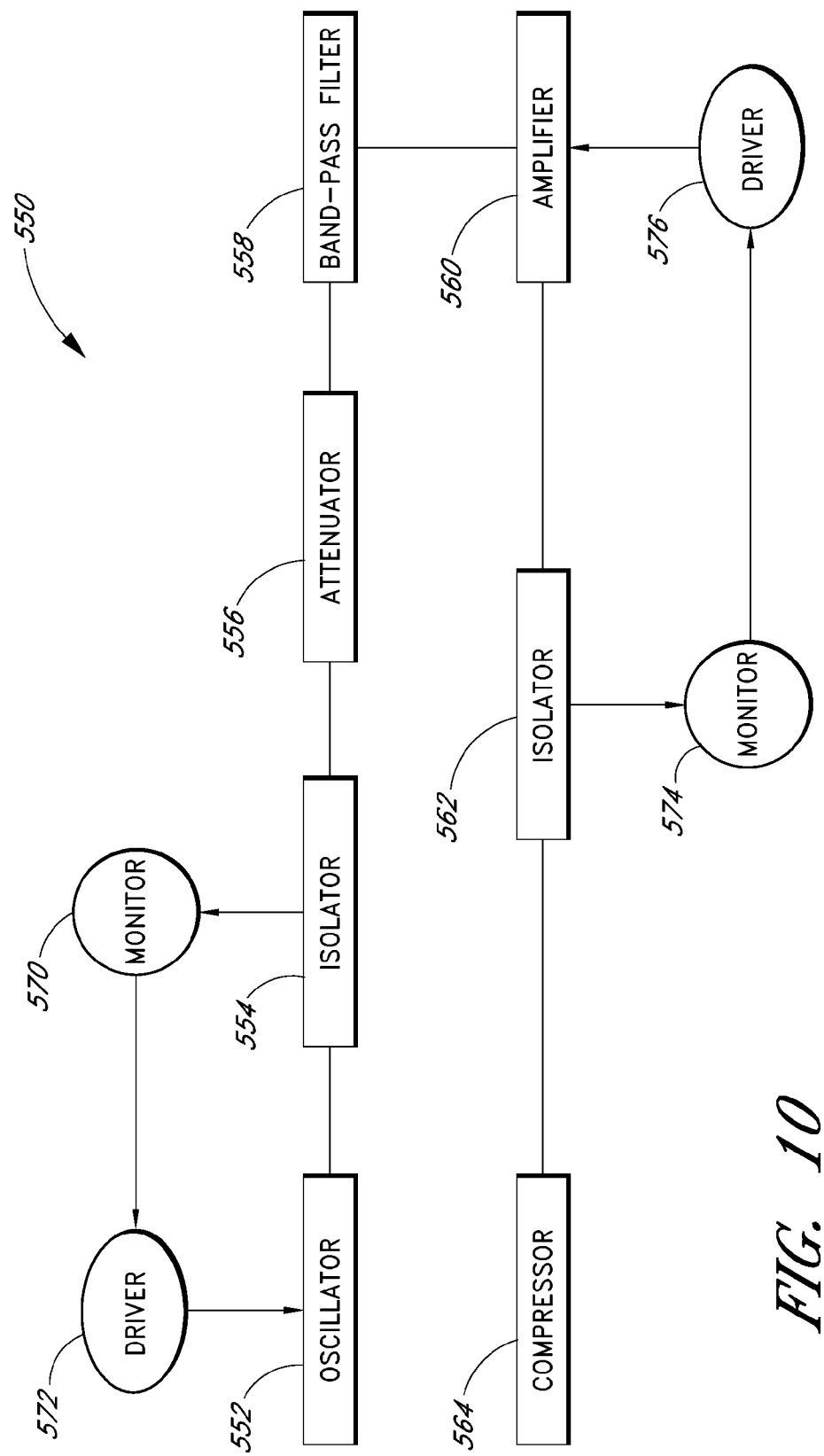
FIG. 10 illustrates a exemplary laser system having one or more tap and feedback components to monitor the performance of the system and actively control the system for stable operation.

FIG. 10 illustrates one embodiment of a laser system 550 having a monitoring and feedback control capability. A rare-earth-doped fiber absorption depends heavily on the environmental temperature. Such a dependence can result in a laser performance drift with temperature. For example, the oscillator modelocking threshold typically increases at high temperature.

In one embodiment of the laser system, monitoring the performance such as output power at some point(s) of the system and providing feedback to the diode pump drivers for active control can achieve a stable operation. FIG. 10 illustrates one embodiment of a laser system 550 having such a monitoring and feedback feature. The exemplary laser system 550 comprises an oscillator 552 coupled to an attenuator 556 via an isolator 554. The output from the attenuator 556 is fed into a bandpass filter 558 whose output is then direct to an amplifier 560. The output from the amplifier 560 is fed into a compressor 564 via an isolator 562. It should be noted that the use of the attenuator 556 and the bandpass filter 558 are exemplary, and that either of these components may be excluded and any other modular components, including those disclosed herein, may be used in the laser system having the feedback.

As shown in FIG. 10, the laser system 550 further comprises a first monitor component 570 that monitors a performance parameter of the system after the oscillator 552. The monitor 570 may comprise a sensor and controller. The monitor 570 may issue adjustment commands to a first driver 572 that implements those adjustment commands at the oscillator 552.

The exemplary laser system 550 is shown to further comprise a second monitor component 574 that monitors a performance parameter of the system after the amplifier 560. The monitor 574 may similarly comprise a sensor and controller. The monitor 574 can then issue adjustment commands to a second driver 576 that implements those adjustment commands at the amplifier 560.

The monitoring of the system performed by the exemplary monitors 570 and/or 574 may comprise for example an optical detector and electronics that monitors optical intensity or power or other relevant parameter such as, e.g., frequency and spectrum. In response to such measurement, the monitor and the driver may induce changes in the oscillator and/or the amplifier by for example adjusting the pump intensity and/or rate, or adjusting the operating temperature. Exemplary embodiments that include temperature control of the oscillator are described more fully below. Temperature control of the oscillator can stabilize the gain dynamics as well as frequency fluctuations. Temperature control of the amplifier can also be used to stabilize the gain dynamics.

Other configurations for providing feedback to control the operation of the laser system may also be employed. For example, more or less feedback loops may be included. The loops may involve electronics that perform operations such as calculations to determine suitable adjustments to be introduced. The feedback may be obtained from other locations in the system and may be used to adjust other components as well. The embodiments described in connection with FIG. 10 should not be construed to limit the possibilities.

In the description of various exemplary designs presented in reference to FIGS. 3-10, various components are depicted as modules. These modules may indeed be independent modular components. Other configurations, however, are possible. For example, two or more of these components may be packaged together in an integrated module. Alternatively, modules that may in some embodiments include one or more optical element, may be broken-up and/or separated and included in separate modules.

Figure 11C:
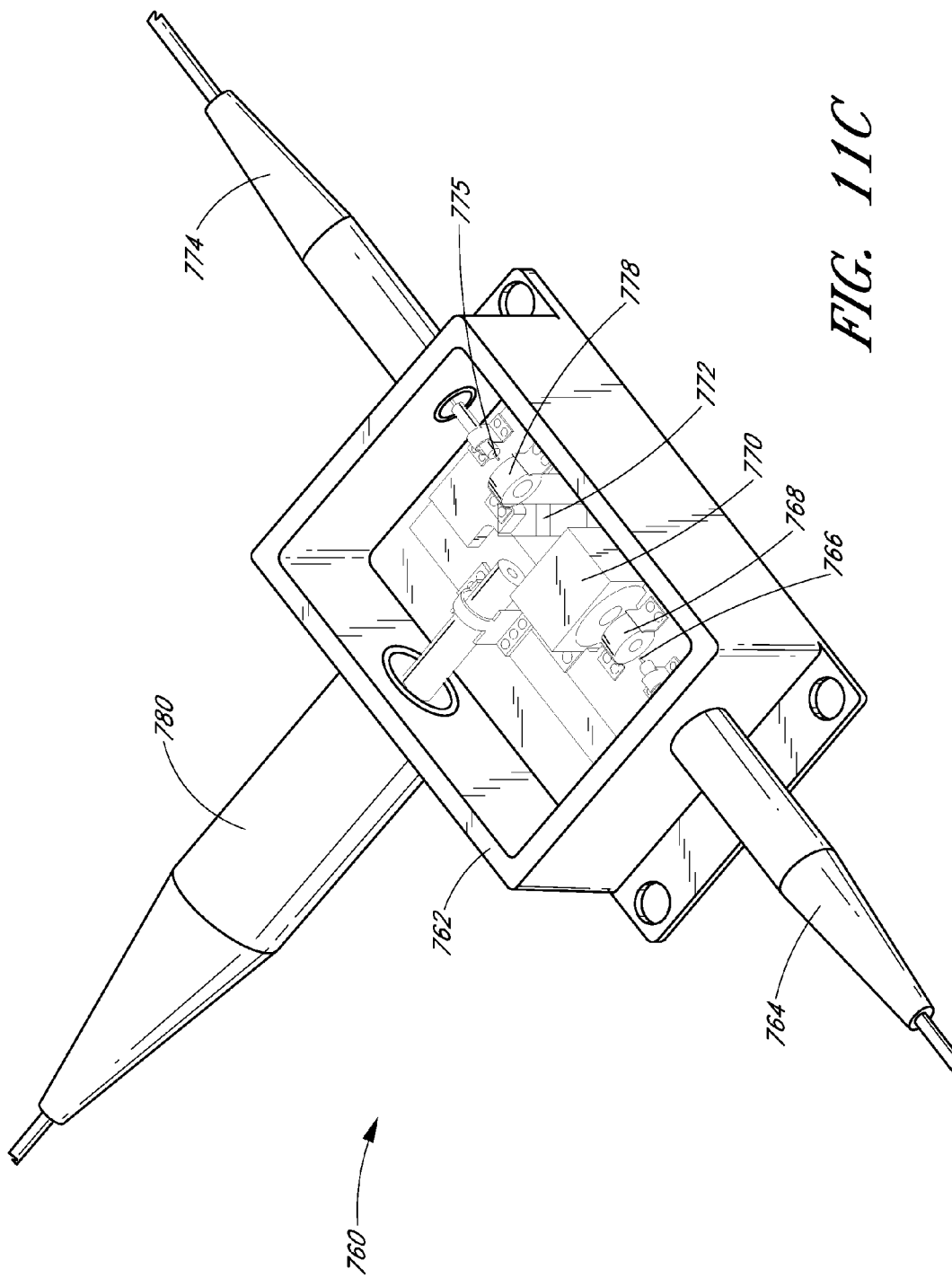
FIGS. 11A, B and C illustrate exemplary embodiments of the engineered modules including a saturable absorber module, an attenuator module and an isolator module.
FIG. 11D illustrates one embodiment of the oscillator having one or more modular sub-components with a temperature control component.

In one embodiment, an isolator depicted, for example, in FIGS. 3A-3C as being downstream from an oscillator may comprise a fiber Bragg grating, and may be packaged together with the oscillator. The isolator is thereby merged with the oscillator. Similarly, various components that may be considered separate functional groups may be included in the same housing and support structures. For example, the amplifier may comprise a non-fiber element such as a solid state or planar waveguide amplifier and may be included on the same platform and encased in the same housing as isolator optics thereby merging the amplifier and isolator functionalities. Separation of the functionalities, however, may offer advantages and thus be preferred in some embodiments The modular design concept can also be further extended to the elements within the oscillator, amplifier, and other components comprising the laser system. FIGS. 11A-C illustrate exemplary embodiments that can be designed and packaged with the advantageous modular approach of the present teachings.

FIG. 11A illustrates one embodiment of a saturable absorber module 710 packaged following Telcordia specifications. The saturable absorber module 710 comprises a housing 712 that contains a plurality of optical elements. An optical fiber connector 714 comprising an optical fiber 716 having an angle polished or cleaved endface passes through one side of the housing 712 into an inner region of the housing containing the plurality of optical components. These optical components include a first lens 718 for collecting and preferably collimating light output from the optical fiber 716, a variable waveplate 720 and a polarization selective optical element 722 as well as a saturable absorber 724. The variable waveplate 720 comprises a rotatable waveplate mounted on a rotatable wheel 726 and the polarization selective optical element 722 comprises a polarization beamsplitter such as a MacNeille prism. A second lens 728 disposed between the polarization selective optical element 722 and the saturable absorber 724 preferably focuses light propagating through the waveplate 720 and the polarization beamsplitter 722 onto the saturable absorber. An optical path is formed from the optical fiber 716 through the waveplate 720 and prism 722 to the saturable absorber 724, which is reflective. Light will propagate in both directions along this optical path, which may form a portion of the resonator of the oscillator.

In various preferred embodiments, the light in the laser is linearly polarized. The degree of the linear polarization may be expressed by the polarization extinction ratio (PER), which corresponds to a measure of the maximum intensity ratio between two orthogonal polarization component. In certain embodiments, the polarization state of the source light may be maintained by using polarization-maintaining single-mode fiber. For example, the pigtail of the individual modular device may be fabricated with a polarization-maintaining fiber pigtail. In such cases, the PER of each modular stage may be higher than about 23 dB. Ensuring a high polarization extinction ratio throughout a series of modules challenges despite the use of single mode polarization maintaining fiber. Degradation of the PER can occur at fiber ferrule, fiber holder, or fusion splice in the series of modules.

Levels of PER above 23 dB may be obtained using linear-polarizing optical components in the modules, such as shown in FIG. 11A wherein the polarization beamsplitter 722 operates as a polarization filter thereby providing a substantially linear polarization. The rotatable waveplate 720 adjusts the polarization output from the fiber 716 preferably to reduce the amount of light that is filtered out and lost by the polarization beamsplitter 722. In other embodiments, the optical fiber 716 may be rotated to alter the polarization instead of or in addition to adjustment of the rotatable waveplate 720.

Use of linear-polarizing components in the modules that contain polarization degrading elements such as fiber ferrule, fiber holder, or fusion splice is advantageous. The linear polarizers counter the superposition of the phase shift from each polarization degrading element. A superposed phase shift of 10 degrees may reduce the PER to about 15 dB in which case intensity fluctuation through a linear polarizer might be more than about 4%. In contrast, by embedding linear polarizers throughout the series of modules, the PER of the aggregate system can be substantially controlled such that the intensity fluctuation is below about 1%, provided that the PER of the individual module and splice is above about 20 dB.

Preferably, the optical elements such as the first lenses 718, the rotatable waveplate 720, the MacNeille polarizer 722, and the saturable absorber 724 comprise micro-optics or are sufficiently small to provide for a compact module. The elements in the housing 712 are also preferably securely fastened to a base of the housing such as by laser welding. The housing 712 may be sealed and thermally insulated as well. In various preferred embodiments, these modules conform to Telcordia standards and specifications.

FIG. 11B illustrates one embodiment of a variable attenuator module 730 comprising a housing 732 that contains optical components for providing a controllable amount of optical attenuation. A first optical fiber connector 734 comprising an optical fiber 736 having an angle polished or cleaved endface passes through one sidewall of the housing 732 into an inner region of the housing containing the plurality of optical components. These optical components include a first lens 738 for collecting and preferably collimating light output from the optical fiber 736, a variable waveplate 740 and a polarization selective optical element 742. A second optical fiber connector 744 comprising an optical fiber 745 having an angle polished or cleaved endface passes through another sidewall of the housing 732 into the inner region containing the optical components. The variable waveplate 740 comprises a rotatable waveplate mounted on a rotatable wheel 746 and the polarization selective optical element 742 comprises a polarization beamsplitter such as a MacNeille prism. A second lens 748 disposed between the polarization selective optical element 742 couples light between the polarization beamsplitter 742 and the second optical fiber 745. An optical path is formed from the first optical fiber 736 through the waveplate 740 and prism 742 to the second optical fiber connector 744.

The waveplate 740 can be rotated to vary the distribution of light into orthogonal polarizations. The polarization beamsplitter 742 can be used to direct a portion of the light out of the optical path between the first and second fiber connectors 734, 744, depending on the state of the waveplate 740. Accordingly, a user, by rotating the waveplate 740 and altering the polarization of light can control the amount of light coupled between the first and second optical fiber connectors 734, 744 and thereby adjust the level of attenuation.

Preferably, the optical elements such as the first and second lenses 738, 748, the rotatable waveplate 740 and the MacNeille polarizer 742 comprise micro-optics or are sufficiently small to provide for a compact module. The elements in the housing 732 may be laser welded or otherwise securely fastened to a base of the housing. The housing 732 may be sealed and thermally insulated as well. In various preferred embodiments, these modules conform to Telcordia standards and specifications.

FIG. 11C illustrates one embodiment of an isolator module 760 comprising a housing 762 that contains optical components for providing a optical isolation. A first optical fiber connector 764 comprising an optical fiber 766 having an angle polished or cleaved endface passes through one sidewall of the housing 762 into an inner region of the housing containing the plurality of optical components. These optical components include a first lens 768 for collecting and preferably collimating light output from the optical fiber 766, an optical isolator 770, and a beamsplitter 772. A second optical fiber connector 774 comprising an optical fiber 775 having an angle polished or cleaved endface passes through another sidewall of the housing 762 into the inner region containing the optical components. The isolator 770 may comprise for example a Faraday rotator and linear polarizers (not shown). The beamsplitter 772 may comprise a plate or wedge that directs a portion of the beam to a third fiber connector 780. In other embodiments, a lens may couple light between the beamsplitter 772 and this third fiber connector 780. The third fiber connector 780 may comprise a tap for tapping off a portion of the light propagating between the first optical fiber 766 and the second optical fiber 775 and is not generally involved in the operation of the isolator 770. Accordingly, the beamsplitter 772 and tap 780 may be excluded from other embodiments of the isolator module design. The tap 780, however, may be useful for providing feedback for laser systems as described elsewhere herein. A second lens 778 disposed between the beamsplitter 772 and the second optical fiber 775 couples light between the beamsplitter 772 and the second optical fiber. An optical path is formed from the first optical fiber 766 through the isolator 770 and beamsplitter 772 to the second optical fiber connector 774. This optical path, however, is substantially uni-directional as a result of the isolator 770.

This module 760 may further comprise a waveplate and a polarization selective optical element to assist in maintaining polarization as described in connection with the saturable absorber module 710 shown in FIG. 11A. In other embodiments, e.g., containing a polarization selective element such as a linear polarizer, the optical fibers may be rotated to alter the polarization instead of or in addition to providing a rotatable waveplate.

Preferably, the optical elements such as the first and second lenses 768, 778, the isolator 770 and the prism 772 comprise micro-optics or are sufficiently small to provide for a compact module. The elements in the housing 762 may be laser welded or otherwise securely fastened to a base of the housing. The housing 762 may be sealed and thermally insulated as well. In various preferred embodiments, these modules conform to Telcordia standards and specifications.

Other designs may be employed that differ from the design configurations depicted in connection with the modules 710, 730, 760 shown in FIGS. 11A-11C. For example, other components may be added, alternative components may be used, or the arrangement and configuration of the components in the modules may be different. In some cases, components may be removed. The housing may also be different. Still other variations are possible.

Figure 11D:
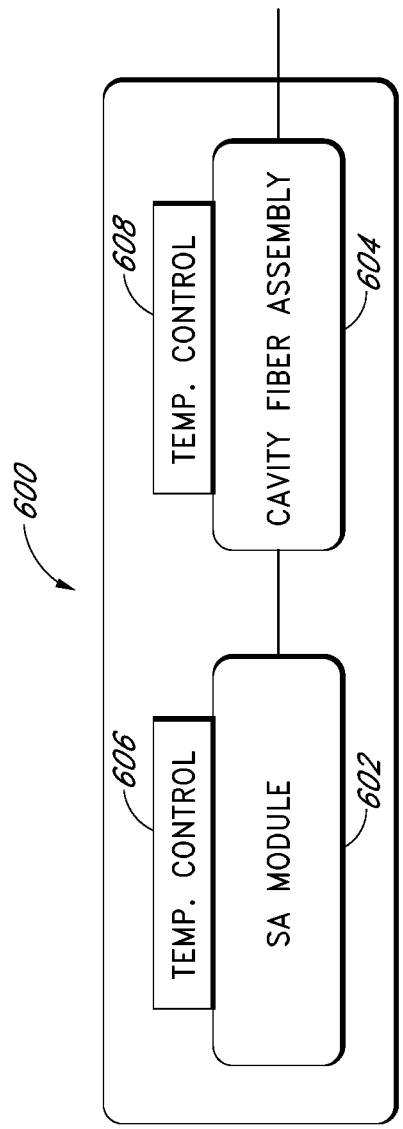

FIG. 11D depicts an exemplary schematic representation of an oscillator such as described above in reference to FIGS. 2A and 2B. In one embodiment, an oscillator 600 comprises a saturable absorber module 602 optically coupled to a cavity fiber assembly module 604. The two modules can be optically coupled by a fiber pigtail, and the length of the fiber between the modules 602, 604 can be varied to contribute to a desired group delay dispersion in the cavity.

The saturable absorber module 602 and/or the cavity fiber assembly module 604 may be coupled to respective temperature control components 606 and 608. In one embodiment, the temperature control components 606 and 608 comprise Peltier elements that provide a temperature control over a relatively large range of temperatures. The temperature controllers can be used, for example, to adjust the temperature of the gain fiber in the oscillator to stabilize gain and reduce noise.

Figure 12:
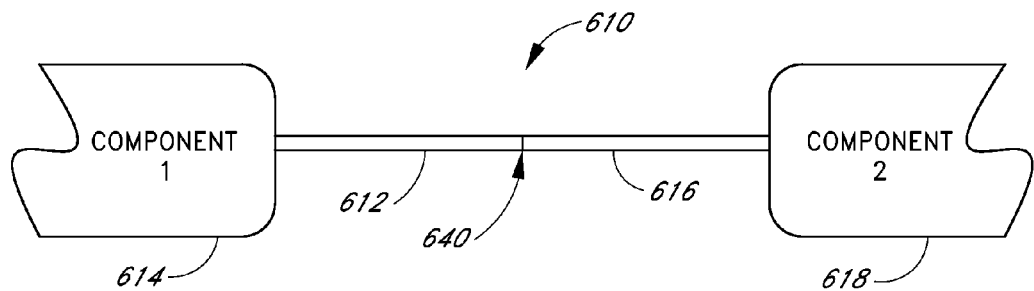
FIG. 12 illustrates how two exemplary components or modules can be optically coupled by splicing of fiber pigtails.

FIG. 12 illustrates one approach to optically coupling the various modular components. An exemplary coupling 610 shows a first pigtail fiber 612 from a first component 614 coupled to a second pigtail fiber 616 from a second component 618 by a splice 640. In one implementation, the splices are fusion spliced. As is known, such a splice provides advantageous features associated with optical fibers as the two fiber segments are merged into one physically connected fiber optic path. In comparison with bulk optics, complicated and potentially fragile alignment and positioning are not required once the fibers are coupled together. The splice thereby provides a substantially consistent transmission of signals between the coupled components. Such techniques can be readily implemented and thus improve manufacturability and reduce cost. Using such techniques, the fibers' positions and coupling can also be made less vulnerable to environment changes thereby yielding an improved stability of the laser system. Other techniques such as butt coupling can also be employed in other embodiments.

Optical fibers are also compact and lightweight in comparison, for example, to lens systems, although lenses and other bulk optics may be used, for example, in different modules. Components coupled in the foregoing manner can be arranged in a variety of ways. Because the optical interconnection between modular components is provided by a fiber, the modules may not need to be aligned optically and the modules can be arranged and packaged in a flexible manner.

Figure 13:
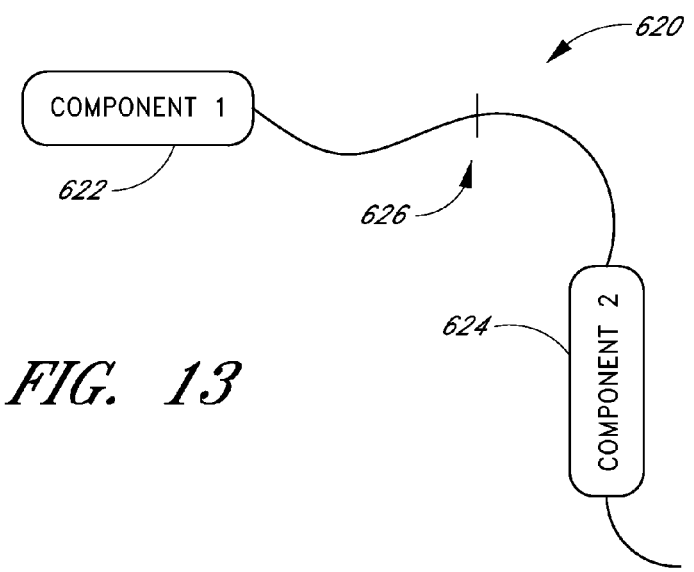
FIG. 13 illustrates some of possible advantages of flexibility in arrangement of modular components provided by the spliced optical coupling.

FIG. 13 illustrates an exemplary arrangement of modules where the alignment of the axes through the module (i.e., a direction that may be associated with freespace input and output coupling) is not a restrictive design limitation. As shown in FIG. 13, an exemplary coupling 620 optically couples a first component 622 to a second component 624 via a splice 626. Accordingly, the second component 624 is oriented such that the axis through the first component 622 need not be aligned with the axis through of the second component. Similarly, bulk optics such as reflectors or mirrors are not needed to provide optical connection between the two components 622, 624.

As described above, the modules may comprise one or more optical elements supported within a housing. These optical elements may be bulk optics such as lens and mirrors or other physical optics or may comprise waveguide structures such as planar waveguides. In some embodiments, fiber optic components may be included in such housings although optical fibers may be connected to the fiber pigtails extending from the housings and may not have individual housings. For example, one laser system may comprise a saturable absorber in a housing having an optical pigtail extending therefrom (such as in FIG. 11A) that is spliced to an oscillator fiber at least a portion of which is doped to provide gain and that includes a fiber Bragg grating as a partial reflector. The fiber Bragg grating may be spliced to an input pigtail of an isolator (such as in FIG. 11C) comprising bulk optics components disposed within a separate housing. An output pigtail extending from the isolator module may be spliced to another modulate containing bulk optics that form a variable attenuator (such as in FIG. 11B). The variable attenuator module may have an output fiber pigtail optical connected to a gain fiber comprising a fiber amplifier. The fiber amplifier may be spliced to a fiber Bragg grating or photonic crystal fiber that provides compression. Other configurations are also possible.

The modular approach described above offers many advantages. The fiber-based modular approach aids in designing, addressing limitations, and providing practical solutions for applications in medicine, industry, and other environments. In many cases, design of reliable and complex optical and laser systems is generally a difficult task involving expenditure of excessive resources and extensive amounts of time. Using modular opto-mechanical elements, an ultrashort pulse laser can be more efficiently designed for particular applications. Advantageously, the design of the system may be first simplified, which can be accomplished by dividing the system into several functional groups. The functionalities can be achieved with different modules which can be separately designed and tested. Design assessment of reliability can be achieved at much lower cost involving less time and less resources. Engineering of separate modules for product development is more manageable.

The modular approach can also significantly simplify the assembly process and improve the manufacturability of the laser systems. The laser systems can be assembled with simple fusion splices without free-space alignment. Such process can decrease labor costs and increase the operation stability, reliability, and repeatability. Repair, replacement, and upgrading may also be facilitated by the modular approach as the modules may be replaceable and/or interchangeable.

In various preferred embodiments, the optics within the modules comprise micro-optics elements although other types of optics are possible. Use of micro-optics and fiber optics provides compactness. Preferably, the optics are secured to the housing and the housing provides sufficient protection such that the laser systems are rugged and robust. In various embodiments, the housings may comprise thermal insulation and/or may be hermetically sealed to reduce build-up of condensation, moisture, dust, dirt, or other contamination that may interfere with the operation or reliability of the optical elements.

The modular design disclosed herein provides other advantages in the design and performance of high power short pulse laser systems. Reduced form factor and mass of the components may enable a high-degree of optical stability. Environmental stability of the system can be improved also by controlling the temperature of the devices. In some embodiments, the laser system can be packaged to meet the telecommunication standards in performance and quality. In some embodiments, for example, the laser system or portions thereof can be packaged in compliance with a Telcordia reliability assurance requirements such as GR-1221-CORE and GR-468-CORE.

The recent unprecedented growth of the telecom industry has resulted in the development of a mature fiber technology and reliable and cost-effective components. However, due to the nature of telecommunication requirements, the commercial fiber components are mostly limited by low power handling capability and continuous-wave (CW) operation. High average power (>200 mW) and ultrafast pulse operation involved specially designed components. Preferably, however, an ultrashort fiber laser and amplifier system may be provided that is in compliance of the applicable Telcordia reliability assurance requirements, for example, GR-468-CORE and GR-1221-CORE.

Environmentally stable laser design is highly desirable for industrial application. A preferred industrial laser system can, for example, be characterized by an output power variation below 0.5 dB over an environmental temperature range from 0 to 50 degree Celsius and by compliance of vibration, thermal shock, high temperature storage and thermal cycling test criteria in Telcordia GR-468-CORE and GR-1221-CORE. This target can be achieved by functional segmentation of components and using appropriate packaging in the modules such as for example Telcordia-qualified packaging technology. Accordingly, preferably, the modules are designed and manufactured to comply with telecom standards and quality.

As described above, various embodiments comprise a high power ultrashort pulses laser system having an output power over about 200 mW and a pulse width less than about 200 femtoseconds. Certain embodiments may employ a short length of gain fiber to enhance the gain stability of the oscillator against environmental temperature variation. In some embodiments, the cavity dispersion may be managed by adding undoped polarization maintaining fiber, which may be provided by a fiber pigtail integrated with the saturable absorber module. As discussed above, the saturable absorber and the optics associated with the saturable absorber may be packaged with telecommunication packaging technology to form a modular toolkit in the oscillator system. In some designs, the module can be integrated with a temperature controller.

In certain preferred embodiments, the light from the oscillator may be amplified. Also, the quality of the amplified pulse, such as minimum pedestal and compressibility, may be controlled by manipulating the spectral detail of the seed pulse out of oscillator. Such manipulation may be accomplished by using a spectral filter although other designs are possible. Depending on the detail of the chirp of the pulse and nonlinear phase distortion in the amplifier, in some embodiments, a grating pair having a properly selected center wavelength and bandwidth may provide suitable balance for the chirp such that the pulse can be compressed with a sufficiently high pulse quality. Furthermore, the spectral property of the filter can be further tailored for pedestal flattening in some embodiments. A specific pedestal flattening filter, for example, can be used. In certain embodiments, a parabolic amplifier may be used to amplify the seed pulse. In case of seed spectral bandwidth larger than 10 nm, a filter-type element may be inserted in front of amplifier to shorten the seed pulse width to improve or optimize the amplification and compressibility of the amplified pulse.

Other embodiments having different designs and configurations are possible and should not be limited to those described above. For example, although the various systems disclosed herein can operate in the wavelength of around 1050 nm, the concepts of the present teachings can also be applied to laser systems operating at other wavelengths.

Moreover, the above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

Figure 14:
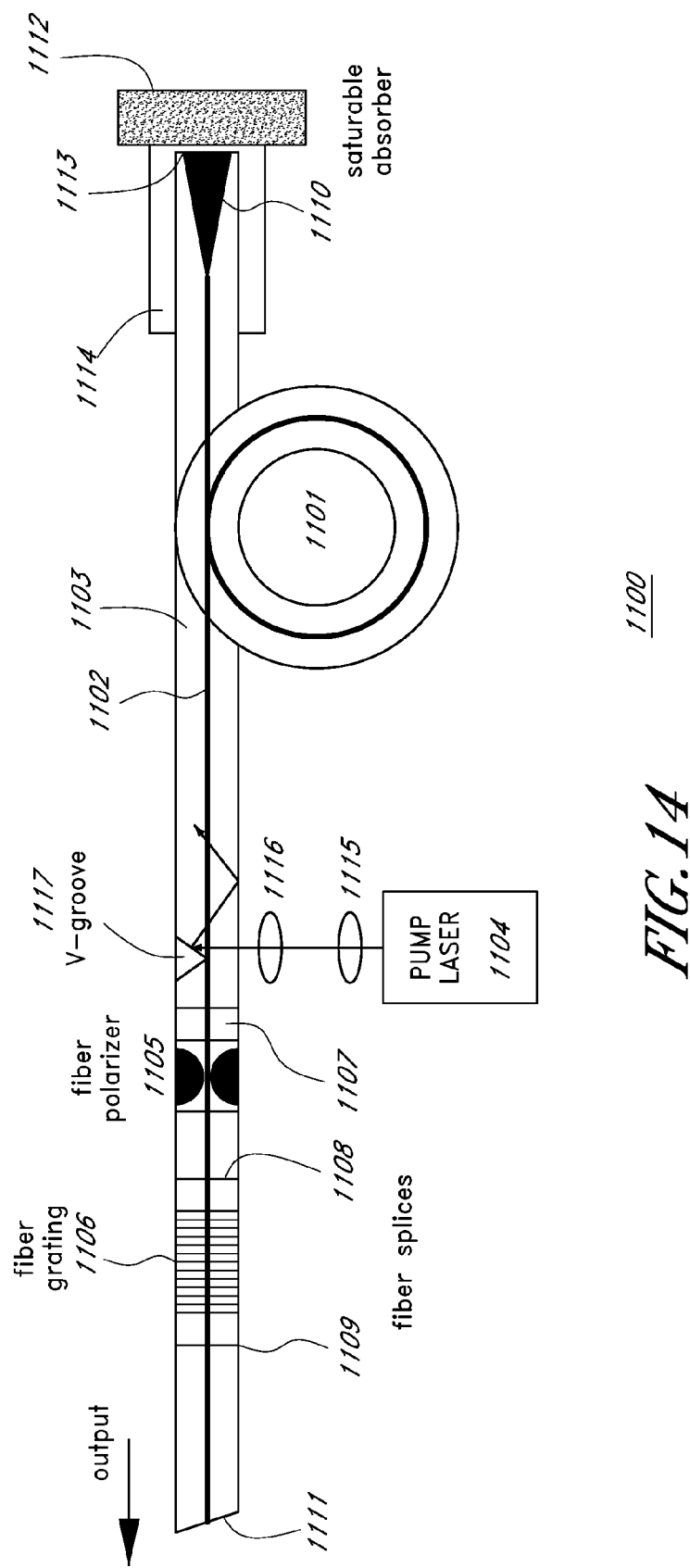
FIG. 14 is a diagram of a cladding pumped fiber cavity design according to a first embodiment of the invention.

FIG. 14 represents an exemplary embodiment of the present invention embodied in a fiber laser cavity 1100. A polarization-maintaining gain fiber 1101 has a core 1102 and cladding region 1103. The fiber core 1102 is doped with rare-earth ions, such as Yb, Nd, Er, Er/Yb, Tm or Pr, to produce gain at a signal wavelength when the laser is pumped with diode laser 1104. The fiber core can be single-mode or multi-mode. The fiber laser cavity 1100 further contains an integrated fiber polarizer 1105 and a chirped fiber Bragg grating 1106. Both of these elements, 1105 and 1106, are generally constructed of short fiber pigtails (e.g., 0.001-1 m in length), which are preferably fusion-spliced to fiber 1101 using splices 1107, 1108 and 1109. Alternatively, fiber polarizer 1105 can be spliced in front of beam expander 1110. When using multi-mode fiber, splice 1107 is selected to match the fundamental mode in the gain fiber 1101.

An exemplary integrated fiber polarizer in accordance with the invention comprises a polarization-maintaining undoped polarizer fiber (PF), with two orthogonal polarization axes, where the loss along one polarization axis is significantly higher than the loss along the other polarization axis. Alternatively, a very short section (less than 1 cm) of non-birefringent fiber (i.e., non-polarization-maintaining fiber) can be sandwiched between two sections of polarization-maintaining fiber, where the polarization axes of the polarization-maintaining fibers are aligned with respect to each other. By side-polishing the non-birefringent fiber, e.g., down to the evanescent field of the fiber core, along one of the axes of the birefringent fiber, and coating the polished region with metal, high extinction polarization action can be obtained along one of the axes of the birefringent fiber. The design of side-polished fiber polarizers is well known in the field and not discussed further here.

For optimum laser operation, the fiber polarization axes of the PF are aligned parallel to the polarization axes of the gain fiber 1101. To ensure stable modelocked operation, the polarizer preferably effectively eliminates satellite pulses generated by any misalignment between the polarization axes of the PF and the gain fiber 1101.

Neglecting any depolarization in the all-fiber polarizer itself, it can be shown by applying a Jones matrix calculation method that for a misalignment of the polarization axes of gain fiber 1101 and fiber polarizer 1105 by $\alpha$ degrees, the linear reflectivity R from the right-hand side of the cavity varies approximately between $R=1-0.5 \sin^2 2\alpha$ and $R=1$ depending on the linear phase in the gain fiber 1101. If the group delay along the two polarization axes of the gain fiber is larger than the intra-cavity pulse width, any satellite pulse is suppressed by $\sin^4 \alpha$ after transmission through the polarizer. Typical fiber splicing machines can align polarization-maintaining fibers with an angular accuracy of less than $\pm 2°$; hence any reflectivity variation due to drifts in the linear phase between the two polarization eigenmodes of fiber 1101 can be kept down to less than $3 \times 10^{-3}$, whereas (for sufficiently long fibers) any satellite pulses obtained after transmission through the polarizer can be kept down to less than $6 \times 10^{-6}$ when using an integrated polarizer.

The chirped fiber Bragg grating 1106 is preferably spliced to the PF 1105 at splice position 1108 and written in non-polarization-maintaining fiber. In order to avoid depolarization in the fiber Bragg grating, the Bragg grating pig-tails are preferably kept very short, e.g., a length smaller than 2.5 cm is preferable between splice locations 1108 and 1109. To obtain a linear polarization output, a polarization-maintaining fiber pig-tail is spliced to the left-side of the fiber Bragg grating at splice location 1109. The laser output is obtained at a first fiber (or cavity) end 1111, which is preferably angle-cleaved to avoid back-reflections into the cavity.

Fiber Bragg grating 1106 serves two functions. First, it is used as an output mirror (i.e., it feeds part of the signal back to the cavity) and, second, it controls the amount of cavity dispersion. In the present implementation, the chirped fiber Bragg grating has a negative (soliton-supporting) dispersion at the emission wavelength in the wavelength region near 1060 nm and it counter-balances the positive material dispersion of the intra-cavity fiber. To produce the shortest possible pulses (with an optical bandwidth comparable to or larger than the bandwidth of the gain medium), the absolute value of the grating dispersion is selected to be within the range of 0.5-10 times the absolute value of the intra-cavity fiber dispersion. Moreover, the fiber Bragg grating is apodized in order to minimize any ripple in the reflection spectrum of the grating. Accordingly, the oscillation of chirped pulses is enabled in the cavity, minimizing the nonlinearity of the cavity and maximizing the pulse energy. Chirped pulses are characterized in having a pulse width which is longer than the pulse width that corresponds to the bandwidth limit of the corresponding pulse spectrum. For example the pulse width can be 50%, 100%, 200% or more than 1000% longer than the bandwidth limit.

Alternatively, the oscillation of chirped pulses is also enabled by using negative dispersion fiber in conjunction with positive dispersion chirped fiber Bragg gratings. Pulses with optical bandwidth comparable to the bandwidth of the gain medium can also be obtained with this alternative design.

A SAM 1112 at a second distal fiber end 1113 completes the cavity. In an exemplary implementation a thermally expanded core (TEC) 1110 is implemented at cavity end 1113 to optimize the modelocking performance and to allow close coupling of the SAM 1112 to the second fiber end 1113 with large longitudinal alignment tolerances. Etalon formation between the fiber end 1113 and the SAM 1112 is prevented by an anti-reflection coating deposited on fiber end 1113 (not separately shown). In the vicinity of the second fiber end 1113, fiber 1101 is further inserted into ferrule 1114 and brought into close contact with SAM 1112. Fiber 1101 is subsequently fixed to ferrule 1114 using, for example, epoxy and the ferrule itself is also glued to the SAM 1112.

The pump laser 1104 is coupled into the gain fiber 1101 via a lens system comprising, for example, two lenses 1115 and 1116 and a V-groove 1117 cut into fiber 1101. Such side-coupling arrangements are described in, for example, U.S. Pat. No. 5,854,865 ('865) to L. Goldberg et al. Alternatively, fiber couplers can be used for pump light coupling.

Figure 15A:
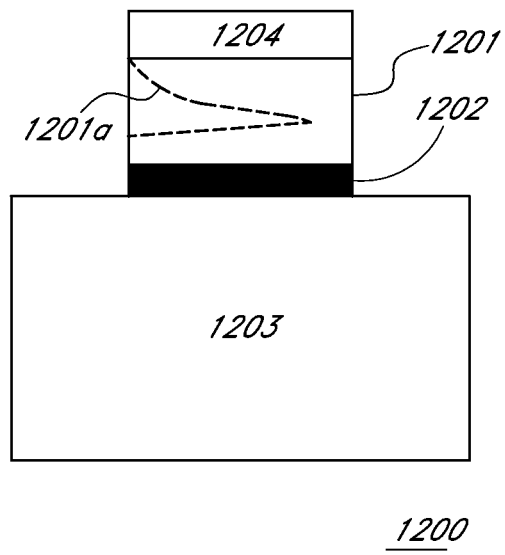
FIG. 15a is a diagram of a saturable absorber mirror according to an embodiment of the invention.

An exemplary design for a SAM in accordance with the present invention is shown in FIG. 15a. For example, SAM 1200 includes an InGaAsP layer 1201 with a thickness of 50-2000 nm. Further, layer 1201 is grown with a bandedge in the 1 µm wavelength region; the exact wavelength is defined by the sought emission wavelength of the fiber laser and can vary between 1.0-1.6 µm. The InGaAsP layer 1201 is further coated or processed with a reflective material such as Au or Ag. A dielectric mirror or semiconductor Bragg reflector 1202 is located beneath layer 1201 and the entire structure is attached to heat sink 1203, based on, for example, metal, diamond or sapphire.

In order to cover a broad spectral range (e.g., greater than 100 nm) metallic mirrors are preferred. When using a metallic mirror it is advantageous to remove the substrate (InP) by means of etching. When using HCl as an etching solvent the etching selectivity between InGaAsP and InP can be low, depending on the compound composition of InGaAsP. An etch-stop layer is beneficial between the substrate and the InGaAsP layer. InGaAs can be a proper etch-stop layer. When adding an InGaAs layer with a band-gap wavelength shorter than 1.03 µm, lattice relaxations can be avoided by keeping the thickness below 10 nm.

The InGaAsP layer can further be anti-reflection coated with layer 1204 on its upper surface to optimize the performance of the SAM. Because of the saturable absorption by InGaAsP, the reflectivity of the SAM increases as a function of light intensity, which in turn favors the growth of short pulses inside the laser cavity. The absence of Al in the saturable absorber layer prevents oxidization of the semiconductor surfaces in ambient air and thus maximizes the life-time and power handling capability of the structure.

Instead of InGaAsP, any other Al-free saturable semiconductor can also be used in the construction of the SAM. Alternatively, Al-containing semiconductors can be used in the SAM with appropriately passivated surface areas. Surface passivation can, for example, be accomplished by sulfidization of the semiconductor surface, encapsulating it with an appropriate dielectric or with an Al-free semiconductor cap layer. An AlGaInAs absorber layer grown lattice-matched on InP can be surface-passivated with a thin (about 10 nm range) cap layer of InP. AlGaInAs with a higher bandgap energy than the absorber layer can also be used for a semiconductor Bragg reflector in combination with InP. Among concepts for semiconductor Bragg mirrors lattice-matched to InP, an AlGaInAs/InP combination has an advantage over an InGaAsP/InP Bragg reflector due to its high refractive index contrast.

Figure 15B:
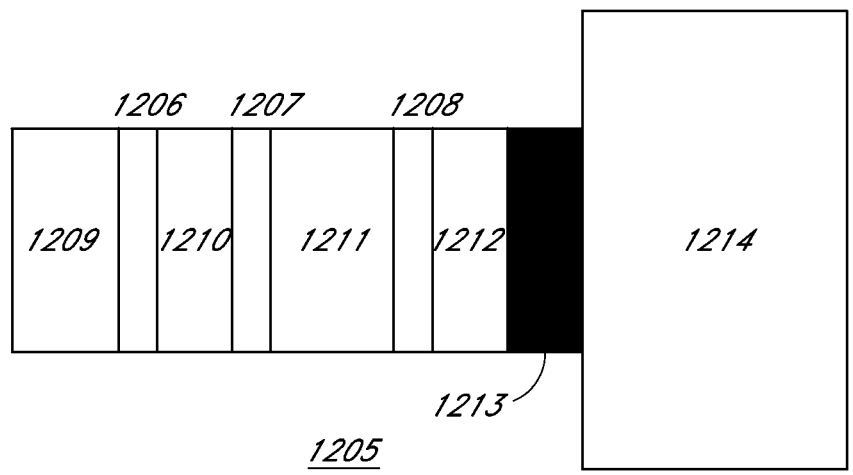
FIG. 15b is a diagram of a saturable absorber mirror according to an alternative embodiment of the invention.

Instead of a bulk semiconductor saturable absorber, a MQW saturable absorber structure as shown in FIG. 15b may also be used. In this case, the SAM 1205 conveniently comprises MQW structures 1206, 1207 and 1208 separated by passive spacer layers 1209-1212 in order to increase the saturation fluence and depth-selective ion-implantation concentration of each MQW section. Additional MQW structures can further be used, similarly separated by additional passive spacer layers. To reduce the wavelength and location sensitivity of the MQW saturable absorbers, the width of the spacer layers varies from spacer layer to spacer layer. Furthermore, multiple bulk layers with thicknesses larger than 500 Å can replace the MQW structure. The MQW layers, in turn, can contain several layers of quantum wells and barriers such as, for example, InGaAs and GaAs, respectively. Top surface 1209 can further be anti-reflection coated (not shown); a reflective structure is obtained by including mirror structure 1213. The entire structure can be mounted on heat sink 1214.

The control of the response time of the saturable absorption for concomitant existence of fast and slow time constants is realized by introducing carrier trap centers with depth controlled H+ (or other ions) implantation. The implantation energy and dose are adjusted such that part of the absorbing semiconductor film contains a minimal number of trap centers. For example the semiconductor layer with the minimal number of trap centers can be selected to be at the edge of the optical penetration range of exciting laser radiation. Such a design serves only as an example and alternatively any semionductor area within the optical penetration range can be selected to contain a minimal number of trap centers. Hence distinctive bi-temporal carrier relaxation is obtained in the presence of optical excitation. As an illustration of depth selective ion implantation, FIG. 16 shows the measurement of the depth profile of H+ ion implantation of an InGaAsP absorber film taken from secondary ion mass spectroscopy (SIMS).

Figure 16:
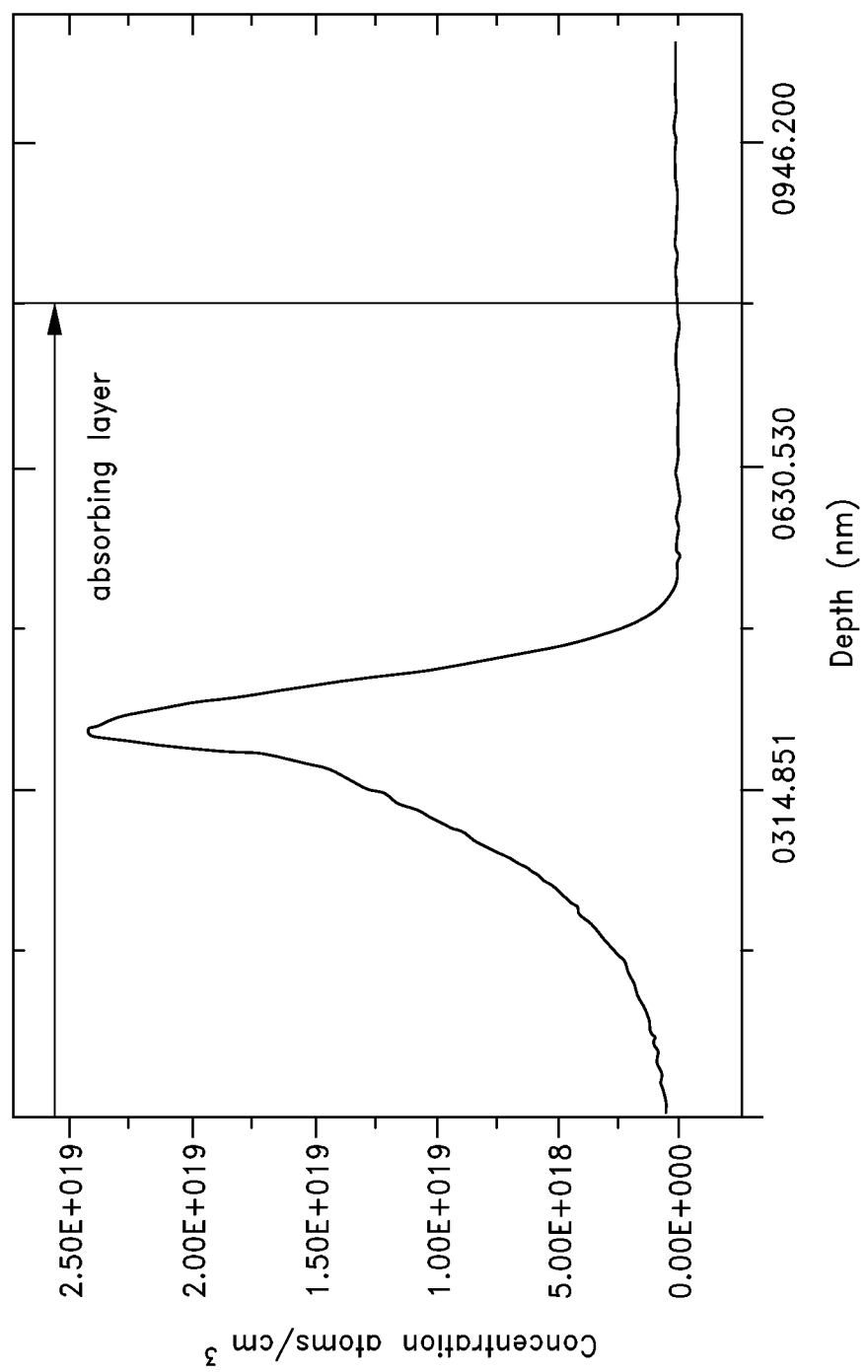
FIG. 16 is a diagram of the proton concentration as a function of depth obtained after proton implantation into a saturable semiconductor film.
Figure 17:
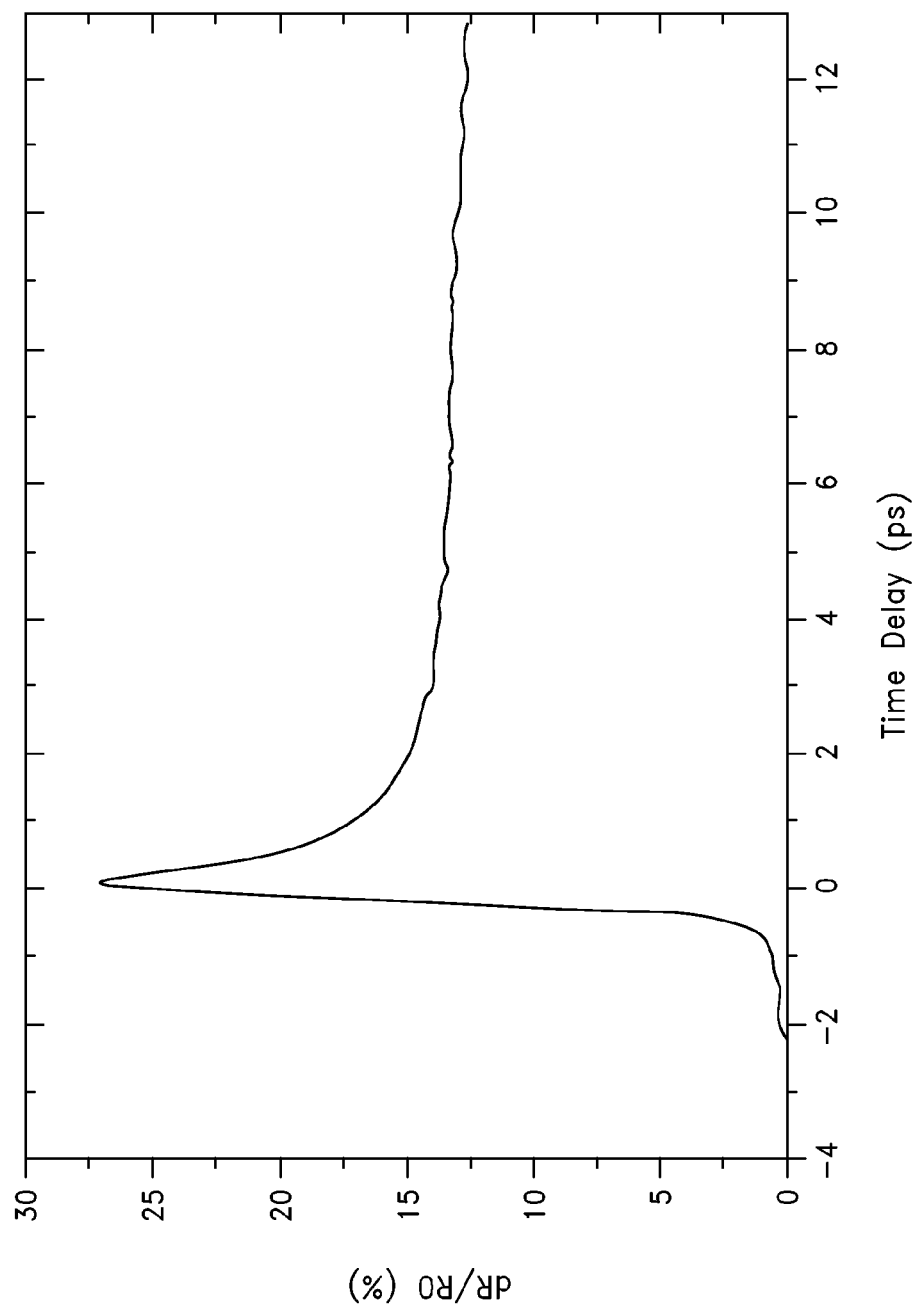
FIG. 17 is a diagram of the measured bi-temporal reflectivity modulation obtained in a semiconductor saturable mirror produced by ion-implantation with selective depth penetration.

The obtained bi-temporal carrier life-time obtained with the semiconductor film with a proton concentration as shown in FIG. 16, is further illustrated in FIG. 17. Here the reflectivity modulation (dR/R0) of a semiconductor saturable mirror due to excitation of the saturable mirror with a high energy short pulse at time t=0 is shown as a function of time delay. The measurement was obtained with a pump-probe technique, as well known in the art. FIG. 17 clearly displays the bi-temporal response time due to fast (<1 ps) and slow (>>100 ps) recovery. The distinctive fast response originates from the depth region with high trap concentration, while the slow component results from the rear depth region with a much lower trap center concentration.

When employing this absorber in the laser system described with respect to FIG. 14, Q-switched mode-locking is obtained at intracavity power levels of a few mW. At the operating pump power level, stable cw mode-locking evolving from Q-switch mode-locking is observed. In contrast, no Q-switching and no mode-locking operation is obtained with the same semiconductor material implanted uniformly with protons without bi-temporal carrier relaxation (exhibiting only fast carrier relaxation).

We emphasize that the description for FIG. 16 and FIG. 17 is to serve as an example in controlling 1) the fast time constant, 2) the slow time constant, 3) the ratio of the fast and slow time constants, 4) the amplitude of the fast response, 5) the amplitude of the slow response, and finally 6) the combination of all of the above by ion implantation in a saturable absorber. Thus, the concept depicted hereby can be applicable for any type of laser modelocked with a saturable absorber. Specifically, in the presence of unavoidable large spurious intra-cavity reflections such as in fiber lasers or thin disk lasers (F. Brunner et al., Sub-50 fs pulses with 24 W average power from a passively mod-elocked thin disk Yb:YAG laser with nonlinear fiber compression, Conf. on Advanced Solid State Photonics, ASSP, 2003, paper No.: TuA 1), the disclosed engineerable bi-temporal saturable absorbers can greatly simplify and stabilize short pulse formation.

The preferred implantation parameters for H+ ions in GaAs or InP related materials including MQW absorbers are as follows: The doses and the implantation energies can be selected from $10^{12}$ cm$^{-2}$ to $10^{17}$ cm$_{-2}$ and from 5 keV to 200 keV, respectively, for an optically absorbing layer thickness between 50 nm and 2000 nm. For MQW absorbers, the selective ion-implantation depth is rather difficult to measure because the shallow MQW falls into the implantation peak in FIG. 16. However, with the separation of MQW sections with spacers 1209-1212 (as shown in FIG. 15b) it is feasible to employ depth selective ion implantation. For arsenic implantation, the implantation parameters for 50-2000 nm absorbing layer spans from $10^{12}$ cm$^{-2}$ to $10^{17}$ cm$^{-2}$ for the dosage and an implantation energy range of 100 keV to 1000 keV. In case of MQW saturable absorbers, the implantation range is preferably selected within the total thickness of the semiconductor layer structure containing MQW sections and spacers. In addition to H$^+$ and arsenic, any other ions such as for example Be can be implanted with controlled penetration depth by adjusting the above recipes according to the stability requirements of the desired laser. Depth selective ion implantation is illustrated in FIG. 15a in which dashed curve 1201a represents the H$^+$ ion depth profile of FIG. 16.

Figure 18A:
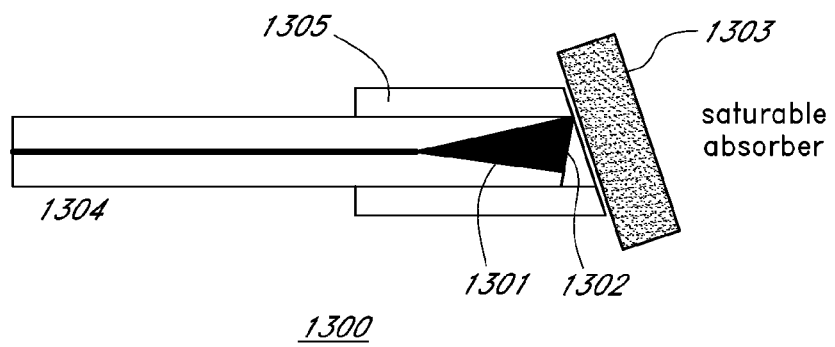
FIG. 18a is a diagram of a scheme for coupling a saturable absorber mirror to a fiber end according to an embodiment of the invention.

FIG. 18a illustrates an alternative implementation of the fiber end and SAM coupling in FIG. 14. Here cavity 1300 comprises an angle-polished thermal-diffusion expanded core (TEC) 1301. Fiber end 1302 is brought into close contact with SAM 1303 and fiber 1304 is rotated inside ferrule 1305 to maximize the back reflection from SAM 1303. Ferrule 1305 is further angle-polished and SAM 1303 is attached to the angle-polished surface of ferrule 1305. As shown in FIG. 18a, fiber 1304 is conveniently glued to the left-hand side of ferrule 1305. A wedge-shaped area between the fiber surface 1302 and SAM 1303 greatly reduces the finesse of the etalon between the two surfaces, which is required for optimum modelocked laser operation.

Figure 18B:
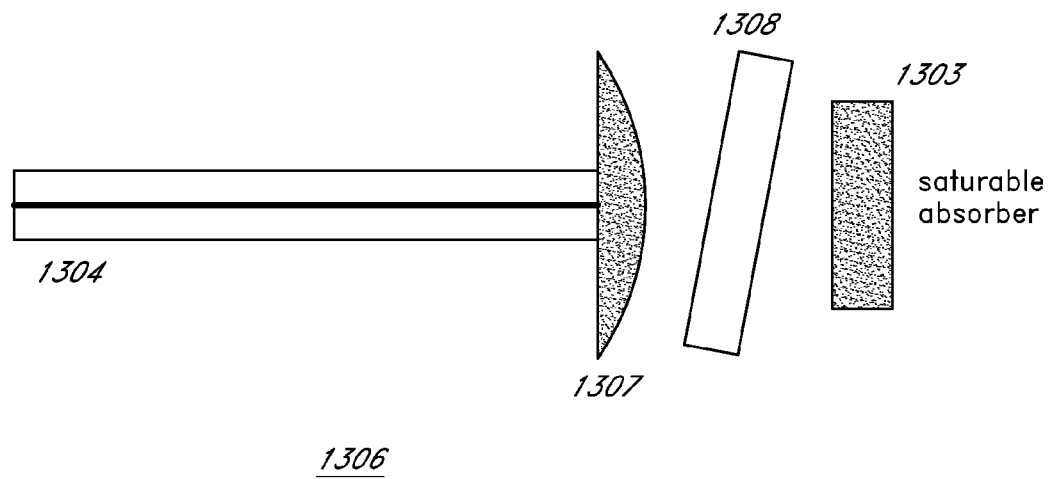
FIG. 18b is a diagram of a scheme for coupling a saturable absorber mirror to a fiber end according to an alternative embodiment of the invention.

Instead of TEC cores, more conventional lenses or graded index lenses can be incorporated between the fiber end and the SAM to optimize the beam diameter on the SAM. Generally, two lenses are required. A first lens collimates the beam emerging from the fiber end, and a second lens focuses the beam onto the SAM. According to present technology, even conventional lenses allow the construction of a very compact package for the second fiber end. An implementation with two separate collimation and focusing lenses is not separately shown. To minimize unwanted backreflections into the fiber cavity and to minimize the number of components, a single lens can be directly fused to the fiber end as depicted in FIG. 18b. As shown in FIG. 18b, assembly 1306 contains SAM 1303 and fiber 1304 as well as lens 1307, which focuses the optical beam onto the SAM. Lens 1307 can also include a graded index lens.

To minimize aberrations in assembly 1306, an additional lens can also be incorporated between lens 1307 and SAM 1303. Such an assembly is not separately shown. Alternatively, a lens can be directly polished onto fiber 1304; however, such an arrangement has the disadvantage that it only allows a beam size on the SAM which is smaller than the beam size inside the optical fiber, thereby somewhat restricting the design parameters of the laser. To circumvent this problem, a lens surface can be directly polished onto the surface of a TEC; such an implementation is not separately shown. Another alternative is to exploit a graded-index lens design attached directly onto the fiber tip to vary the beam size on the SAM. In the presence of air-gaps inside the oscillator a bandpass filter 1308 can be incorporated into the cavity, allowing for wavelength tuning by angular rotation as shown, for example, in FIG. 18b.

Passive modelocking of laser cavity 1100 (FIG. 14) is obtained when the pump power exceeds a certain threshold power. In a specific, exemplary, implementation, polarization—maintaining fiber 1101 was doped with Yb with a doping level of 2 weight %; the doped fiber had a length of 1.0 m; the core diameter was 8 um and the cladding diameter was 125 um. An additional 1.0 m length of undoped polarization-maintaining fiber was also present in the cavity. The overall (summed) dispersion of the two intra-cavity fibers was approximately +0.09 ps$^2$. In contrast, the fiber grating 106 had a dispersion of –0.5 ps$^2$, a spectral bandwidth of 10 nm and a reflectivity of 50%. The grating was manufactured with a phase mask with a chirp rate of 80 nm/cm.

When pumping with an optical power of 1.0 W at a wavelength of 910 nm, the laser produced short chirped optical pulses with a full width half maximum width of 1.5 ps at a repetition rate of 50 MHz. The average output power was as high as 10 mW. The pulse bandwidth was around 2 nm and hence the pulses were more than two times longer than the bandwidth-limit which corresponds to around 800 fs.

Alternatively, a fiber grating 1106 with a dispersion of –0.1 ps$^2$, closely matching the dispersion of the intra-cavity fiber, was implemented. The fiber grating had a reflectivity of 9% and a spectral bandwidth of 22 nm centered at 1050 nm. The grating was manufactured with a phase mask with a chirp rate of 320 nm/cm. The laser then produced chirped optical pulses with a full-width half maximum width of 1.0 ps at a repetition rate of 50 MHz with an average power of 25 mW. The pulse spectral bandwidth was around 20 nm and thus the pulses were around 10 times longer than the bandwidth limit, which corresponds to around 100 fs. The generation of pulses with a pulse width corresponding to the bandwidth limit was enabled by the insertion of a pulse compressing element; such elements are well known in the state of the art and are not further discussed here. The generation of even shorter pulses can be generated with fiber gratings with a bandwidth of 40 nm (and more) corresponding to (or exceeding) the spectral gain bandwidth of Yb fibers.

Figure 19:
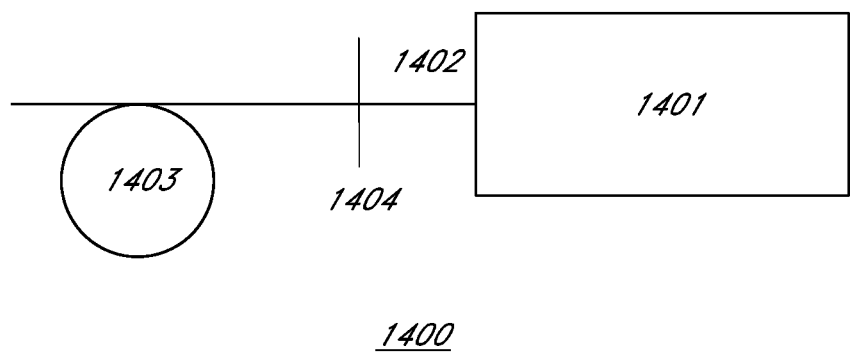
FIG. 19 is a diagram for increasing the optical bandwidth of a fiber laser according to an embodiment of the invention.

Shorter pulses or pulses with a larger bandwidth can be conveniently obtained by coupling the fiber output into another length of nonlinear fiber as shown in FIG. 19. Here, assembly 1400 contains the integrated fiber laser 1401 with pig-tail 1402. Pig-tail 1402 is spliced (or connected) to the nonlinear fiber 1403 via fiber splice (or connector) 1404. Any type of nonlinear fiber can be implemented. Moreover, fiber 1403 can also comprise a fiber amplifier to further increase the overall output power.

Figure 20:
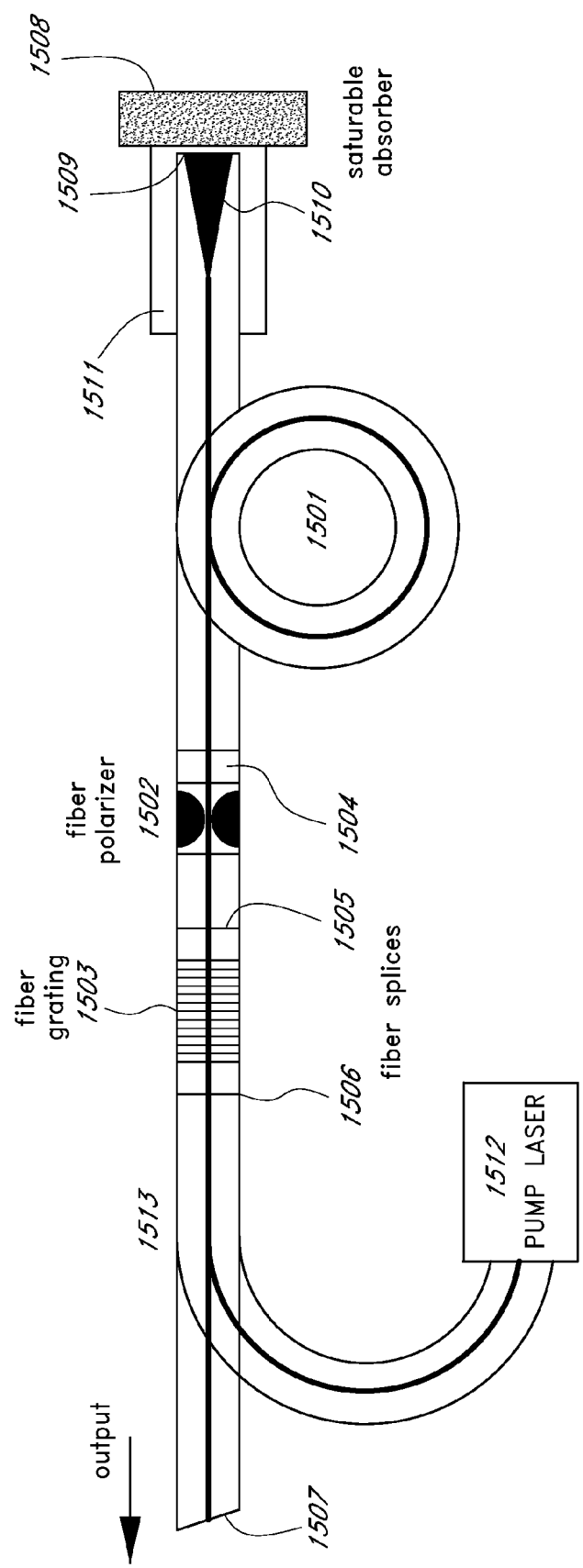
FIG. 20 is a diagram of a core pumped fiber cavity design according to an embodiment of the invention.

In addition to cladding pumped fiber lasers, core-pumped fiber lasers can be constructed in an integrated fashion. Such an assembly is shown in FIG. 20. The construction of cavity 1500 is very similar to the cavity shown in FIG. 14. Cavity 1500 contains polarization-maintaining fiber 1501 and integrated fiber polarizer 1502. Fiber 1501 is preferably single-clad, though double-clad fiber can also be implemented. The chirped fiber grating 1503 again controls the dispersion inside the cavity and is also used as the output coupler. Fiber 1501, fiber polarizer 1502, fiber grating 1503 and the polarization-maintaining output fiber are connected via splices 1504-1506. The output from the cavity is extracted at angle-cleaved fiber end 1507. SAM 1508 contains anti-reflection coated fiber end 1509, located at the output of the TEC 1510. Fiber 1501 and SAM 1508 are fixed to each other using ferrule 1511. The fiber laser is pumped with pump laser 1512, which is injected into the fiber via wavelength-division multiplexing coupler 1513.

In addition to chirped fiber gratings, unchirped fiber gratings can also be used as output couplers. Such cavity designs are particularly interesting for the construction of compact Er fiber lasers. Cavity designs as discussed with respect to FIGS. 14 and 20 can be implemented and are not separately shown. In the presence of fiber gratings as shown in FIGS. 14 and 20, the fiber gratings can also be used as wavelength tuning elements. In this, the fiber gratings can be heated, compressed or stretched to change their resonance condition, leading to a change in center wavelength of the laser output. Techniques for heating, compressing and stretching the fiber gratings are well known. Accordingly, separate cavity implementations for wavelength tuning via a manipulation of the fiber grating resonance wavelength are not separately shown.

Figure 21:
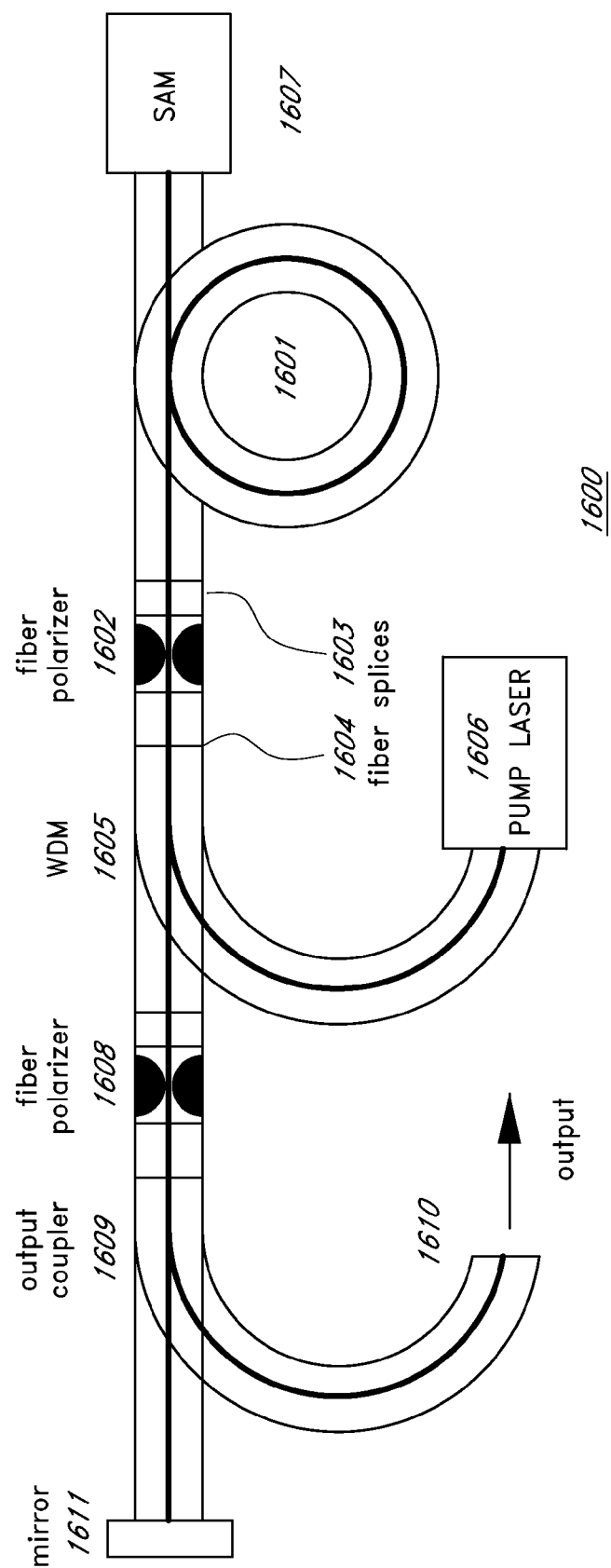
FIG. 21 is a diagram of a core pumped fiber cavity design using intra-cavity wavelength division multiplexers and output couplers according to an embodiment of the invention.

In the absence of a fiber grating, a mirror can be deposited or attached to one end of the fiber cavity. The corresponding cavity design 1600 is shown in FIG. 21. Here, it is assumed that the fiber 1601 is core pumped. The cavity comprises an intra-cavity all-fiber polarizer 1602 spliced to fiber 1601 via splice 1603. Another splice 1604 is used to couple WDM 1605 to polarizer 1602. Polarization maintaining WDM 1605 is connected to pump laser 1606, which is used to pump the fiber laser assembly. Saturable absorber mirror assembly 1607, as described previously with respect to FIGS. 14 and 20, terminates one cavity end and is also used as the passive modelocking element.

A second fiber polarizer 1608 is spliced between WDM 1605 and polarization-maintaining output coupler 1609 to minimize the formation of satellite pulses, which can occur when splicing sections of polarization maintaining fiber together without perfect alignment of their respective polarization axes, as discussed in U.S. patent application Ser. No. 09/809,248. Typically, coupler 1609 has a coupling ratio of 90/10 to 50/50, i.e., coupler 1609 couples about 90-50% of the intra-cavity signal out to fiber pig-tail 1610. Pig-tail 1610 can be spliced to a fiber isolator or additional fiber amplifiers to increase the pulse power. The second cavity end is terminated by mirror 1611. Mirror 1611 can be directly coated onto the fiber end face or, alternatively, mirror 1611 can be butt-coupled to the adjacent fiber end.

The increase in stability of cavity 1600 compared to a cavity where the output coupler fiber, the WDM fiber and gain fiber 1601 are directly concatenated without intra-fiber polarizing stages, can be calculated using a Jones matrix formalism even when coherent interaction between the polarization axes of each fiber section occurs.

Briefly, due to the environmental sensitivity of the phase delay between the polarization eigenmodes of each fiber section, for N directly concatenated polarization-maintaining fibers the reflectivity of a fiber Fabry-Perot cavity can vary between R=1 and R=1-(N×α)$^2$, where α is the angular misalignment between each fiber section. Further, it is assumed that α is small (i.e., α<<10°) and identical between each pair of fiber sections. Also, any cavity losses are neglected. In fact, it is advantageous to analyze the possible leakage L into the unwanted polarization state at the output of the fiber cavity. L is simply given by L=1−R. For the case of N concatenated fiber sections, the maximum leakage is thus (N×α)$^2$.

In contrast, a cavity containing N−1 polarizers in-between N sections of polarization-maintaining fiber is more stable, and the maximum leakage is L=2×(N−1)α$^2$. Here, any depolarization in the fiber polarizers itself is neglected. For instance, in a case where N=3, as in cavity 1600, the leakage L into the wrong polarization axis is 2×(3−1)/3$^3$=4/9 times smaller compared to a cavity with three directly concatenated fiber sections. This increase in stability is very important in manufacturing yield as well as in more reproducible modelocked operation in general.

Figure 22:
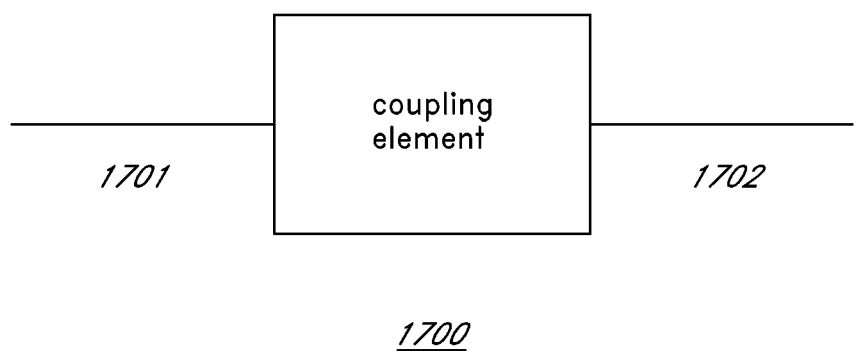
FIG. 22 is a diagram of a core pumped fiber cavity design using intra-cavity wavelength division multiplexers and a butt-coupled fiber pig-tail for output coupling according to an embodiment of the invention.

In constructing a stable laser, it is also important to consider the construction of WDM 1605 as well as output coupler 1609. Various vendors offer different implementations. An adequate optical representation of such general polarization-maintaining fiber elements is shown in FIG. 22. It is sufficient to assume that a general coupler 1700 comprises two polarization-maintaining fiber sections (pig-tails) 1701, 1702 with a coupling point 1703 in the middle, where the two polarization axes of the fiber are approximately aligned with respect to each other.

In order to ensure pulse stability inside a passively modelocked laser, the group-velocity walk-off along the two polarization axes of fiber sections 1701, 1702 should then be longer than the full-width half maximum (FWHM) pulse width of the pulses generated in the cavity. For example, assuming a birefringent fiber operating at a wavelength of 1550 nm with a birefringence of 3×10$^{-4}$ corresponding to a polarization beat length of 5 mm at 1550 nm, the stable oscillation of soliton pulses with a FWHM width of 300 fs requires pig-tails with a length greater than 29 cm. For 500 fs pulses, the pig-tail length should be increased to around 50 cm.

Referring back to FIG. 21, if a fiber pig-tailed output is not required, mirror 1611 as well as output coupler 1609 can be omitted, and the 4% reflection from the fiber end adjacent to mirror 1611 can be used as an effective output mirror. Such an implementation is not separately shown.

Figure 23:
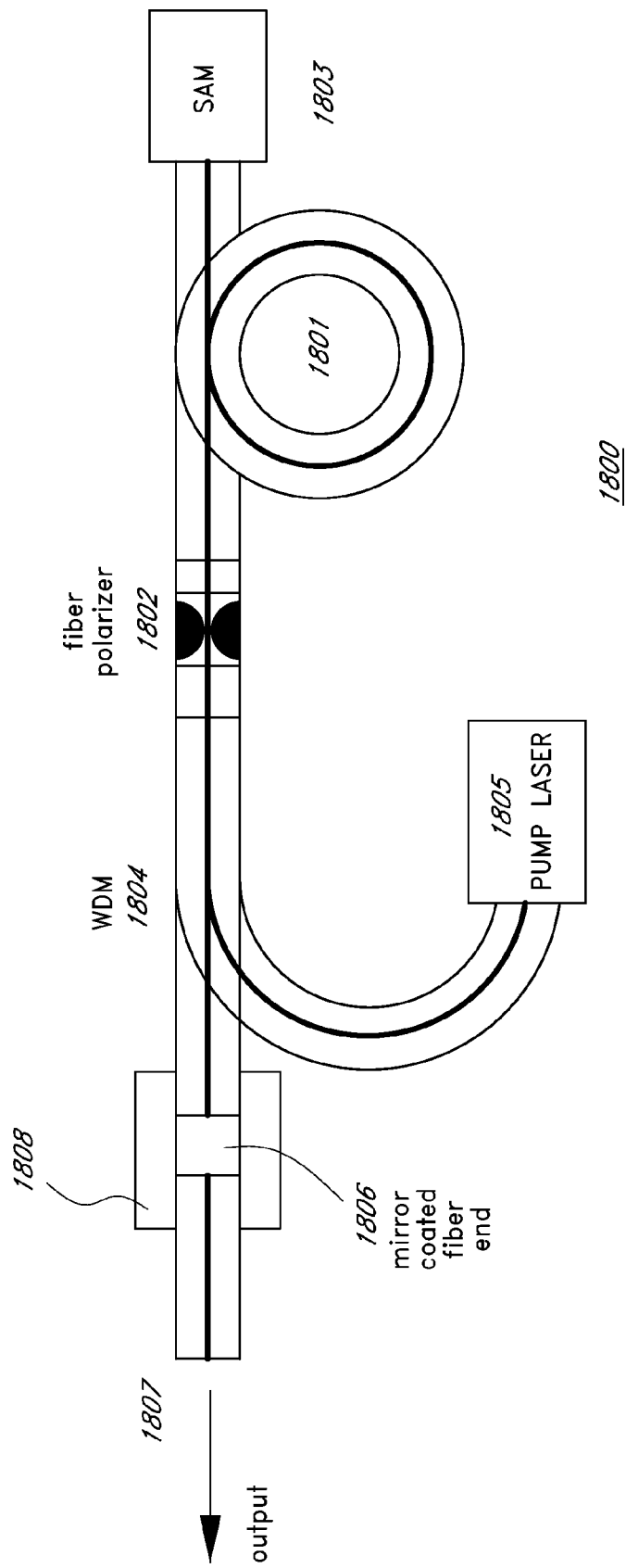
FIG. 23 is a diagram of a cladding pumped fiber cavity design using an intra-cavity output coupler according to an embodiment of the invention.

Alternatively, a fiber-pig-tail can be butt-coupled to mirror 1611 and also be used as an output fiber pigtail. Such an implementation is shown in FIG. 23. Here, cavity 1800 comprises core-pumped fiber 1801, fiber polarizer 1802 and SAM assembly 1803. The laser is pumped via WDM 1804 connected to pump laser 1805. An appropriate mirror (or mirror coating) 1806 is attached to one end of the cavity to reflect a part of the intra-cavity light back to the cavity and to also serve as an output mirror element. Fiber pig-tail 1807 is butt-coupled to the fiber laser output mirror 1806 and an additional ferrule 1808 can be used to stabilize the whole assembly. The polarization axes of fiber 1807 and 1801 can be aligned to provide a linearly polarized output polarization. Again, applying a Jones matrix analysis, cavity 1800 is more stable than cavity 1600, because it comprises only one intra-fiber polarizing section. The maximum leakage in cavity 1800 compared to a cavity comprising directly concatenated WDM and gain fiber sections is 50% smaller.

Figure 24:
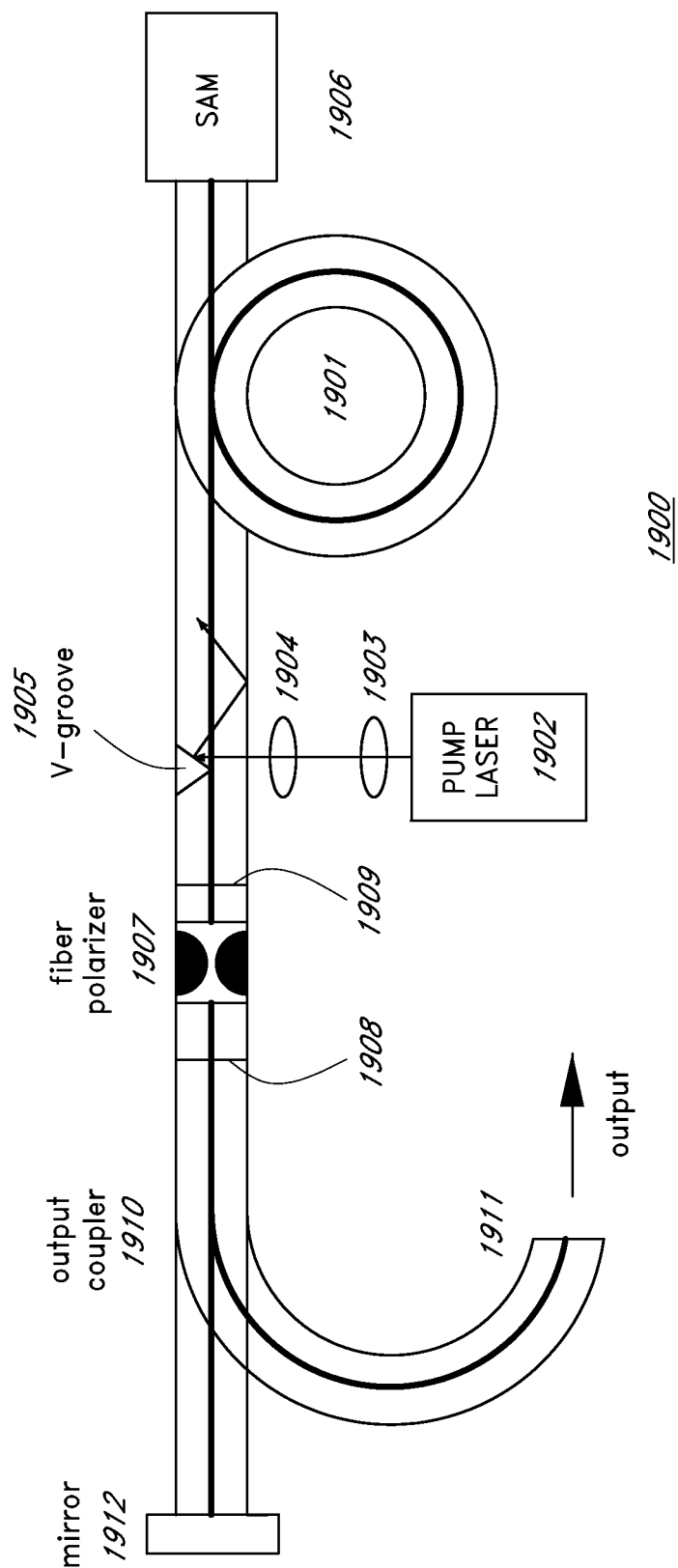
FIG. 24 is a diagram of a cladding pumped fiber cavity design using intra-cavity fiber output couplers according to an embodiment of the invention.

Similarly, a cladding pumped version of cavity 1600 can be constructed. Cavity 1900 shown in FIG. 24 displays such a cavity design. Fiber 1901 is pumped via pump laser 1902, which is coupled to fiber 1901 via lens assembly 1903 and 1904 as well as V-groove 1905. Alternatively, polarization-maintaining multi-mode fiber couplers or star-couplers could be used for pump power coupling. Such implementations are not separately shown. One end of the laser cavity is terminated with SAM assembly 1906 (as discussed in regard to FIGS. 14, 20 and 21), which is also used as the modelocking element. A single-polarization inside the laser is selected via all-fiber polarizer 1907, which is spliced into the cavity via splices 1908 and 1909. Polarization-maintaining output coupler 1910 is used for output coupling. The laser output is extracted via fiber end 1911, which can further be spliced to additional amplifiers. Cavity mirror 1912 terminates the second cavity end. Output coupler 1910 can further be omitted and the laser output can be obtained via a butt-coupled fiber pig-tail as explained with reference to FIG. 23.

The cavity designs discussed with respect to FIGS. 14, 20, 21, 23 and 24 follow general design principles as explained with reference to FIGS. 25a-25c.

Figure 25A:
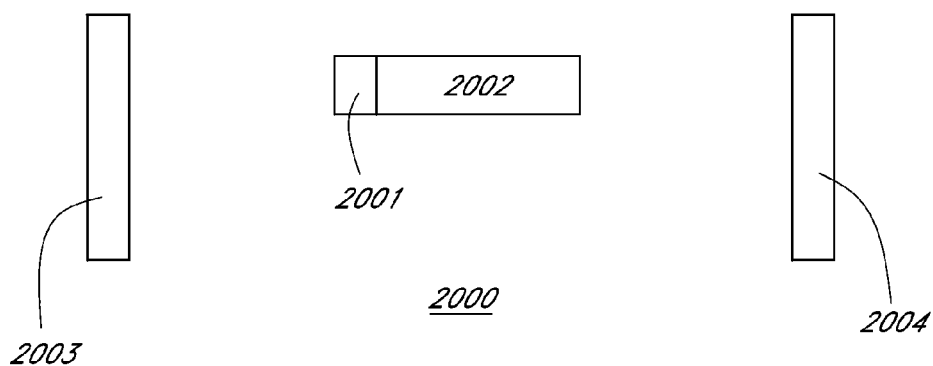
FIG. 25a is a diagram of a passively modelocked fiber laser based on concatenated sections of polarization maintaining and non-polarization maintaining fiber sections according to an embodiment of this invention.

FIG. 25a shows a representative modelocked Fabry-Perot fiber laser cavity 2000, producing a linear polarization state oscillating inside the cavity containing one (or more) sections of non-polarization maintaining fiber 2001 and one (or more) sections of polarization maintaining fiber 2002, where the length of fiber section 2001 is sufficiently short so as not to degrade the linear polarization state inside the fiber laser cavity, more generally a predominantly linear polarization state is oscillating everywhere within the intracavity fiber. The fiber laser output can be obtained from cavity end mirrors 2003 or 2004 on either side of the cavity. To suppress the oscillation of one over the other linear polarization state inside the cavity, either fiber 2001 or 2002 has a polarization dependent loss at the emission wavelength.

Figure 25B:
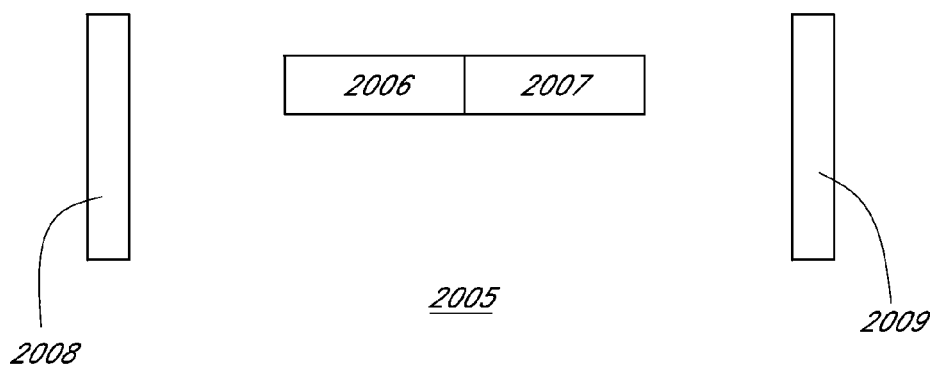
FIG. 25b is a diagram of a passively modelocked fiber laser based on concatenated sections of long polarization maintaining fiber sections according to an embodiment of this invention.

FIG. 25b shows a representative modelocked Fabry-Perot fiber laser cavity 2005, producing a linear polarization state oscillating inside the cavity containing two (or more) sections of polarization maintaining fibers 2006, 2007, where the length of fiber sections 2006, 2007 is sufficiently long so as to prevent coherent interaction of short optical pulses oscillating inside the cavity and propagating along the birefringent axes of fibers 2006, 2007. Specifically, for an oscillating pulse with a FWHM width of $\tau$, the group delay of the oscillating pulses along the two polarization axes of each fiber should be larger than $\tau$. For oscillating chirped pulses $\tau$ represents the bandwidth-limited pulse width that corresponds to the oscillating pulse spectrum. Cavity 2005 also contains end mirrors 2008 and 2009 and can further contain sufficiently short sections of non-polarization maintaining fiber as discussed with reference to FIG. 25a.

Figure 25C:
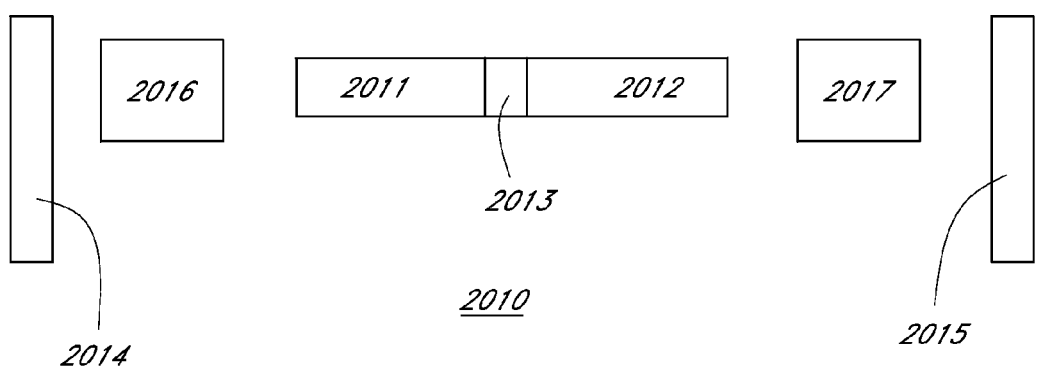
FIG. 25c is a diagram of a passively modelocked fiber laser based on short concatenated sections of polarization maintaining fiber and additional sections of all-fiber polarizer according to an embodiment of this invention.

FIG. 25c shows a representative modelocked Fabry-Perot fiber laser cavity 2010, producing a linear polarization state oscillating inside the cavity containing one (or more) sections of polarization maintaining fiber 2011, 2012 and one (or more) sections of polarizing fiber (or all-fiber polarizer) 2013, where the length of fiber sections 2011, 2013 is not sufficient to prevent coherent interaction of short optical pulses oscillating inside the cavity and propagating along the birefringent axes of fibers 2011, 2013, where the polarizing fiber is sandwiched between the sections of short polarization maintaining fiber. Cavity 2010 further contains cavity end mirrors 2014 and 2015 and can further contain short sections of non-polarization maintaining fiber as discussed with reference to FIG. 25a. Moreover, cavity 2010 (as well as 2000 and 2005) can contain bulk optic elements 2016, 2017 (or any larger number) randomly positioned inside the cavity to provide additional pulse control such as wavelength tuning or dispersion compensation. Note that the fibers discussed here can be single-clad, double-clad; the fibers can comprise also holey fibers or multi-mode fibers according to the system requirement. For example polarization maintaining holey fibers can be used for dispersion compensation, whereas multi-mode fibers can be used for maximizing the output pulse energy. Cavity mirrors 2014, 2015, 2003, 2004 and 2008, 2009 can further comprise bulk mirrors, bulk gratings or fiber gratings, where the fiber gratings can be written in short sections of non-polarization maintaining fiber that is short enough so as not to perturb the linear polarization state oscillating inside the cavity.

Figure 26:
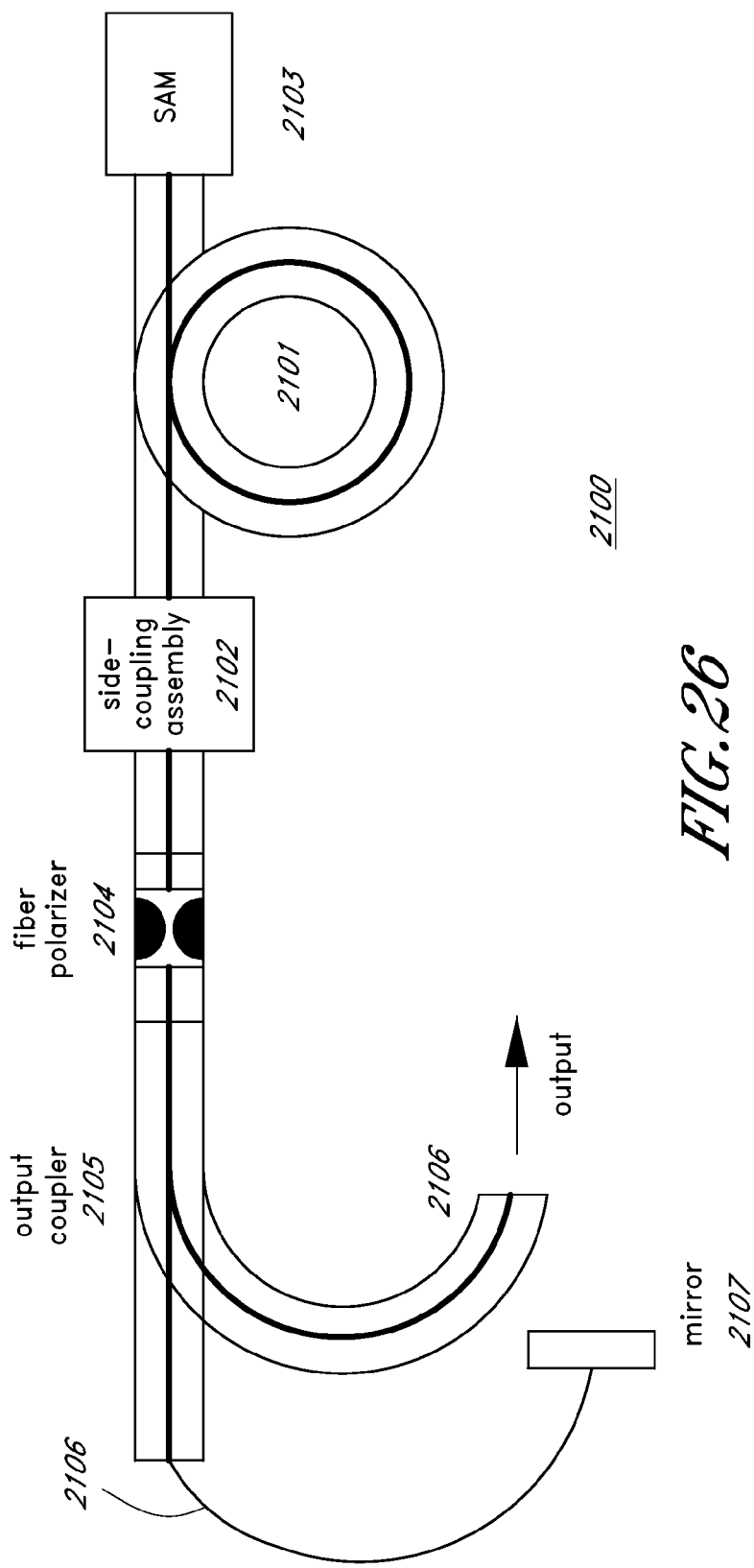
FIG. 26 is a diagram of a dispersion compensated fiber laser cavity according to an embodiment of this invention.

FIG. 26 serves as an example of a passively modelocked linear polarization cavity containing holey fiber for dispersion compensation. Cavity 2100 contains fiber 2101, side-pumping assembly 2102 (directing the pump light either into the cladding or the core of fiber 2101 as explained before), saturable absorber mirror assembly 2103, all fiber polarizer 2104 and fiber output coupler 2105 providing an output at fiber end 2106. All the above components were already discussed with respect to FIG. 21. In addition, a length of polarization maintaining holey fiber 2106 is spliced to the cavity for dispersion compensation and the cavity is terminated on the left hand side by mirror 2107.

Figure 27:
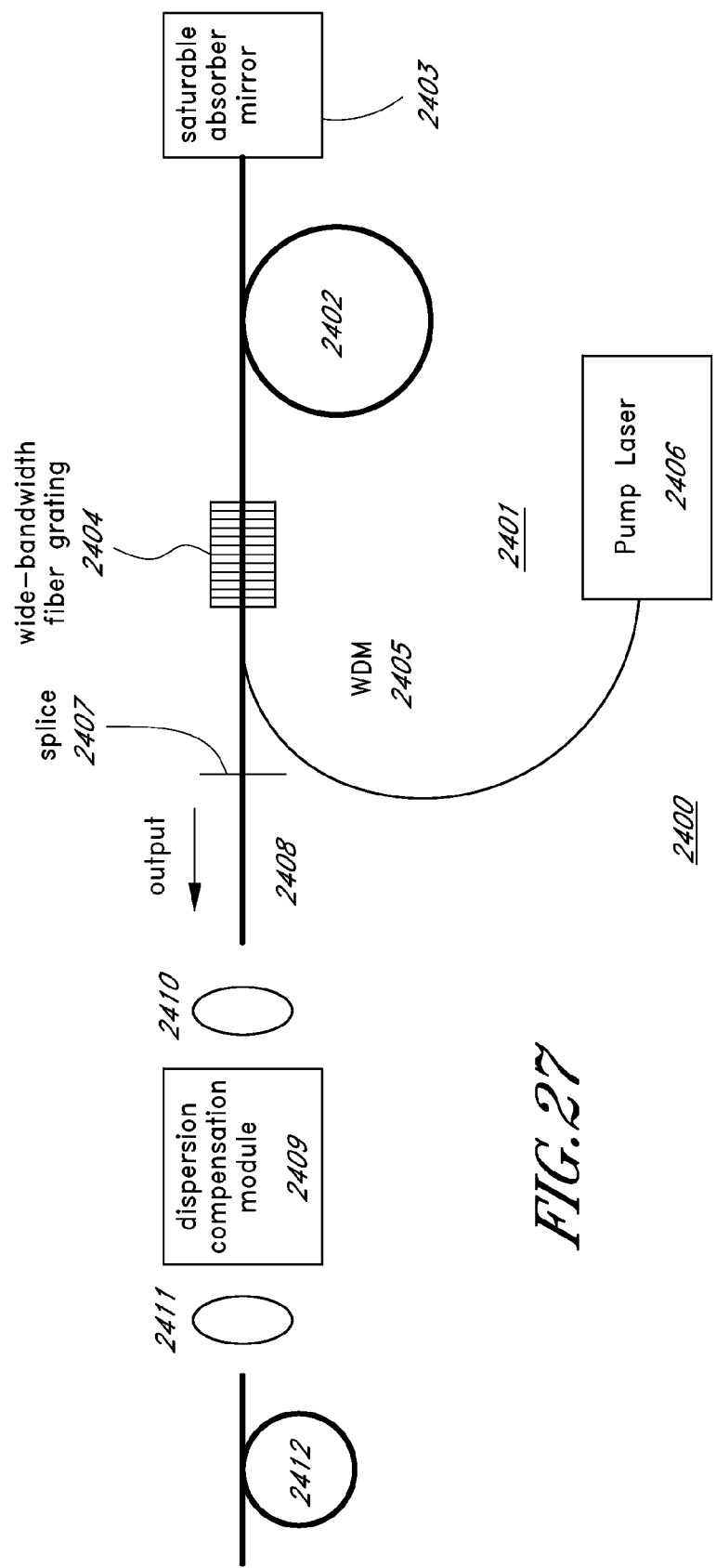
FIG. 27 is a diagram of a dispersion compensated fiber laser cavity according to an alternative embodiment of this invention, including means for additional spectral broadening of the fiber laser output.

FIG. 27 serves as another example of a passively modelocked linear polarization cavity containing a fiber grating for dispersion compensation as applied to the generation of ultra-stable spectral continua. System 2400 comprises a small modification of the cavity explained with respect to FIG. 20. System 2400 contains a fiber laser 2401 generating pulses with a bandwidth comparable to the spectral bandwidth of the fiber gain medium 2402. Fiber laser 2401 further comprises saturable absorber mirror assembly 2403, wide bandwidth fiber grating 2404, polarization maintaining wavelength division multiplexing (WDM) coupler 2405, which is used to direct pump laser 2406 into fiber gain medium 2402. Pump laser 2406 is preferably single-mode to generate the least amount of noise.

To enable the oscillation of short pulses with a bandwidth comparable to the bandwidth of the gain medium 2402, saturable absorber mirror 2403 contains a bi-temporal saturable absorber, constructed with a bi-temporal life-time comprising a 1st short life-time of <5 ps and a 2nd long life-time of >50 ps. More preferable is a first life-time of <1 ps, to allow pulse shaping of pulses as short as 100 fs and shorter. By selecting the penetration depth of the implanted ions into the saturable absorber, even tri-temporal saturable absorbers can be constructed.

The wide-bandwidth grating is preferably selected to approximately match the dispersion of the intra-cavity fibers. The wide-bandwidth grating can be made in short non-polarization maintaining fibers and it can be made also in polarization maintaining fibers. In order to suppress detrimental effects from cross coupling between the two polarization axes of the fiber grating, coupling to cladding modes in such large bandwidth fiber gratings should be suppressed. Gratings with suppressed coupling to cladding modes can be made in optical fibers with photosensitive core and cladding area, where the photosensitive cladding area is index-matched to the rest of the cladding. Such fiber designs are well known in the state of the art and can for example be manufactured with an appropriate selection of germania and fluorine doping in the core and cladding regions and such fiber designs are not further discussed here. Because of the large generated bandwidth, splicing of such polarization maintaining gratings to the rest of the cavity without coherent coupling between the linear polarization eigenmodes is no problem. Alternatively, the fiber gratings can be written directly into the photosensitive gain fiber, with an index and dopant profile that suppresses coupling to cladding modes in the fiber grating.

To sustain large spectral bandwidth, fiber grating 2404 has preferably a spectral bandwidth >20 nm. A splice 2407 (or an equivalent bulk optic lens assembly) is used to connect the output of fiber laser 2401 to nonlinear fiber 2408 to be used for additional spectral broadening of the output of the fiber laser. For example fiber 2408 can comprise a highly nonlinear dispersion-flattened holey fiber. In conjunction with such fiber, smooth broad-bandwidth spectral profiles with bandwidths exceeding 100 nm can be generated. These spectral outputs can be used directly in high precision optical coherence tomography.

The pulses at the output of fiber 2408 are generally chirped and a dispersion compensation module 2409 can be inserted after the output from fiber 2408 for additional pulse compression. The dispersion compensation module can be spliced directly to fiber end 2408 when optical fiber is used for dispersion compensation. Alternatively, the dispersion compensation module can comprise two (or one) bulk grating (or prism) pair(s). Such bulk optic elements for dispersion compensation are well known in the state of the art and are not further discussed here. Coupling into and out of a bulk dispersion compensating module is obtained via lenses 2410 and 2411. The pulses generated after pulse compression can be as short as 20-200 fs.

An additional highly nonlinear fiber 2412 (or a number of spliced together highly nonlinear fibers) is then used for the generation of the coherent spectral continuum. These spectral continua can be subsequently used in precision frequency metrology.

Note that the discussion with respect to FIG. 27 serves only as an example of the use of bi- or multi-temporal saturable absorbers in the generation of mass producible ultra-broad band, low noise spectral sources. Other modifications are obvious to anyone skilled in the art. These modifications can comprise for example the insertion of additional fiber amplifiers after the output of fiber laser 2401 and the construction of an integrated all-fiber assembly substituting elements 2408, 2409-2411 and 2412.

Though the discussion of the laser system with respect to FIG. 27 was based on the use of polarization maintaining fiber, non-polarization maintaining fiber can also be used to produce pulses with bandwidth comparable to the bandwidth of the gain medium. In this case, saturable absorbers with depth controlled ion implantation are also of great value. Essentially, any of the prior art modelocked fiber laser systems described above (that were using saturable absorbers) can be improved with engineered bi- and multi-temporal saturable absorbers. Specifically, any of the cavity designs described in '427 and '848 to Fermann et al. can be used for the generation of ultra-broadband optical pulses in conjunction with bi- or multi-temporal saturable absorbers and wide-bandwidth fiber Bragg gratings.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims and equivalents thereof.

What is claimed is:
1. A pulsed fiber laser comprising:
a modelocked fiber oscillator comprising a gain fiber and a pair of reflective optical elements disposed with respect to said gain fiber to form a resonant cavity, said modelocked fiber oscillator comprising a semiconductor saturable absorber (SAM) optically connected and in close contact with an end of said gain fiber and operably arranged to induce modelocking, said modelocked fiber oscillator producing a train of optical pulses having an average pulse width, said modelocked fiber oscillator comprising a wedge-shaped area between said SAM and said end of said gain fiber, wherein said wedge-shaped area is operably arranged to limit the finesse of an etalon formed with surfaces of said SAM and said gain fiber;
a fiber amplifier optically connected to said modelocked fiber oscillator such that said optical pulses can propagate through said amplifier, said fiber amplifier amplifying said optical pulses; and
one or more optical pump sources optically connected to said modelocked fiber oscillator and said fiber amplifier to pump said fiber oscillator and fiber amplifier.

2. The pulsed fiber laser of claim 1, further comprising a pulse compressor optically coupled to receive said amplified optical pulses output from said fiber amplifier, said pulse compressor shortening the pulse width of said optical pulses output by said fiber amplifier.

3. The pulsed fiber laser of claim 2, further comprising a pre-compressor disposed in an optical path between said modelocked fiber oscillator and said fiber amplifier, said pre-compressor shortening the duration of said optical pulses introduced into said fiber amplifier such that said pulse duration of said optical pulses output by said fiber amplifier can be further shortened by said pulse compressor.

4. The pulsed fiber laser of claim 3, wherein said pre-compressor comprises a photonic crystal fiber, a photonic bandgap fiber, or a holey fiber.

5. The pulsed fiber laser of claim 3, wherein said pre-compressor is operably arranged to reduce a spectral bandwidth of said optical pulses.

6. The pulsed fiber laser of claim 3, wherein said pre-compressor comprises a dispersive optical element to differentiate between spectral components and to introduce different phase shifts to said different spectral components.

7. The pulsed fiber laser of claim 1, wherein said gain fiber comprises an angle polished core portion disposed in an angled polished housing.

8. The pulsed fiber laser of claim 7, wherein said angle polished housing is attached to said SAM.

9. The pulsed fiber laser of claim 1, wherein said gain fiber comprises a core with an expanded portion proximate to said SAM.

10. A Yb-based pulsed fiber laser amplification system comprising:
- a Yb passively modelocked fiber oscillator configured to output optical pulses, said Yb passively modelocked fiber oscillator comprising a saturable absorber, and an oscillator pump configured to optically pump said Yb passively modelocked fiber oscillator, wherein said saturable absorber exhibits a multi-temporal lifetime and is configured such that Q-switched mode-locking evolves at a low oscillator pump power followed by cw mode locking at a higher operational pump power that exceeds a threshold pump power for operation of said mode locked laser;
- a fiber Bragg grating configured to control intra-cavity dispersion and configured as a mirror of said Yb passively modelocked fiber oscillator;
- a fiber amplifier optically connected to said modelocked fiber oscillator via a first optical path, said fiber amplifier configured to amplify said optical pulses; and
- an optical pump source optically connected to said fiber amplifier.

11. The Yb-based pulsed fiber laser amplification system of claim 10, wherein said fiber Bragg grating is further configured as an output mirror of said passively modelocked fiber oscillator.

12. The Yb-based pulsed fiber laser amplification system of claim 10, wherein said saturable absorber comprises multiple quantum wells or bulk semiconductor films, and wherein said saturable absorber is configured with non-uniform ion-implantation which, in combination with one or more implantation parameters, achieves said multi-temporal lifetime in the presence of optical excitation with short optical pulses.

13. The Yb-based pulsed fiber laser amplification system of claim 10, further comprising an optical tap arranged to receive a portion of an output from said modelocked fiber oscillator.

14. The Yb-based pulsed fiber laser amplification system of claim 10, further comprising an optical tap arranged to receive a portion of an output from said fiber amplifier.

15. The Yb-based pulsed fiber laser amplification system of claim 10, wherein said saturable absorber comprises:
- a film of a semiconductor material implanted with high energy ions at a penetration depth which differs from the penetration depth of optical signals reflected from said saturable absorber mirror, said semiconductor material having an ion implantation depth profile selected to provide saturable absorption having a multi-temporal carrier relaxation.

16. The Yb-based pulsed fiber laser amplification system of claim 10, wherein said saturable absorber is configured with depth selective ion implantation.

17. The Yb-based pulsed fiber laser amplification system of claim 10, wherein said Yb passively modelocked fiber oscillator comprises a gain fiber, wherein an end of said gain fiber is in close contact with said saturable absorber.

18. The Yb-based pulsed fiber laser amplification system of claim 17, wherein the end of said gain fiber is butt-coupled to said saturable absorber.

19. The Yb-based pulsed fiber laser amplification system of claim 17, wherein the end of said gain fiber is disposed in a housing that is attached to said saturable absorber.

20. The Yb-based pulsed fiber laser amplification system of claim 17, wherein the end of the gain fiber and the housing are angle-polished.

21. A pulsed fiber laser comprising:
- a modelocked fiber oscillator comprising a gain fiber and a pair of reflective optical elements disposed with respect to said gain fiber to form a resonant cavity, said modelocked fiber oscillator comprising a semiconductor saturable absorber (SAM) optically connected to said gain fiber and arranged such that said modelocked fiber oscillator comprises a wedge-shaped area between said SAM and said gain fiber, wherein said wedge-shaped area is operably arranged to limit the finesse of an etalon formed with surfaces of said SAM and said fiber, said modelocked fiber oscillator producing a train of optical pulses having an average pulse width;
- a fiber amplifier optically connected to said modelocked fiber oscillator such that said optical pulses can propagate through said amplifier, said fiber amplifier amplifying said optical pulses; and
- one or more optical pump sources optically connected to said modelocked fiber oscillator and said fiber amplifier to pump said fiber oscillator and fiber amplifier.

22. The pulsed fiber laser of claim 21, wherein said gain fiber comprises an angle-polished portion disposed in an angle-polished housing.

23. The pulsed fiber laser of claim 22, wherein said angle-polished housing is attached to said SAM.

* * * * *